(12) United States Patent
Makris et al.

(10) Patent No.: US 7,841,026 B2
(45) Date of Patent: Nov. 30, 2010

(54) HEAD PROTECTOR

(75) Inventors: Aristidis Makris, Ontario (CA); Athanasios Grillas, Ontario (CA); Bratislav Mitric, Ontario (CA); Geoffrey Fisher, Ontario (CA); Jay Sobel, Ontario (CA); Julia White, Ontario (CA); Justin E Myles, Ontario (CA); Maxime Vadeboncoeur, Quebec (CA); Raymond James, Ontario (CA); Richard L'Abbe, Ontario (CA); Rod Farrell, Ontario (CA); Shaik Kalaam, Ontario (CA); Clint Hedge, Ontario (CA); Peter Bortot, Ontario (CA); Simon Pflanz, Ontario (CA); Gilles Leclerc, Quebec (CA); Daniel Page, Ontario (CA)

(73) Assignee: Allen-Vanguard Technologies Inc., Ottawa, CA (US)

( * ) Notice: Subject to any disclaimer, the term of this patent is extended or adjusted under 35 U.S.C. 154(b) by 1463 days.

(21) Appl. No.: 10/550,922

(22) PCT Filed: Mar. 29, 2004

(86) PCT No.: PCT/CA2004/000444

§ 371 (c)(1),
(2), (4) Date: Sep. 28, 2005

(87) PCT Pub. No.: WO2004/084664

PCT Pub. Date: Oct. 7, 2004

(65) Prior Publication Data

US 2007/0000031 A1    Jan. 4, 2007

Related U.S. Application Data

(60) Provisional application No. 60/457,927, filed on Mar. 28, 2003, provisional application No. 60/520,641, filed on Nov. 18, 2003.

(51) Int. Cl.
*A42B 1/08*    (2006.01)
(52) U.S. Cl. .................................. 2/424; 2/412; 2/410
(58) Field of Classification Search ..................... 2/410, 2/6.4, 6.5, 412, 424
See application file for complete search history.

(56) References Cited

U.S. PATENT DOCUMENTS

| 2,184,043 A | 12/1939 | Heilstedt et al. |
| 2,798,221 A | 7/1957 | Bailey et al. |
| 2,867,812 A | 1/1959 | Roth et al. |

(Continued)

FOREIGN PATENT DOCUMENTS

DE    200 349    6/1908

(Continued)

*Primary Examiner*—Shaun R Hurley
*Assistant Examiner*—Andrew W Sutton
(74) *Attorney, Agent, or Firm*—Lang Michener LLP

(57) ABSTRACT

A head protection system comprises a helmet shell, a visor mounting for pivotally mounting a visor to the shell to enable the visor to be moved between raised and lowered positions, and a retainer for releasably retaining the visor to the helmet. The system includes a visor adapted for mounting on the shell which comprises a substrate of transparent thermoplastic material and a backing substrate comprising a plurality of layers of high performance, ballistic resistant material. The system may further include a second visor which can be releasably connected to the shell using the same visor mounting and which may have a different construction and primary function.

21 Claims, 56 Drawing Sheets

U.S. PATENT DOCUMENTS

| | | | |
|---|---|---|---|
| 3,082,427 A | 3/1963 | Zbikowski | |
| 3,495,273 A | 2/1970 | Aileo | |
| 3,573,150 A | 3/1971 | Broutman et al. | |
| 3,636,565 A | 1/1972 | Luisada et al. | |
| 3,789,427 A | 2/1974 | Aileo | |
| 3,858,242 A | 1/1975 | Gooding | |
| 4,023,210 A | 5/1977 | Hanson | |
| 4,047,249 A | 9/1977 | Booth | |
| 4,326,303 A | 4/1982 | Rappleyea | |
| 4,445,253 A | 5/1984 | Howey | |
| 4,475,248 A * | 10/1984 | L'Abbe et al. | 2/2.5 |
| 4,498,202 A | 2/1985 | Yamamoto | |
| 4,546,498 A | 10/1985 | Fantin | |
| 4,718,127 A | 1/1988 | Rittmann et al. | |
| 4,729,132 A | 3/1988 | Fierro | |
| 4,817,596 A | 4/1989 | Gallet | |
| 4,847,920 A * | 7/1989 | Aileo et al. | 2/424 |
| 4,887,320 A | 12/1989 | Long et al. | |
| 5,347,660 A | 9/1994 | Zide et al. | |
| 5,357,409 A | 10/1994 | Glatt | |
| 5,603,117 A | 2/1997 | Hudner et al. | |
| 5,747,159 A | 5/1998 | Labock | |
| 5,765,235 A | 6/1998 | Arnold | |
| 6,012,178 A | 1/2000 | Schuster et al. | |
| 6,101,916 A | 8/2000 | Panot et al. | |
| 6,298,498 B1 * | 10/2001 | Burns et al. | 2/424 |
| 6,387,477 B1 | 5/2002 | Ogura et al. | |
| 6,438,763 B2 | 8/2002 | Guay et al. | |
| 6,622,313 B1 | 9/2003 | Choi et al. | |
| 2001/0030630 A1 | 10/2001 | Junk | |
| 2002/0148032 A1 | 10/2002 | Basson et al. | |

FOREIGN PATENT DOCUMENTS

| | | |
|---|---|---|
| DE | 729 240 C | 12/1942 |
| DE | 31 45 106 | 5/1983 |
| DE | 32 44 152 | 5/1984 |
| DE | 85 14 219 | 6/1985 |
| DE | 86 33 539 | 4/1987 |
| DE | 90 15 739 | 2/1991 |
| DE | 94 18 835 | 1/1995 |
| EP | 0 291 308 | 11/1988 |
| EP | 0 294 676 | 12/1988 |
| EP | 0 412 205 | 2/1991 |
| EP | 0 818 156 | 1/1998 |
| EP | 0 997 087 | 5/2000 |
| EP | 1 069 370 | 1/2001 |
| EP | 1 166 666 | 1/2002 |
| FR | 2 607 237 | 5/1988 |
| FR | 2 706 257 | 12/1994 |
| FR | 2 716 348 | 8/1995 |
| FR | 2 759 869 | 9/1998 |
| FR | 2 785 505 | 5/2000 |
| GB | 539 577 | 9/1941 |
| GB | 1 018 928 | 2/1966 |
| GB | 2 370 972 | 7/2002 |
| WO | WO 95/10955 | 4/1995 |
| WO | WO 95/11473 | 4/1995 |
| WO | WO 95/28100 | 10/1995 |
| WO | WO 03/096832 | 11/2003 |

* cited by examiner

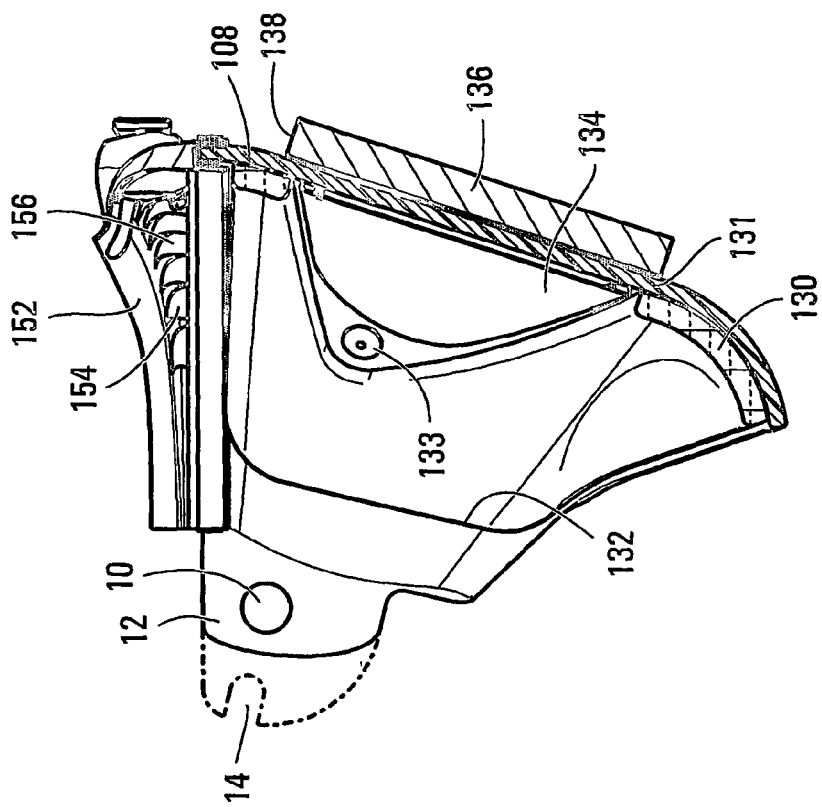
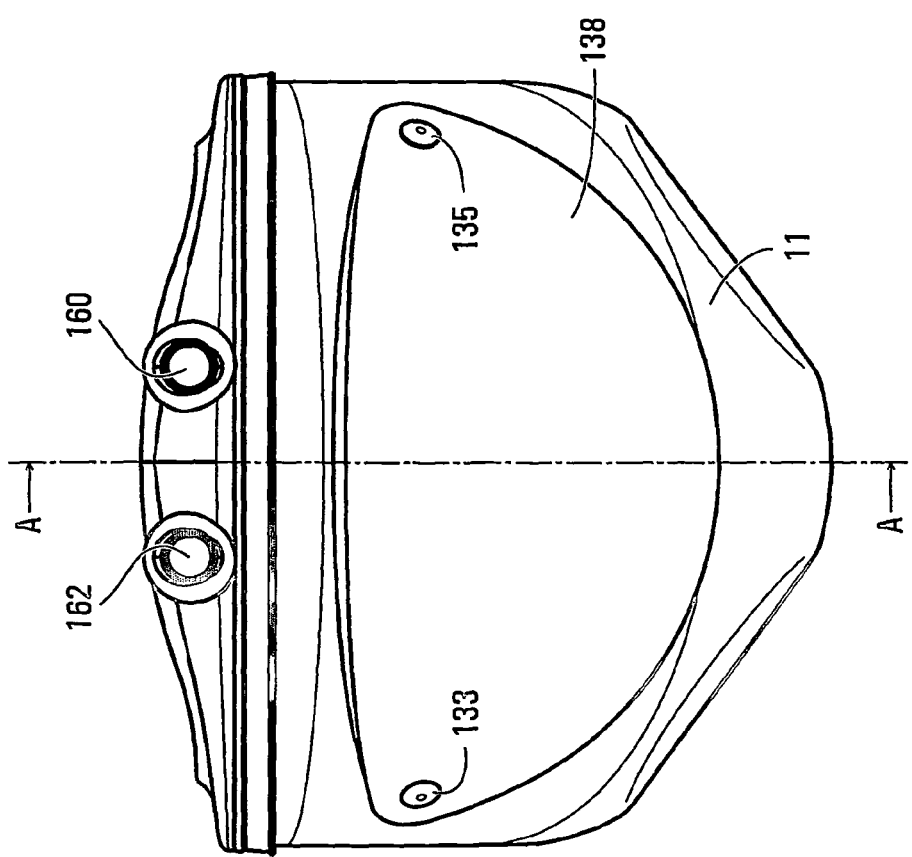
FIG. 2C
FIG. 2B

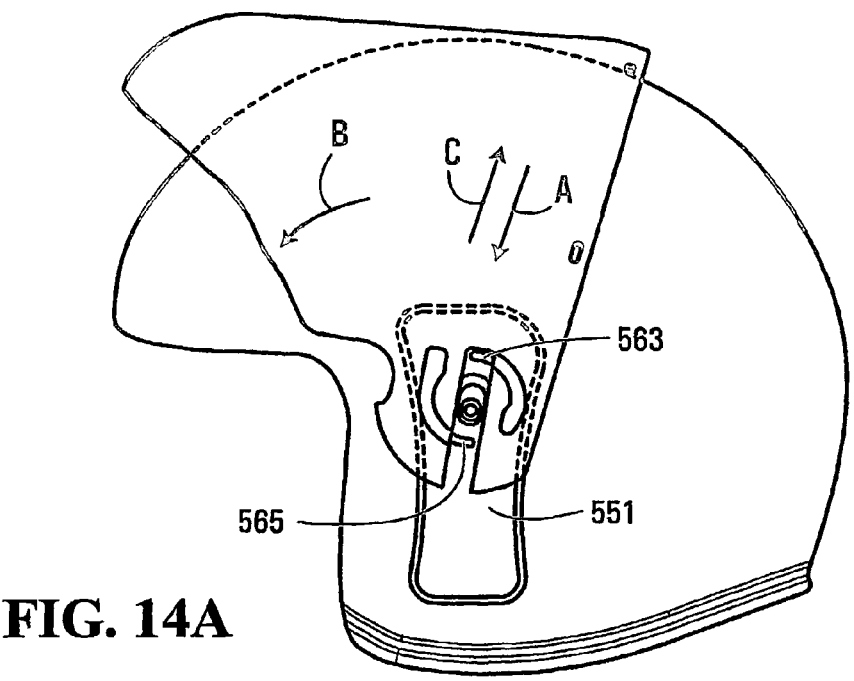
FIG. 14A
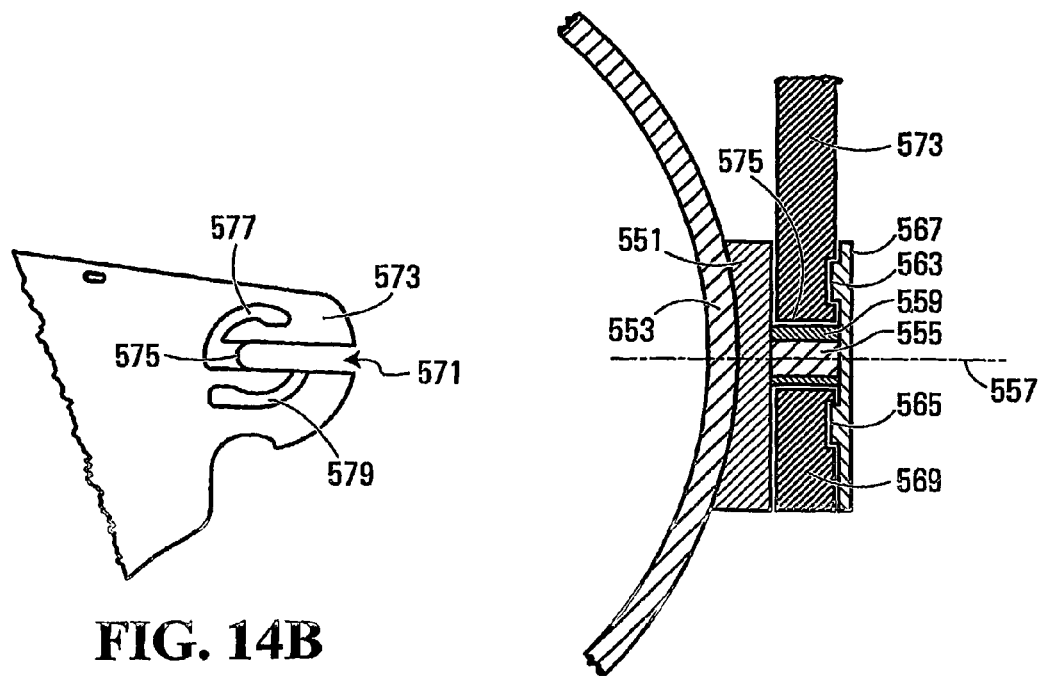
FIG. 14B
FIG. 14C

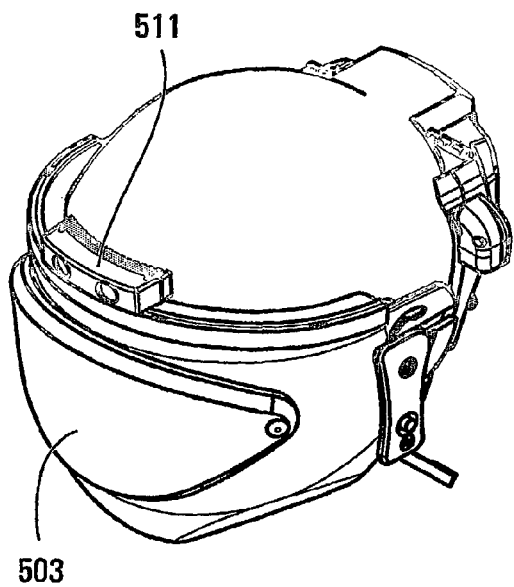
FIG. 15A.1
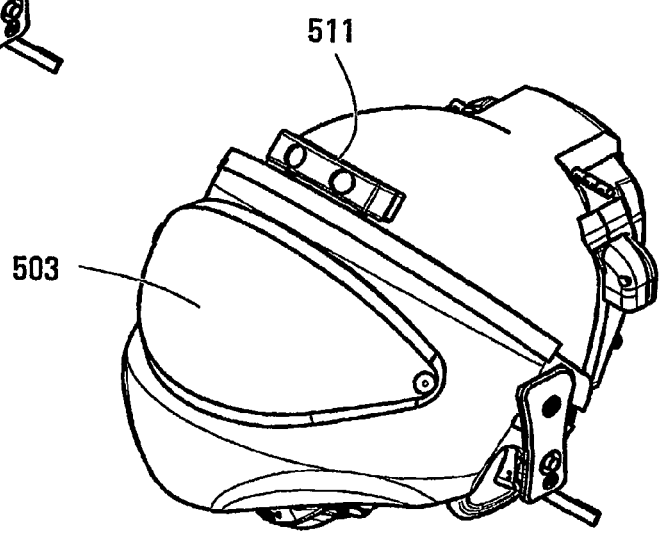
FIG. 15A.2
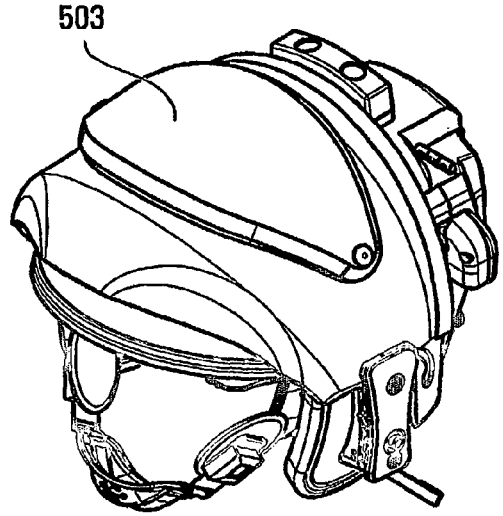
FIG. 15A.3

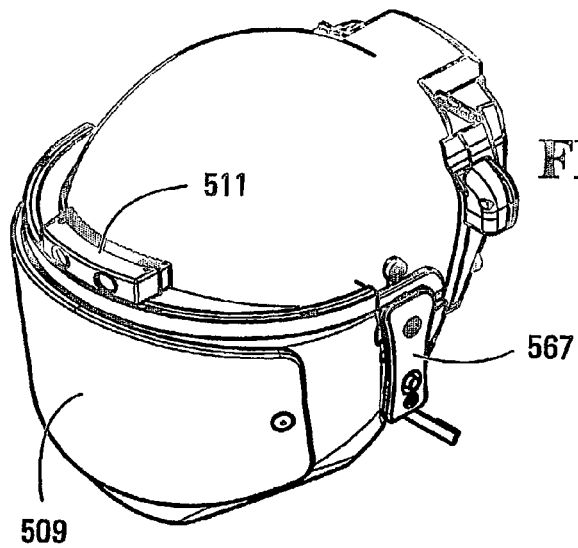
FIG. 16.1
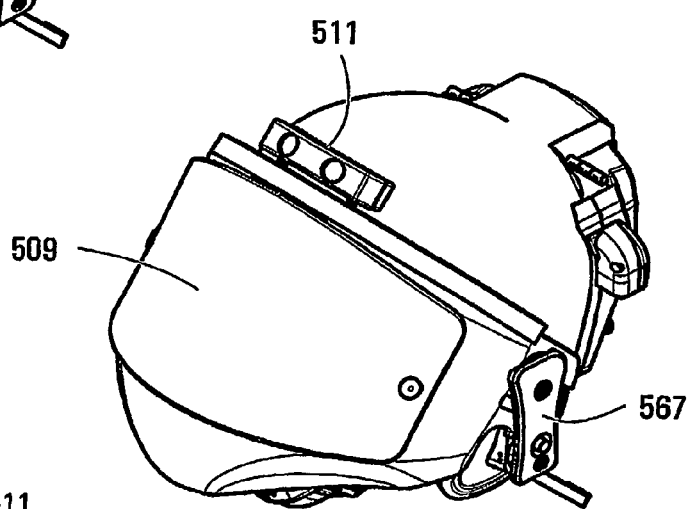
FIG. 16.2
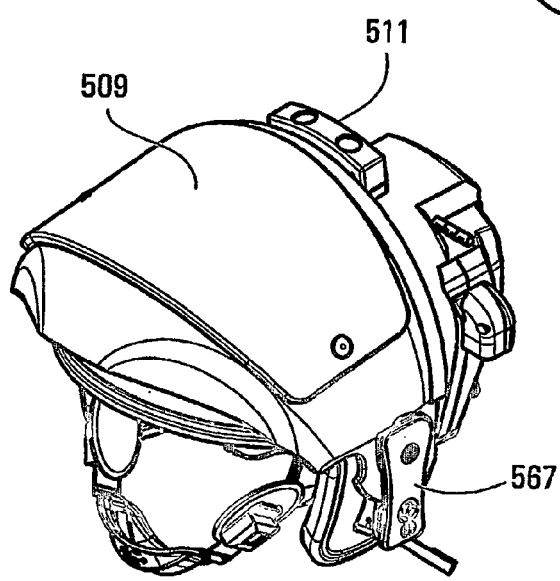
FIG. 16.3

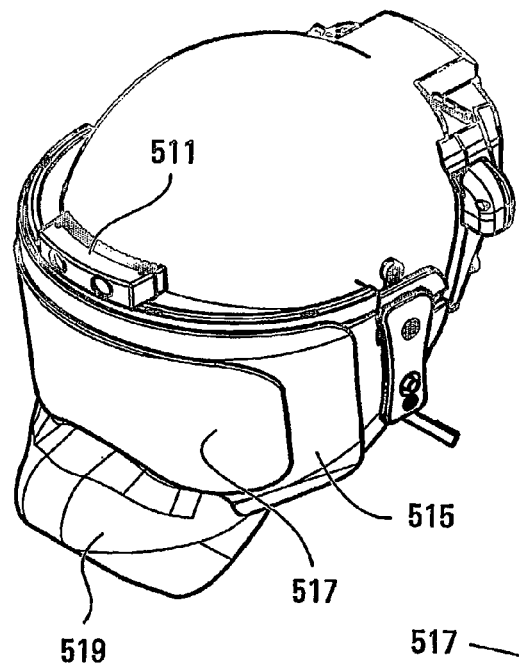
FIG. 17A.1
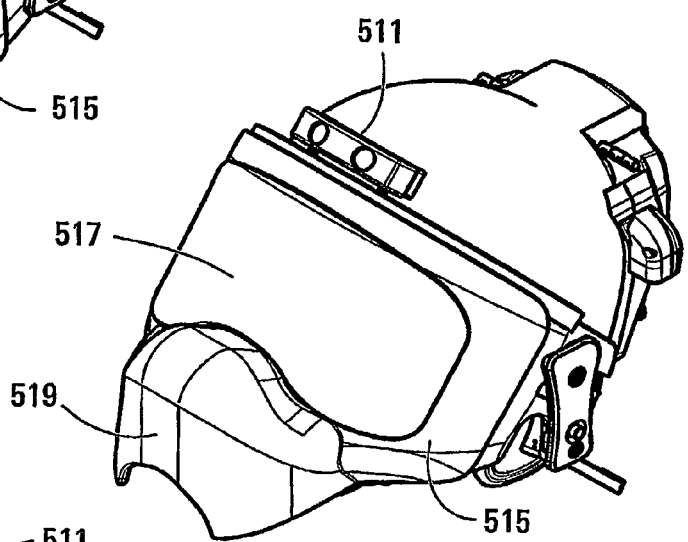
FIG. 17A.2
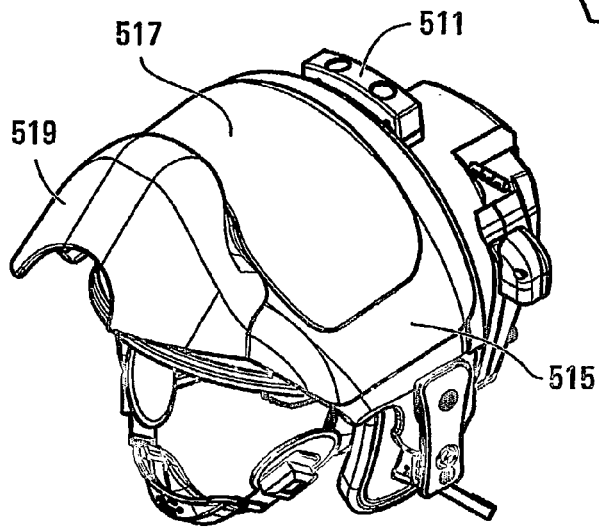
FIG. 17A.3

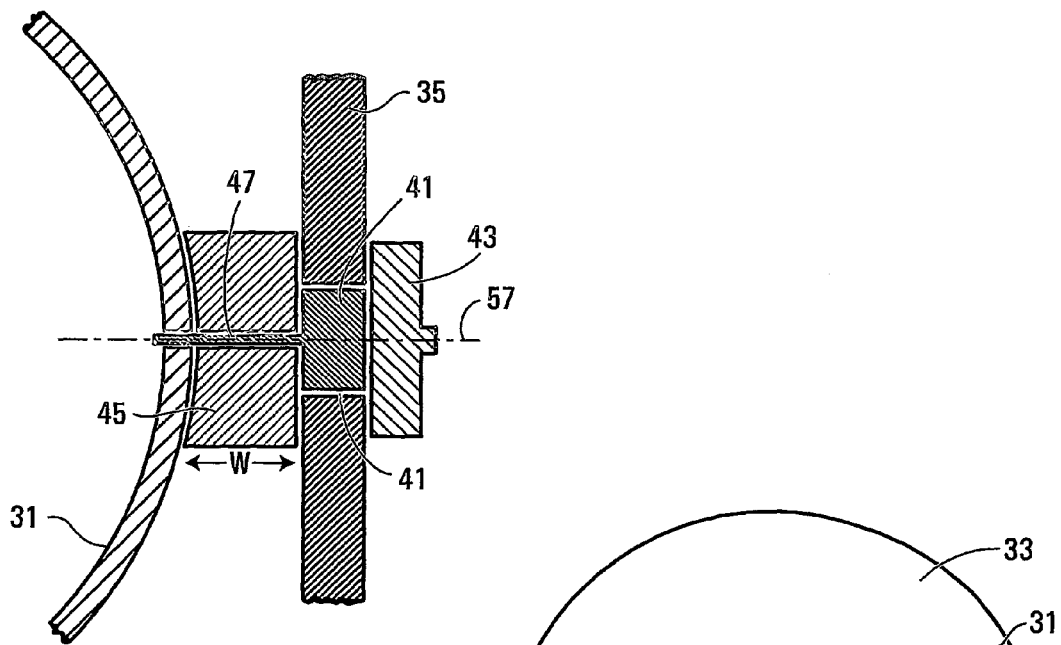
FIG. 21C
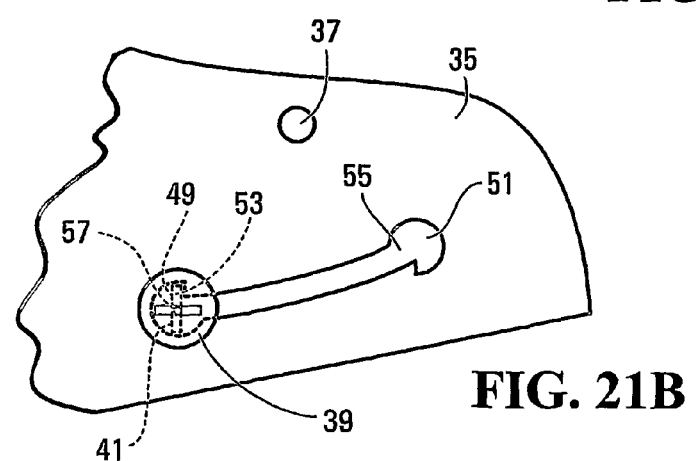
FIG. 21A
FIG. 21B

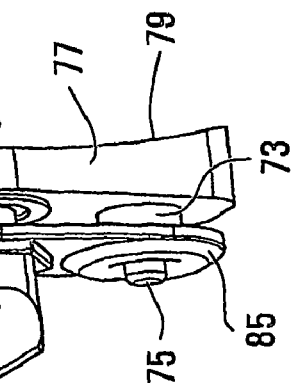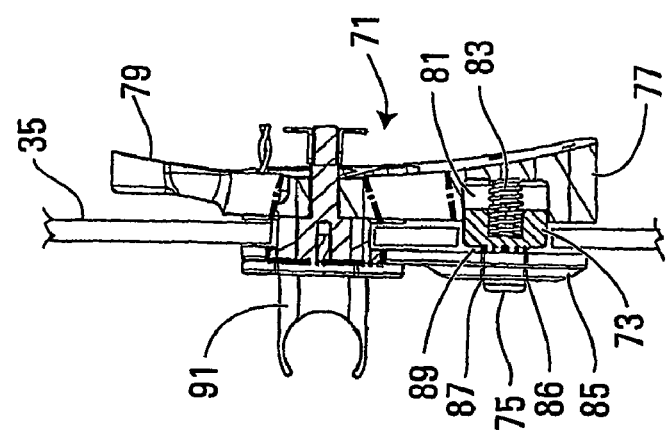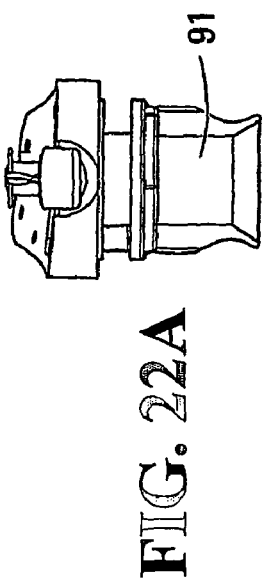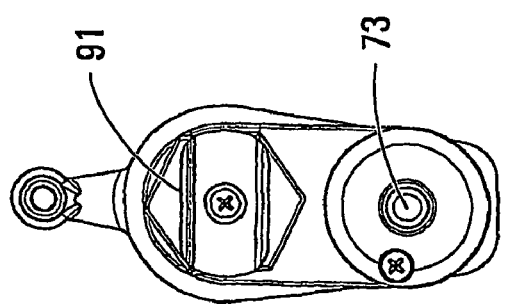
FIG. 22D
FIG. 22C
FIG. 22A
FIG. 22B

HEAD PROTECTOR

CROSS-REFERENCE TO RELATED APPLICATIONS

This application is the National Stage of International Application No. PCT/CA2004/000444, filed 29 Mar. 2004, which claims the benefit of U.S. provisional Application No. 60/457,927, filed 28 Mar. 2003 and U.S. provisional Application No. 60/520,641, filed 18 Nov. 2003, the disclosures of which are incorporated herein by reference in their entireties.

FIELD OF THE INVENTION

The present invention relates to head protectors and protective armour, and in particular but not limited to head protectors and armour for protecting personnel against blasts from explosives and other ordinance.

BACKGROUND OF THE INVENTION

A head protector is known which forms part of a protective system for protecting personnel engaged in dangerous activities such as bomb disposal and land mind sweeping. The head protector comprises a helmet of the closed face type, i.e. having a frontal aperture which is completely surrounded by the helmet shell. A specially formed is mounted on the helmet shell over the frontal opening and is formed of acrylic which is capable of the standing high energy forces from sharp fragments without shattering. The helmet is covered in multiple layers of ballistic resistant material to increase the level of protection provided by the helmet. A ventilation hose is attached to the rear of the helmet, the end of which houses an electrically operated fan for providing ventilation air into the interior of the helmet. The hose and electrical fan combination also provide a counterweight to balance the weight of the visor at the front of the helmet to bring the centre of gravity of the helmet nearer its centre. The visor is securely fastened to the helmet by fasteners positioned at the top and bottom of the helmet opening.

SUMMARY OF THE INVENTION

According to one aspect of the present invention, there is provided a head protection system comprising a helmet shell, mounting means on the shell for pivotally mounting a visor thereto to permit the visor to be moved between raised and lowered positions, retaining means for releasably retaining a visor on the mounting means, and a visor being adapted for mounting on said mounting means and comprising a construction such that at least a portion of the visor has a V-50 impact rating of 600 meters per second or more using the test standard MIL-STD-662F (MIL-STD-662F 18December. 1997 Department of Defense Test Method Standard: V50 Ballistic Test for Armor) using a 0.22 mm projectile defined in MIL-P-46593A (MIL-P-46593A (ORD) 12 October. 1964 Military Specification: Projectile, Calibers .22, .30, .50 and 20 MM Fragment-Simulating).

The test referred to above is the MIL-STD-662F Department of Defence Test Method Standard. The projectile used in the tests is defined in the MIL-P-46593A (ORD) Military Specification: Calibers .22, .30, .50 and 22 mm Fragment-Simulating Projectile. The test defined above uses only the .22 caliber projectile which is also referred to as the 17 grain (CN) Chisel Nose (FSP) Fragment Simulating Projectile.

Advantageously, this arrangement provides a protective system for protection against explosive ordinance and which also allows the visor to be raised to an position for increased ventilation and convenience when the protective visor is not required. This arrangement also allows the visor to be removed and replaced by another visor having a different function.

In one embodiment, the visor may comprise a plurality of layers of high performance ballistic resistant material within its construction to prevent penetration to a wearer of sharp high energy fragments.

The viewing portion of the visor may include a layer of acrylic material which has a high energy absorption capacity, and in one embodiment, the acrylic layer may have a thickness of between 0.5 to ⅝ of an inch. The visor may also comprise a substrate layer of polycarbonate which, in one embodiment may have a thickness of between ⅜ and ¼ inches. The V-50 rating of the acrylic layer may range from 600 to 800 meters per second, and the V-50 rating of the polycarbonate and backing layer of ballistic resistant material may have a V-50 rating of more than 600 meters per second, and the rating may be 700 meters per second or more.

According to another aspect of the present invention, there is provided a head protection system comprising a helmet shell, mounting means on the shell for pivotally mounting a visor thereto to enable the visor to be moved between raised and lowered positions, retaining means for releasably retaining a visor on the mounting means, and a visor adapted for mounting on said mounting means and comprising a layer of transparent material, and a plurality of layers of ballistic resistant material.

According to another aspect of the present invention, there is provided a helmet comprising a shell and mounting means for pivotally mounting a shield member to said shell for movement between a first position and a second position relative to said shell, and a locking system for locking said shield member in at least one of said first and second positions, and comprising a lock for preventing movement of said shield member relative to said shell and a manually accessible, depressible member adapted to release said lock on depression thereof, thereby allowing said shield member to move from the respective first or second position.

According to another aspect of the present invention, there is provided protective armour comprising a layer of a plastic, transparent material, a plurality of layers of high performance material, said layers being bonded together to form a laminate, and securing means for securing said laminate to said layer of plastic transparent material.

According to another aspect of the present invention, there is provided a visor for a helmet comprising a layer of plastic transparent material, a plurality of layers of high performance material, said layers being bonded together to form a laminate and securing means for securing said laminate to a portion of the surface of said plastic transparent material.

According to another aspect of the present invention, there is provided a process for forming protective armour comprising the steps of providing a layer of plastic transparent material, forming a laminate comprising a plurality of layers of high performance material and securing said laminate to said layer of plastic transparent material.

According to another aspect of the present invention, there is provided a helmet comprising a shell, a strap guide mounted on each side of the helmet in a position for supporting a strap for passing under the chin of a wearer, when in use, a strap which passes through and between each strap guide such that the portion of said strap between said strap guides form a chin strap, a support member coupled to the rear of said shell to allow relative movement between said support member and said shell and for engaging a portion of the head or neck of a wearer, when in use, said strap extending from each strap guide to said support member, and a pull member extending from a position between said support member and said strap guides and which is arranged to cause the length of said strap extending from said support member through said strap guides to shorten when said pull member is pulled.

According to another aspect of the present invention, there is provided a retention system for a helmet comprising first and second strap guides for mounting on each side of the helmet in a position for supporting a strap for passing under the chin of a wearer, when in use, a strap which passes through and between each strap guide, the portion of said strap between said strap guides forming a chin strap, a support member for movably coupling to the rear of said helmet for engaging a portion of the head or neck of a wearer when in use, said strap extending from each strap guide to said support member, and pull members extending from said support member and which are arranged to cause the length of said strap extending from said support member through said strap guides to shorten when said pull members are pulled.

According to another aspect of the present invention, there is provided a helmet comprising a shell, an electrically powered system for assisting a wearer, and a power controller for controlling the power delivered to said system, wherein said power controller is releasably mounted to said shell.

According to another aspect of the present invention, there is provided a helmet comprising a shell, a visor having a moisture reducing means treatment on the surface thereof facing the interior of the shell, and electrically powered means for providing ventilation air to the interior of said helmet, said electrically powered means being mounted to said helmet.

According to another aspect of the present invention, there is provided a control unit for controlling an electrically powered system for a helmet, the control unit having securing means for releasably securing the control unit to a helmet.

According to another aspect of the present invention, there is provided a helmet comprising a shell, a shield member and coupling means for coupling the shield member to the shell and permitting movement of said shield member relative to said shell, and shock absorption means coupled to said coupling means and arranged to permit movement of said shield member relative to said shell independently of said coupling means.

According to another aspect of the present invention, there is provided a helmet comprising a shell and a shield member coupled to said shell for movement between a first position and a second position relative to said shell, and a locking system for locking said shield member in at least one of said first and second positions and comprising a rotary cam mounted on said shell, an aperture formed in said shield member and an opening in the side of said aperture for receiving said cam into said aperture, said aperture permitting rotation of said cam when located in said aperture to a position which prevents movement of said cam from said aperture through said opening.

According to another aspect of the present invention, there is provided a protective system comprising a protective helmet, at least one electrically operated device mounted to said helmet, a controller for controlling said device from a location remote from said helmet, means for transmitting control signals from said controller to said device, wherein said controller includes fastening means for fastening the controller to a part of a wearer's body so that, in use, the second controller is visible to the wearer.

According to another aspect of the present invention, there is provided a protective system comprising a helmet, at least one electrically operated device mounted to said helmet, a controller for controlling said device from a location remote from said helmet, means for transmitting control signals from said controller to said device, and wherein said controller includes visual indicating means responsive to a condition associated with at least one of said helmet and said controller.

According to another aspect of the present invention, there is provided a protective system comprising a helmet, at least one electrically operated device mounted to said helmet, a monitor for monitoring said device from a location remote from said helmet and means for transmitting signals from said device to said monitor.

According to another aspect of the present invention, there is provided a protective system comprising a helmet, at least one electrically operated device mounted to said helmet, means for at least one of controlling said device and monitoring said device from a location remote from said helmet, means for transmitting signals from at least one of said controller and said device to the other of said controller and said device, and a retainer mounted on the clothing of a wearer for retaining said controller.

According to another aspect of the present invention, there is provided a protective system comprising a helmet, at least one electrically device mounted to said helmet and a source of electrical energy mounted to said helmet and arranged to drive said electrically operated device.

According to another aspect of the present invention, there is provided a protective helmet having a side portion which covers the ear of a user, and a microphone positioned on said side portion.

According to another aspect of the present invention, there is provided a head protector comprising a helmet shell having a head cavity therein, a liner for lining said head cavity, wherein at least one of the liner and the shell includes at least one retainer for slidably receiving a packing member for adjusting the size of the head cavity.

According to another aspect of the present invention, there is provided a head protector comprising a helmet shell and a shield, and coupling means for slidably engaging and disengaging the shield to and from the helmet shell.

According to another aspect of the present invention, there is provided a head protector comprising a helmet and a retainer for retaining the helmet on the head of a wearer wherein the retainer includes means extending from the helmet for supporting a connector either side of the helmet, each connector being adapted to releasably and interchangeably connect one of a chin cup and an under-the-jaw strap thereto.

According to another aspect of the present invention, there is provided a protective system comprising a helmet and a plurality of visors which can be interchangeably connected to the helmet and coupling means for coupling each visor to the helmet.

According to another aspect of the present invention, there is provided a helmet having a retainer including a nape support, the nape support being connected to the helmet by first and second straps which extend at an angle and transversely from a common region of the nape.

According to another aspect of the present invention, there is provided a helmet having a retainer including a nape support and an adjustable strap for tightening the retainer about the head of a wearer, wherein the adjustable strap is connected to extend downwardly, and optionally sideways from the nape support.

According to another aspect of the present invention, there is provided a chin cup for a retention system, comprising a chin pad, having an upper portion and a lower portion, and a first strap positioned adjacent said upper portion and a second strap positioned adjacent said lower portion.

According to one aspect of the present invention, there is provided a helmet comprising a shell, a shield member and coupling means for coupling the shield member to the shell and permitting movement of said shield member relative to said shell, and shock absorption means coupled to said coupling means and arranged to permit movement of said shield member relative to said shell independently of said coupling means.

According to another aspect of the present invention, there is provided a helmet comprising a shell and a shield member coupled to said shell for movement between a first position and a second position relative to said shell, and a locking system for locking said shield member in at least one of said first and second positions and comprising a rotary cam mounted on said shell, an aperture formed in said shield member and an opening in the side of said aperture for receiving said cam into said aperture, said aperture permitting rotation of said cam when located in said aperture to a position which prevents movement of said cam from said aperture through said opening.

According to another aspect of the present invention, there is provided a helmet comprising a shell and a shield member coupled to said shell for movement between a first position and a second position relative to said shell, and a locking system for locking said shield member in at least one of said first and second positions, and comprising a lock for preventing movement of said shield member relative to said shell and a manually accessible, depressible member adapted to release said lock on depression thereof, thereby allowing said shield member to move from the respective first or second position.

According to another aspect of the present invention, there is provided protective armour comprising a layer of a plastic, transparent material, a plurality of layers of high performance material, said layers being bonded together to form a laminate, and securing means for securing said laminate to said layer of plastic transparent material.

According to another aspect of the present invention, there is provided a visor for a helmet comprising a layer of plastic transparent material, a plurality of layers of high performance material, said layers being bonded together to form a laminate and securing means for securing said laminate to a portion of the surface of said plastic transparent material.

According to another aspect of the present invention, there is provided a process for forming protective armour comprising the steps of providing a layer of plastic transparent material, forming a laminate comprising a plurality of layers of high performance material and securing said laminate to said layer of plastic transparent material.

According to another aspect of the present invention, there is provided a helmet comprising a shell, a strap guide mounted on each side of the helmet in a position for supporting a strap for passing under the chin of a wearer, when in use, a strap which passes through and between each strap guide such that the portion of said strap between said strap guides form a chin strap, a support member coupled to the rear of said shell to allow relative movement between said support member and said shell and for engaging a portion of the head or neck of a wearer, when in use, said strap extending from each strap guide to said support member, and a pull member extending from a position between said support member and said strap guides and which is arranged to cause the length of said strap extending from said support member through said strap guides to shorten when said pull member is pulled.

According to another aspect of the present invention, there is provided a retention system for a helmet comprising first and second strap guides for mounting on each side of the helmet in a position for supporting a strap for passing under the chin of a wearer, when in use, a strap which passes through and between each strap guide, the portion of said strap between said strap guides forming a chin strap, a support member for movably coupling to the rear of said helmet for engaging a portion of the head or neck of a wearer when in use, said strap extending from each strap guide to said support member, and pull members extending from said support member and which are arranged to cause the length of said strap extending from said support member through said strap guides to shorten when said pull members are pulled.

According to another aspect of the present invention, there is provided a helmet comprising a shell, an electrically powered system for assisting a wearer, and a power controller for controlling the power delivered to said system, wherein said power controller is releasably mounted to said shell.

According to another aspect of the present invention, there is provided a helmet comprising a shell, a visor having a moisture reducing treatment on the surface thereof facing the interior of the shell, and electrically powered means for providing ventilation air to the interior of said helmet, said electrically powered means being mounted to said helmet.

According to another aspect of the present invention, there is provided a control unit for controlling an electrically powered system for a helmet, the control unit having securing means for releasably securing the control unit to a helmet.

BRIEF DESCRIPTION OF THE DRAWINGS

Examples of embodiments of the present invention will now be described with reference to the drawings, in which:

FIG. 2B shows a front view of the visor of FIG. 2A;

FIG. 2C shows a cross-sectional view of the visor of FIG. 2A along the line A-A;

FIGS. 13A to 13C show a head protection system according to an embodiment of the invention, in which FIG. 13A shows a perspective view of a helmet with EOD visor, FIG. 13B shows a perspective view of a recognisance visor, and FIG. 13C shows a perspective view of a CBRN visor;

FIG. 14A shows a side view of a helmet and visor mounting system according to an embodiment of the invention;

FIG. 14B shows a side view of a view of a wing or side portion of a visor for connection with the helmet of FIG. 14A;

FIG. 14C shows a cross-sectional view through the mounting system of FIG. 14A;

FIGS. 15A to 15F show various views of a protective helmet according to an embodiment of the present invention, with an EOD visor;

FIG. 16 shows various perspective views of a helmet according to another embodiment of the present invention, including a search visor;

FIGS. 17A to 17D show various views of a helmet according to another embodiment of the present invention having a CBN visor;

FIG. 21A shows a side view of a helmet according to an embodiment of the present invention;

FIG. 21B shows an enlarged view of a locking mechanism of the embodiment shown in FIG. 21A;

FIG. 21C shows a cross sectional view through a locking mechanism of FIG. 21B;

FIGS. 22A to 22D show various views of a locking system according to another embodiment of the present invention;

DESCRIPTION OF EMBODIMENTS

FIGS. 1 to 7 show a reconfigurable, multifunctional head protection system according to a first embodiment of the present invention, comprising a helmet, a first visor for protection against explosions, a second visor for use with a face-mounted respirator, and a mounting arrangement for releasable mounting either of the two visors to the helmet.

Figure 1:
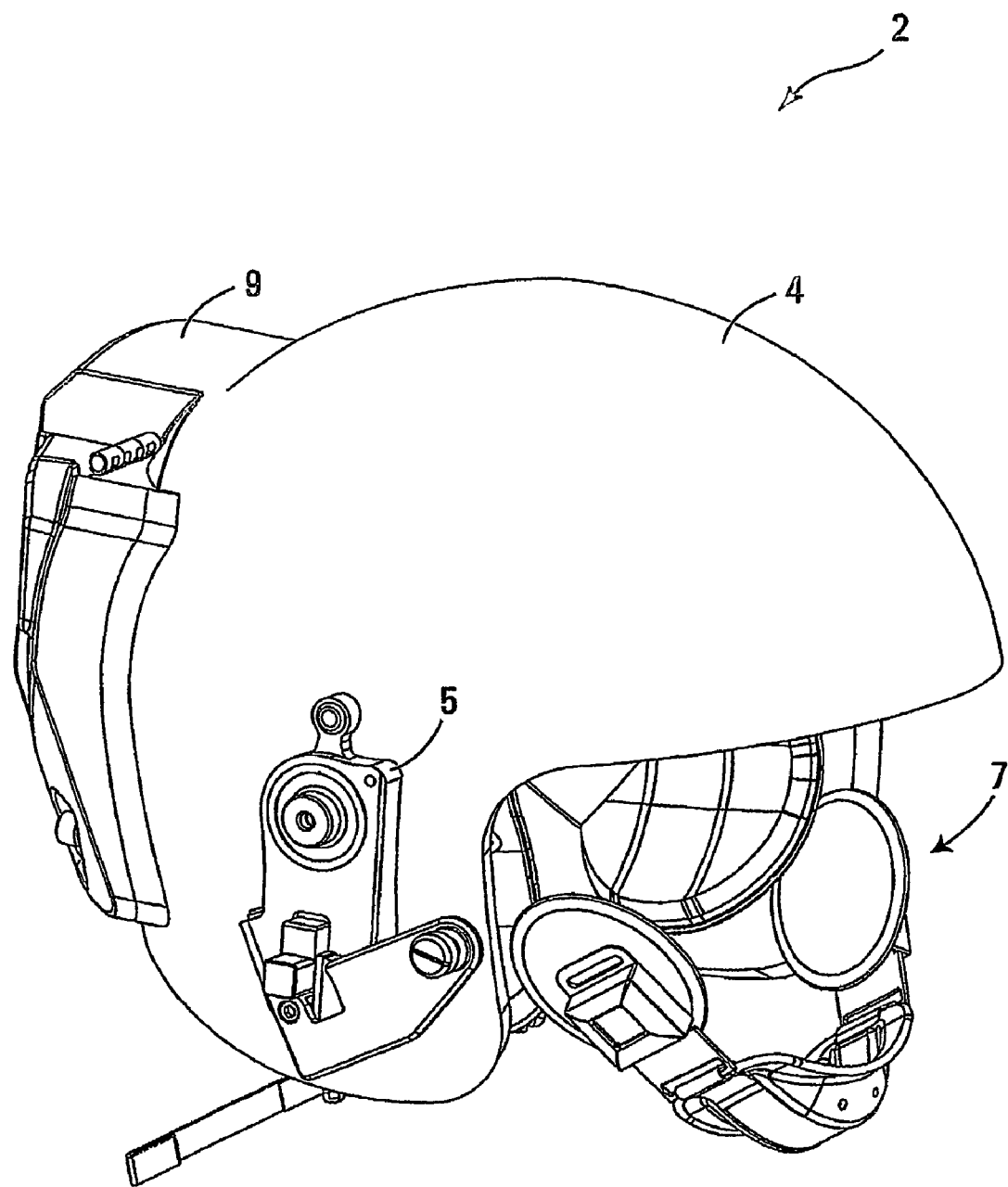
FIG. 1 shows a perspective view of a helmet according to an embodiment of the invention.

Referring to FIG. 1, the helmet 2 comprises a helmet shell 4, a visor mounting arrangement 5 disposed on each side of the shell (only one side shown), a helmet retention system 7 for securing the helmet to the head of a wearer, and a controller 9 at the back of the shell for controlling various devices associated with the helmet. Embodiments of the retention system and the controller will be described in more detail below.

The helmet shell is of the open-face type and constructed of a high impact resistant material to withstand explosive forces. For example, the shell may be formed of a composite material comprising bonded layers of ballistic resistant material or fabric, such as Kevlar, Dyneema, or other high performance, high tensile strength material.

Figure 2A:
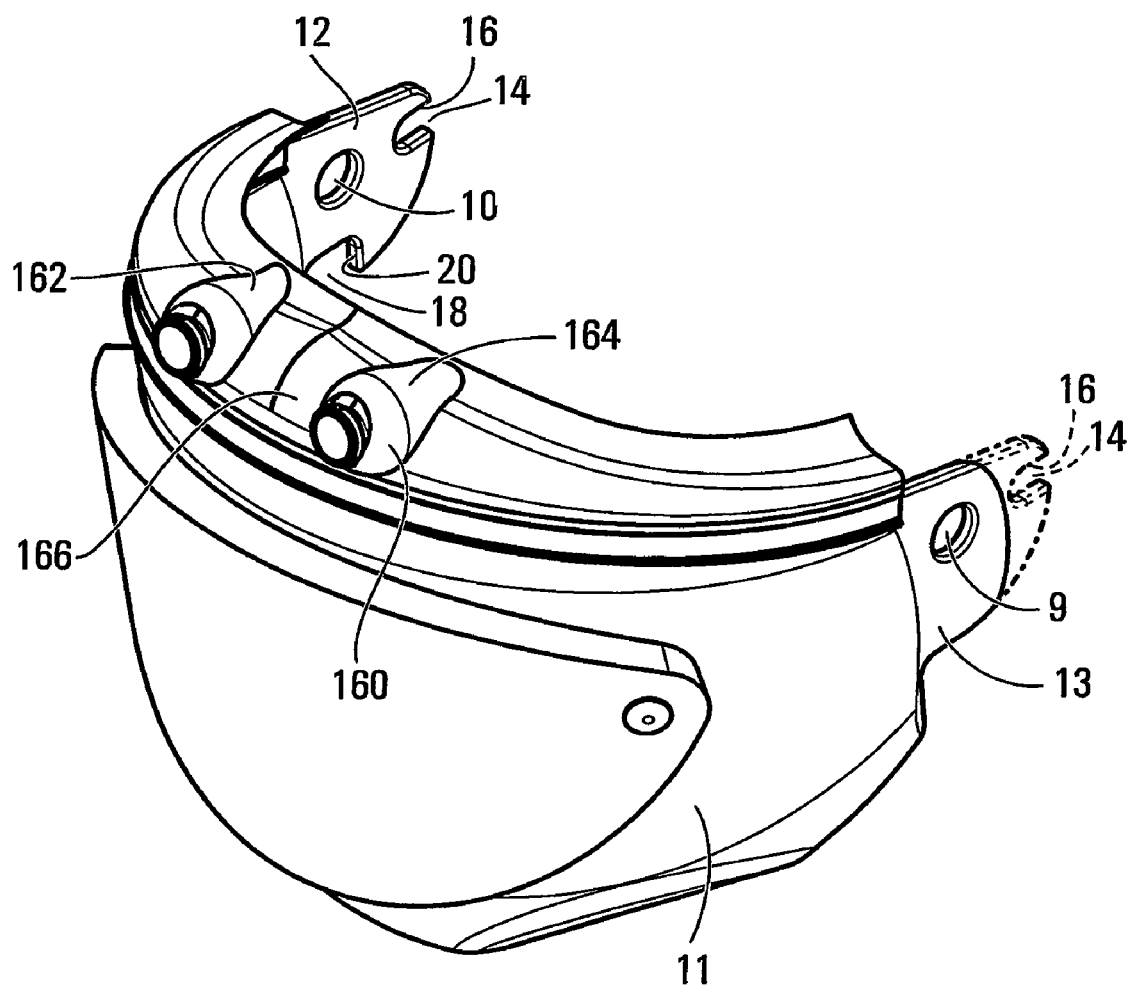
FIG. 2A shows a perspective view of a first visor for use with the helmet of FIG. 1, according to an embodiment of the invention.
Figure 3A:
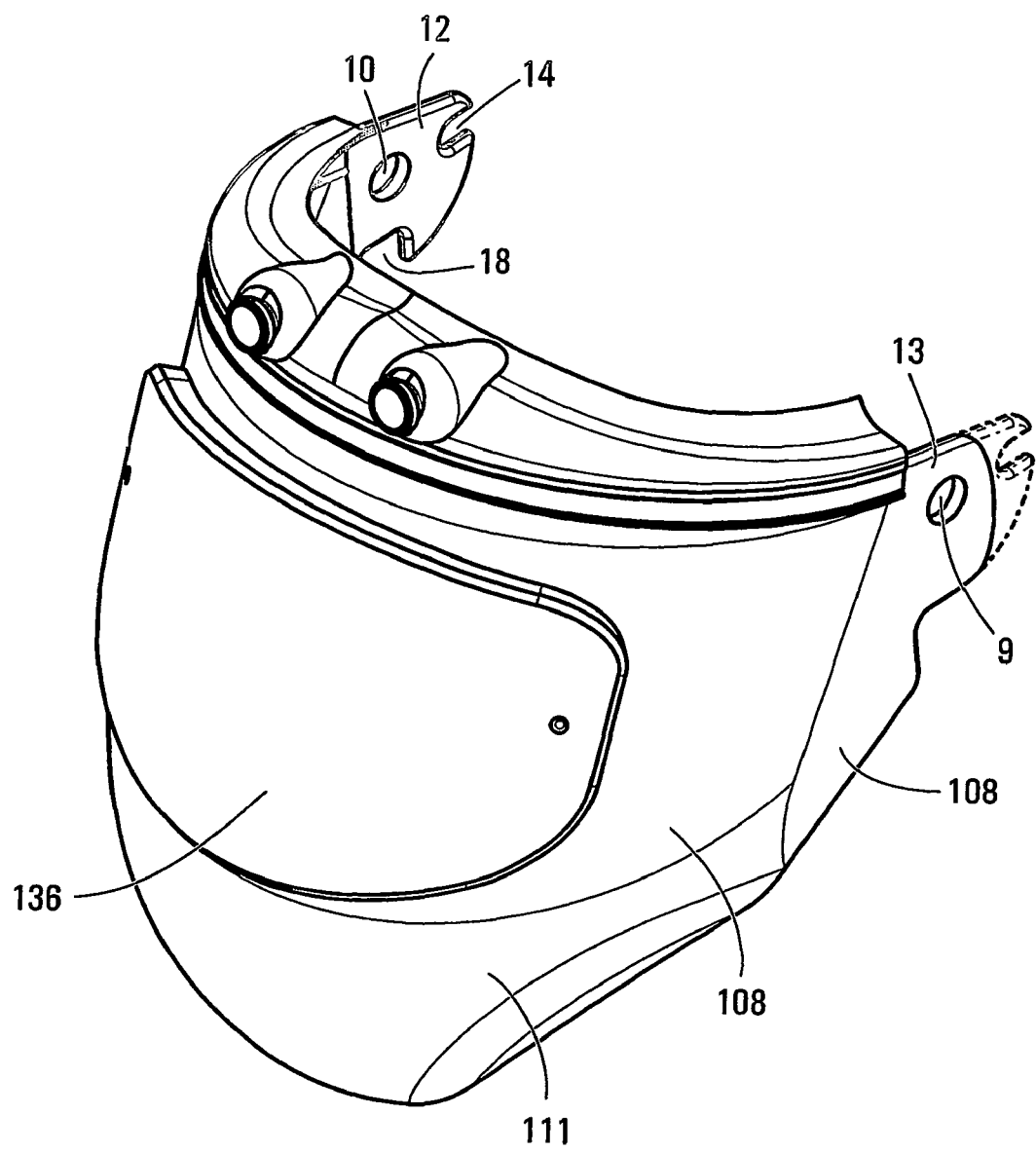
FIG. 3A shows a perspective view of a second visor for use with the helmet of FIG. 1, according to an embodiment of the invention.
Figure 3C:
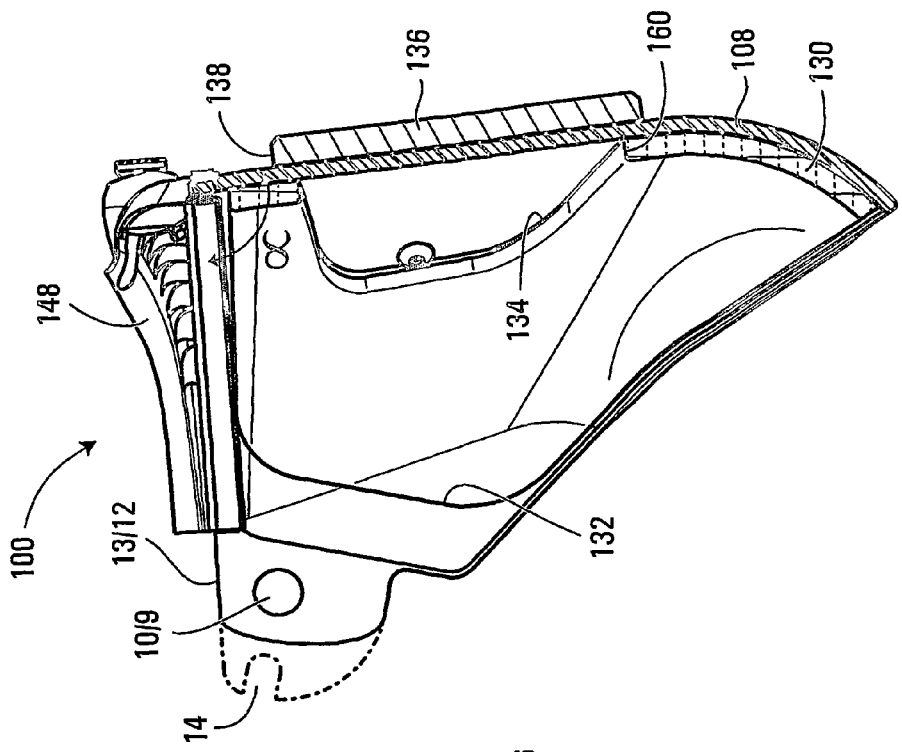
FIG. 3C shows a cross-sectional view of the visor of FIG. 3A along the line A-A.
Figure 3B:
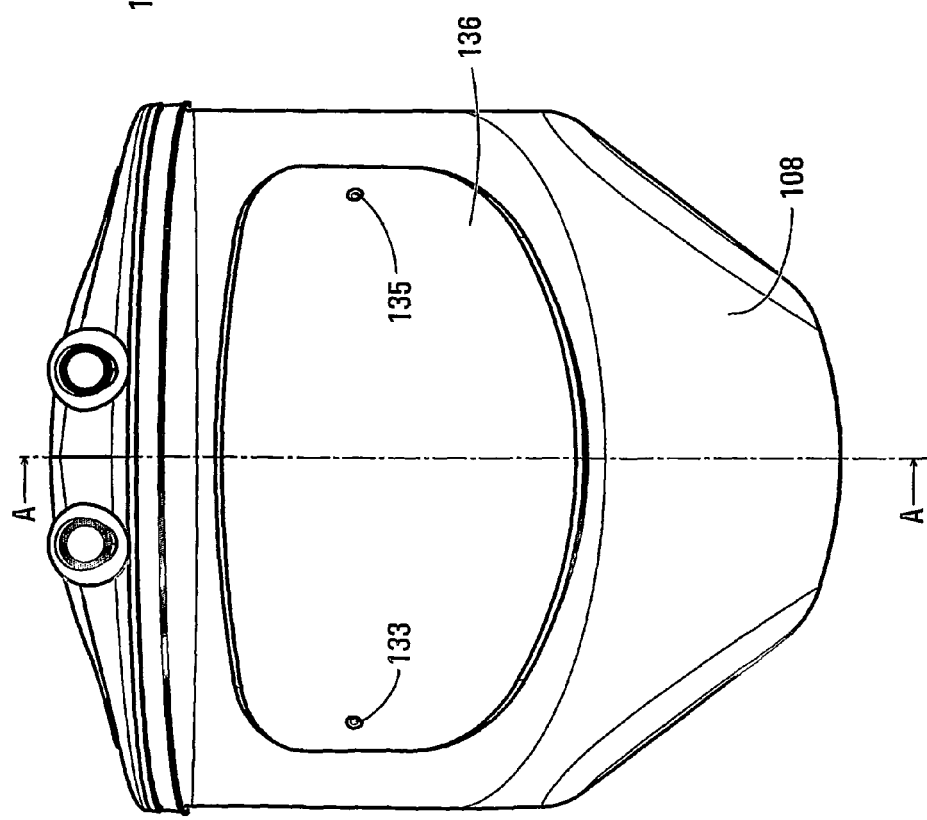
FIG. 3B shows a front view of the visor of FIG. 3A.

FIGS. 2A to 2C show a visor 6, which can be releasably mounted to the helmet, and whose primary purpose is to provide protection against explosions. This visor has particular application to bomb disposal, mine sweeping and similar hazardous activities. FIGS. 3A to 3C show a visor 106, which can also be releasably mounted to the helmet, and which offers both protection and is capable of accommodating a face-mounted respirator. This visor has particular application to activities in environments which may or have been contaminated, for example, by chemical, biological or nuclear agents.

The different visors capable of use with the same helmet shell considerably increase the versatility of the helmet over known helmets with dedicated fixed visors designed only for a single specific function. Advantageously, the visor mounting system allows each visor to be easily and quickly removed and replaced with another during operations, and without the need to remove the helmet from the wearer. The head protection system will now be described in more detail.

Figure 4A:
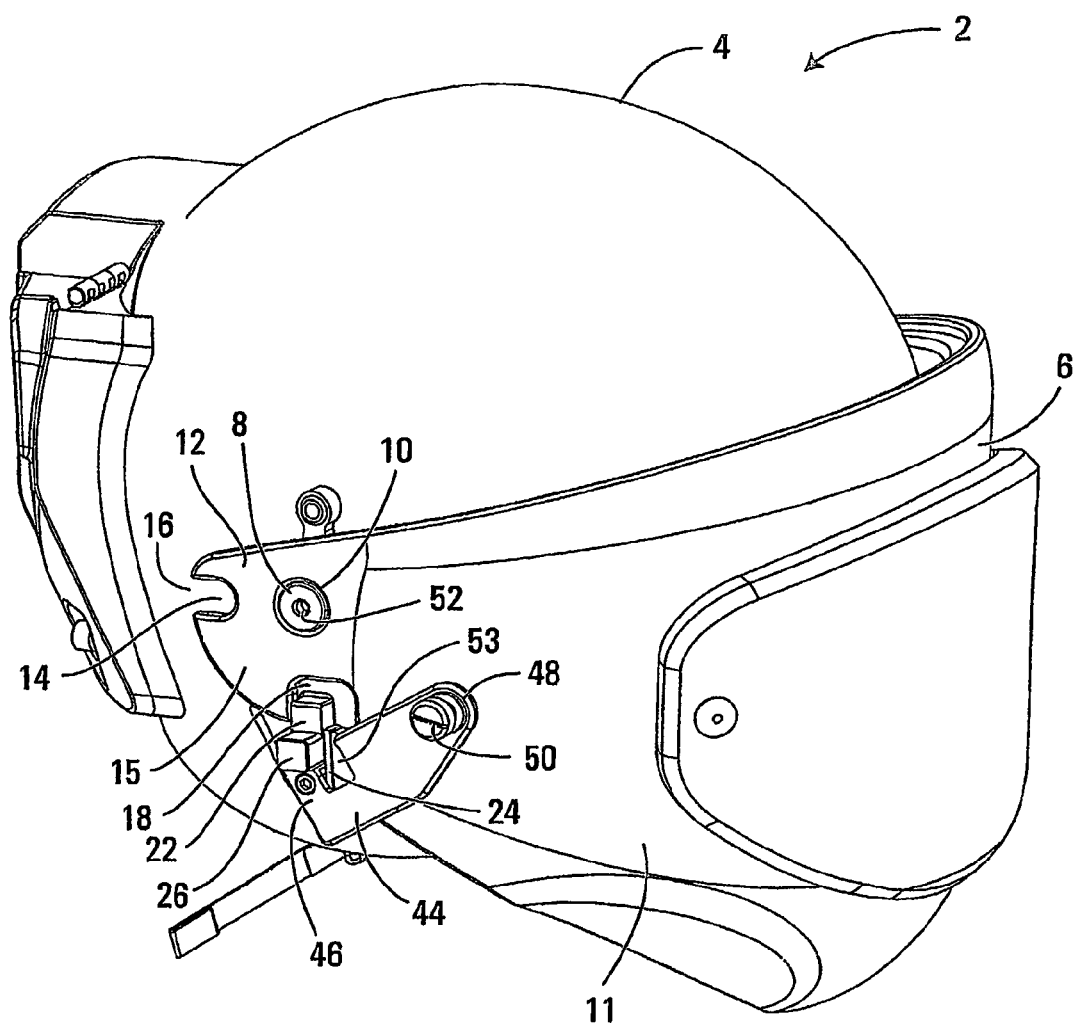
FIG. 4A shows a perspective view of the helmet of FIG. 1, with the visor of FIGS. 2A to 2C mounted thereto in a first orientation of the visor.
Figure 4B:
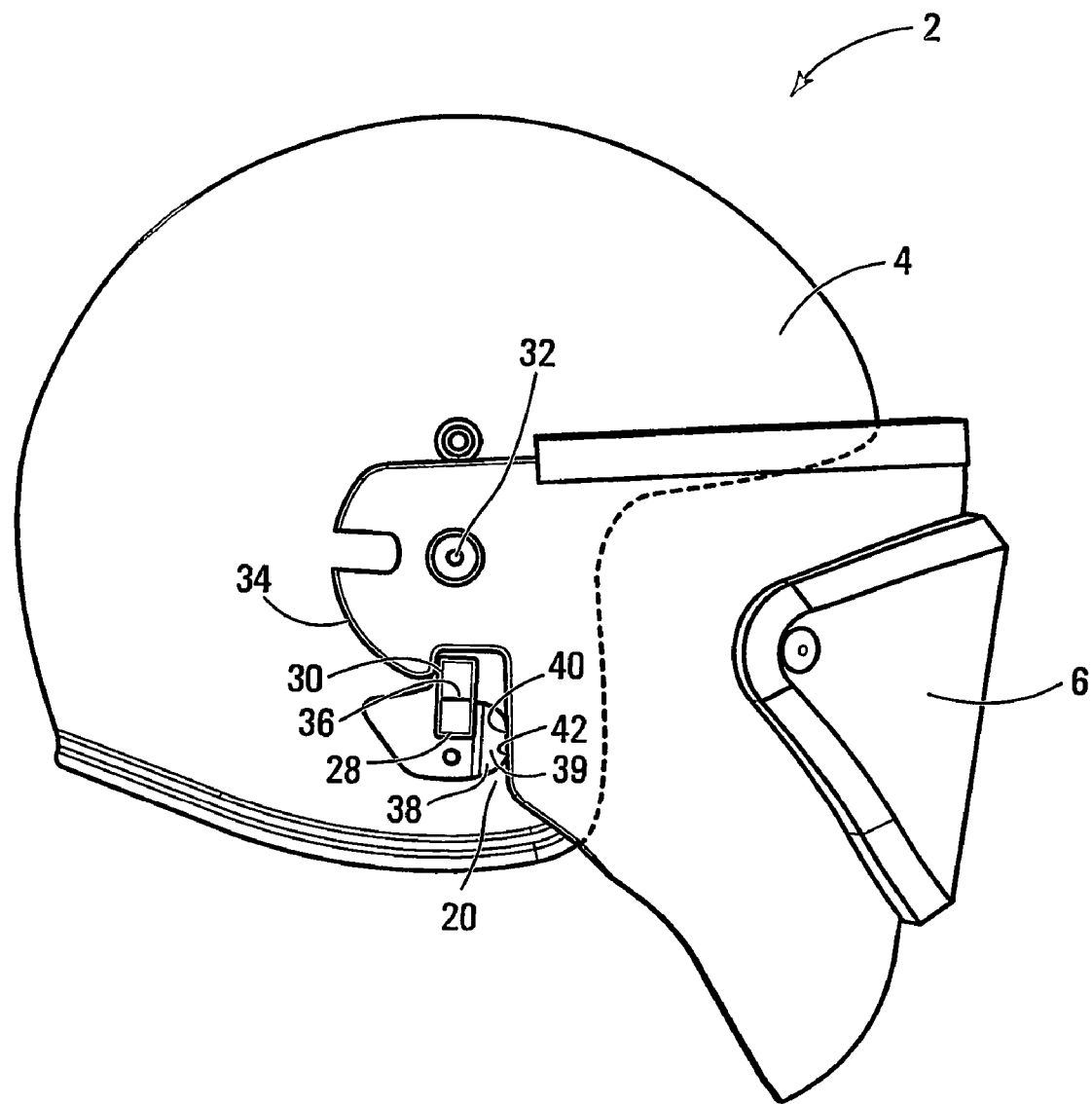
FIG. 4B shows a side view of the configuration shown in FIG. 4A.

FIGS. 4A and 4B show the first visor 6 mounted to the shell 4. The mounting system 5 includes a boss 8 extending outwardly from each side of the helmet. The visor has a curved front portion 11 and opposed side portions 12, 13 each having a circular aperture 10 in which a respective boss is received for pivotally mounting the visor to the helmet so that the visor can be moved between raised and lowered positions.

A first slot 14 having a rearward facing opening 16 and a second slot 18 having a downward facing opening 20 are also formed in the side portion 12 of the visor for enabling the visor to be locked in either a raised or lowered position.

A visor locking system 24 is mounted on the helmet and includes a depressible locking member 22 and a push button 26 coupled to and extending outwardly from a lower end of the locking member 22. The locking member 22 is biased (by any suitable means) towards an outwardly extending position in which it can pass through one of the first and second slots 16, 18 to lock the visor 6 in a raised or lower position by presenting a locking or abutment surface to an edge of the slot. Depressing the push button 26 causes the locking member 22 to move inwardly against the bias beyond the inside face of the side portion 12 of the visor, thereby unlocking the visor and allowing it to be raised or lowered. When the visor is between the raised and lowered positions, the push button may conveniently be released as it will be held in its depressed position by the overlapping portion 15 of the visor and the locking member will automatically return to lock the visor on reregistering with a slot. It is to be noted that the radial distance between the pivotal axis 32 and the lower edge 34 of the side portion 12 of the face shield is less than the distance between the pivotal axis 32 and the upper edge 36 of the push button 26 so that the push button does not interfere with the lower edge 34 when the face shield is raised. This allows the push button to extend outwardly beyond the locking member 22 to make it more accessible.

As shown particularly in FIG. 4B, a stop member 38 is positioned in front of the locking member 22 and extends from the helmet shell 4. The stop member 38 provides an abutment surface 40 for engaging the front edge 42 of the second slot 18 when the visor 6 is in the lowered position to prevent further downward movement of the visor 6 about the pivotal axis 32. Advantageously, the stop member also provides a robust means of preventing rearward movement of the visor towards a wearer (i.e. towards the rear of the helmet) to resist high impact forces towards the front of the shield, for example from an explosion. The stop member also isolates the locking member from engagement with the front edge 42 of the second slot 18 to reduce the risk of damage to the locking member when the face shield is subjected to frontal high impact forces, so that the locking mechanism may remain operable after a high impact to release the face shield and to allow it to be raised. The stop member may be at least partially resilient to absorb mechanical shock and reduce the transmission of impact forces from the visor to the helmet, and may reduce injury and the risk of concussion.

The helmet further comprises a releasable visor retention system which enables the visor to be easily and quickly removed from the helmet, and optionally replaced by another visor of the same or different type. The visor retainer comprises a lock cover plate 44 having a lower end 46 which is pivotally mounted below the push button 26, and an upper end 48 carrying a fastener 50 which fastens the cover plate to the boss 8 via a hole 52 formed therein. A slot 53 is formed in the cover plate to accommodate the push button 26.

To release the visor from the helmet shell, the fastener 50 is disconnected from the boss and the cover plate swung forward, as shown in FIG. 4A, to allow the side portion 12 of the visor to be pulled outwardly and over the boss 8. Thereafter, the visor is simply lifted away from the helmet between the helmet and cover plate. The reverse procedure is employed to reconnect the visor to the helmet or to connect another visor to the helmet.

Figure 5:
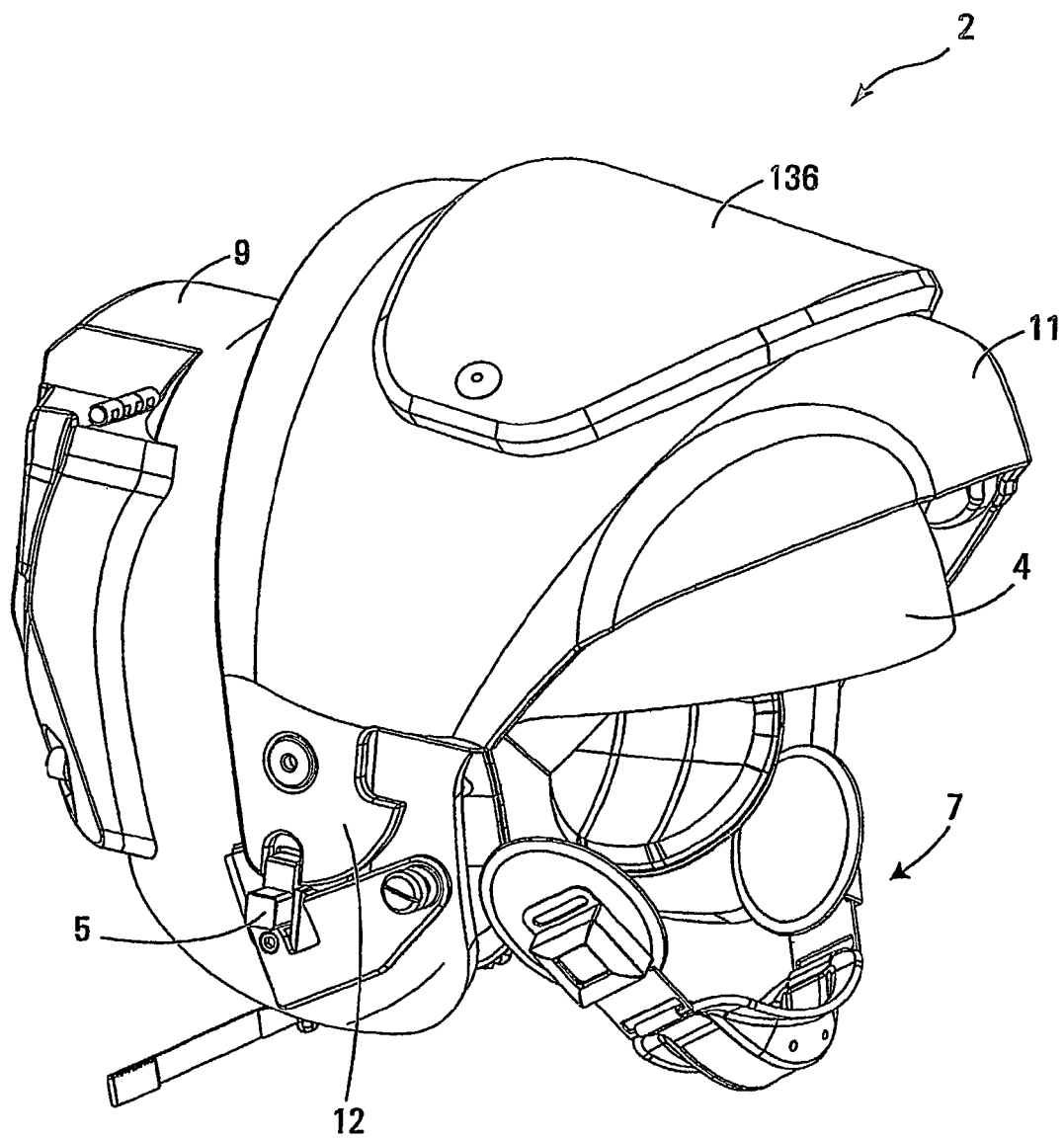
FIG. 5 shows a perspective view of the helmet of FIG. 1, with the visor of FIGS. 2A to 2C mounted thereto in a second orientation of the visor.
Figure 6:
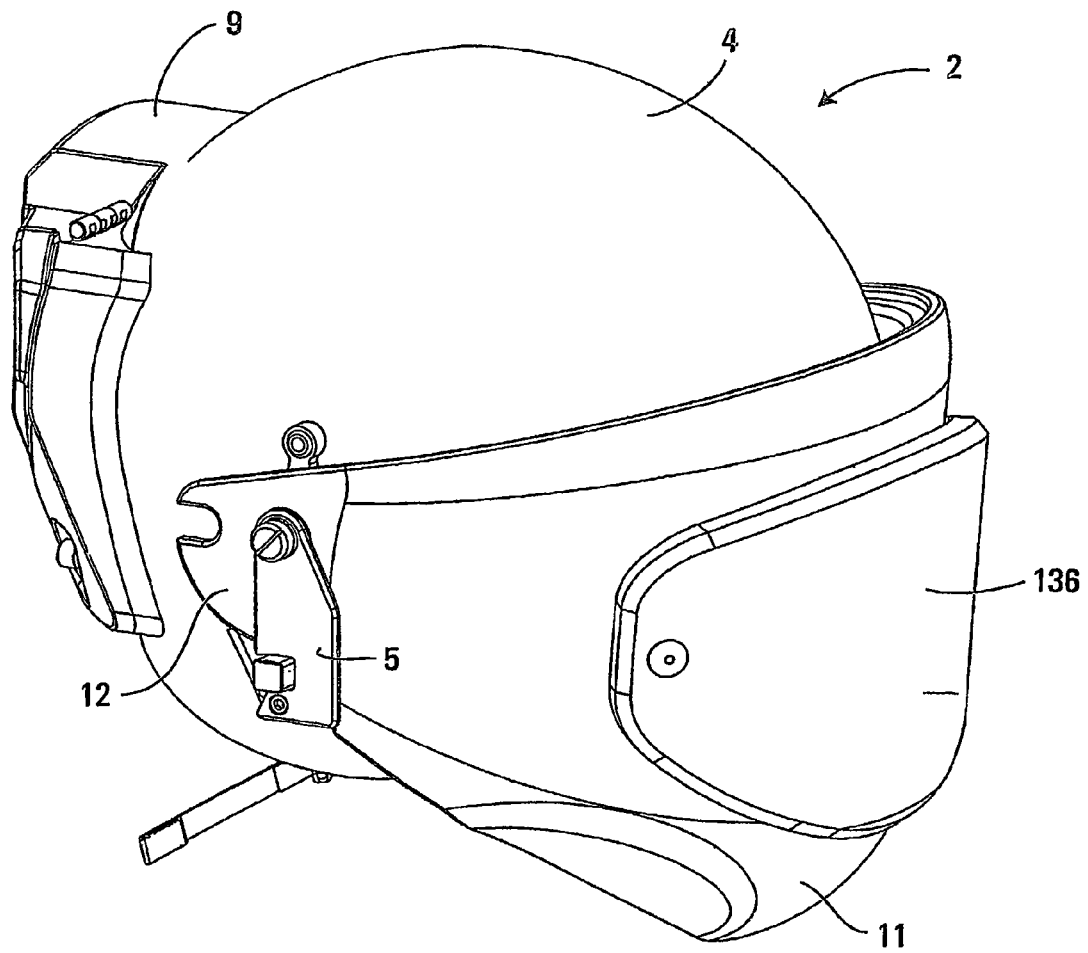
FIG. 6 shows a perspective view of the helmet of FIG. 1, with the visor of FIGS. 2A to 2C mounted thereto, and fully locked in the lowered position.

FIG. 4A shows how the visor 6 is connected or disconnected to the helmet in the lowered position. FIG. 5 shows the visor in the locked, raised position, with the locking member disposed within the rear visor slot 14. The visor can also be connected or disconnected from the helmet in the raised position by spreading apart the side portions 12, 13 of the visor and lifting the visor up over the boss and away from the helmet. The reverse procedure may be employed to mount a visor to the helmet. FIG. 6 shows a visor fully and securely mounted to the helmet with the cover plate 44 swung back and fastened to the boss 8 to prevent the visor sliding over the boss. In this position, the cover plate also covers the stop member and a portion of the visor near the stop member when the visor is in its lowered position to prevent possible spreading and lifting of this portion of the visor over the ends of the stop member, which would otherwise result in the visor moving towards the face of a wearer in the event of a high impact force towards the front of visor. The cover plate may also cover components of the locking system.

Figure 7:
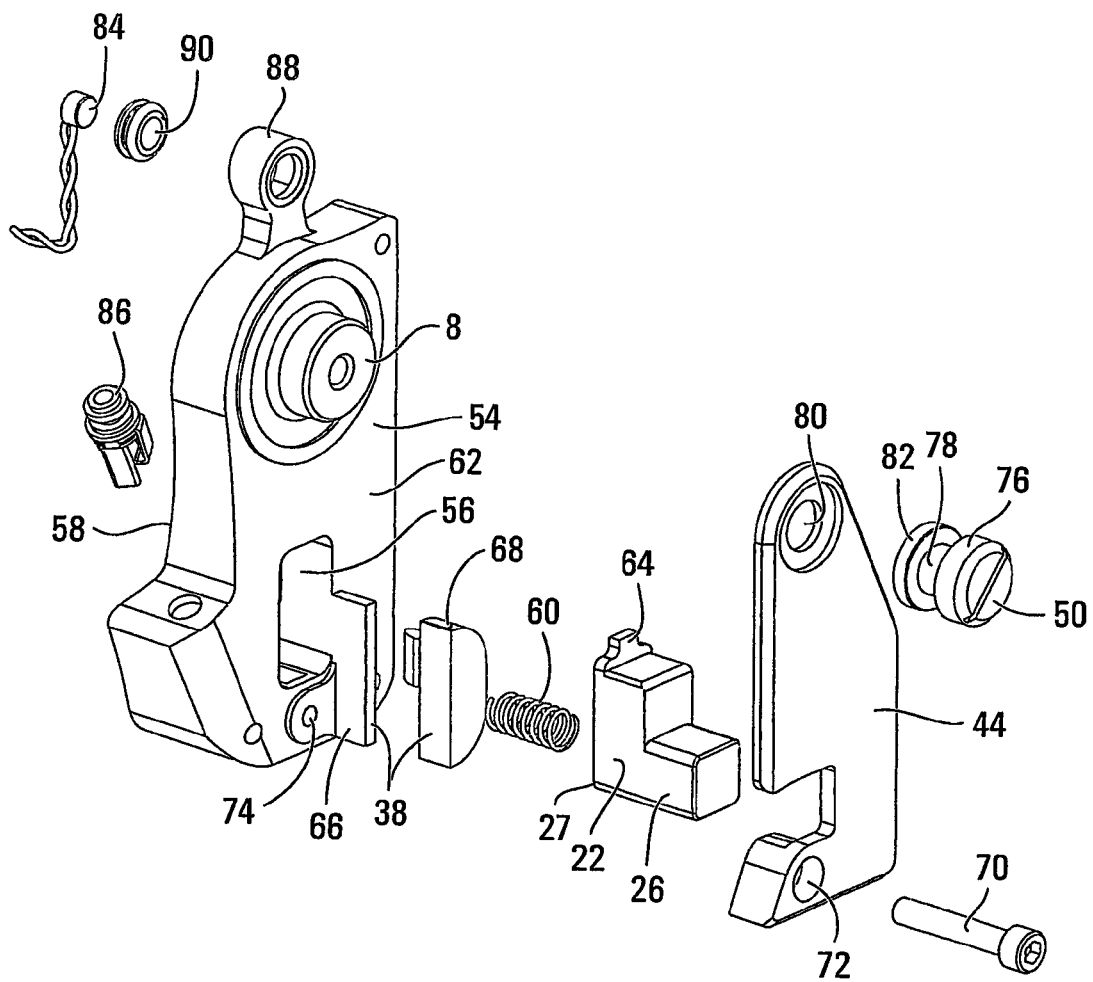
FIG. 7 shows an exploded view of the visor mounting arrangement used for the helmet of FIG. 1, according to an embodiment of the present invention.

The visor retaining system is shown in more detail in FIG. 7. Referring to FIG. 7, the retaining system comprises a mounting plate or bracket 54 which is mounted to the helmet shell and carries the boss 8, the locking member and push button 22, 26, the stop member 38, the cover plate 44, and the fastener 50. The mounting plate 54 includes an apertured housing 56 for receiving and retaining the locking member and push button 22, 26. In assembling the retainer system, the locking member and push button are inserted into the housing 56 from the back 58 of the mounting bracket 54. A resilient bias 60 which may comprise a spring is positioned in the housing to bias the locking member and push button outwardly towards the front 62 of the mounting plate. However, the locking member is retained with the housing by means of a tab, lug or protrusion 64 which engages a wall of the housing 56 to prevent further outward movement thereof. (A tab may also be provided at the other end 27 of the locking member).

The stop member 38 comprises a protrusion 66 which extends from the front face 62 of the mounting bracket 54 and may be integrally formed therewith, and a resilient member 68, which is mounted in front of the protrusion 66.

The cover plate 44 is pivotally mounted at its lower end by means of a screw 70 which passes through a through-hole 72 in the cover plate and into a threaded hole 74 in the mounting plate. Other techniques to pivotally mount the cover plate to the mounting plate will be apparent to those skilled in the art.

The fastener 50 comprises a screw having a head 76, a shaft 78 which passes through an aperture 80 formed in the upper part of the cover plate 44 and a flange 82 which retains the fastener on the cover plate.

In this embodiment, the mounting bracket is arranged to accommodate a microphone 84 and an audio jack 86. An apertured protrusion 88 extends from the main body of the mounting bracket 54 for receiving and retaining the microphone 84 which is retained within the aperture by means of a resilient (e.g. rubber) grommet 90 which is positioned between the microphone and the protrusion 88 and assists in isolating the microphone from any mechanical vibration transmitted through the mounting plate. The microphone and audio jack are both optional and one or both may be omitted in other embodiments or mounted elsewhere.

Visor Construction

FIGS. 2A to 2C show an example of an EOD visor according to an embodiment of the present invention, which can be releasably connected to a protective helmet. The visor 6 comprises a substrate layer 108 comprising a transparent material such as polycarbonate which forms both the curved front portion 11 and the side portions 12, 13 of the visor. The visor further comprises a backing layer 130 positioned behind and adjacent to the substrate layer 108 and which extends around the front portion 11 of the visor and terminates at a rear edge 132 between the front and back of the visor so that it does not extend to the side portions 112, 114. (However, in other embodiments, the backing layer may extend to any other position, and may extend to overlap the side portions or wings of the visor. The backing layer, which may be bonded to the substrate layer, comprises a plurality of layers of ballistic resistant material bonded together to form a composite, and is therefore generally opaque. The backing layer defines an opening 134 at the front of the visor to allow light to pass therethrough. The visor also includes an outer layer 136 positioned adjacent the outer surface of the substrate layer 108 and whose perimeter 138 is generally sized and shaped to at least cover the area of the opening 134. In this embodiment, the perimeter of the outer layer overlaps a marginal band 131 around the opening. The outer layer, which may be secured to the substrate and/or backing layer by any suitable means, such as mechanical fasteners (e.g. rivets 133, 135), may comprise a transparent material, such as acrylic (or possibly polycarbonate). However, acrylic is preferred as it is capable of dissipating high energy impacts faster than polycarbonate and is therefore more resistant to shattering.

An aperture 10, 9 is formed in each of the side portions of the visor 12, 14 to enable the visor to be pivotally mounted on bosses extending from opposite sides of a helmet shell, as shown in FIGS. 1, 4A and 4B. A first slot 14 having a rear opening 16 and a second slot 18 having a lower opening 20 are formed in one of the side portions 12 and a slot generally corresponding to the first slot is formed in the other side portion 13. However, in this embodiment, the other side portion 13 does not have a lower slot corresponding to the second slot 18. As described above in connection with FIGS. 4A and 4B, the first and second slots co-operate with a locking mechanism on the helmet to lock the visor in the raised and lowered positions, respectively.

In this embodiment, a wiper 148 is mounted along the upper edge 150 of the visor for engaging the helmet shell at least in the lowered position to form a seal therewith, and thereby prevent moisture such as rain passing between the helmet and the visor. The wiper comprises a flexible material and includes an edge portion 152, which seals with the helmet, and a less flexible mounting portion 154 whose inner surface may be provided with ribs 156 to increase its rigidity.

One or more search lights 158, 160 may be mounted on the upper edge 150 of the visor, and in this embodiment, the search lights are conveniently mounted in housings 162, 164 which are integrally formed with the wiper, although in other embodiments, the search lights may be mounted in housings which are separate from the wiper. In this embodiment, two search lights are provided which are spaced equally either side of a centre line 166 and at a position which approximately corresponds to the position of a wearer's eyes. The search lights may comprise light emitting diodes which are capable of efficiently generating high intensity light. The beam of the light sources may converge and meet at a predetermined distance in front of the visor to produce a required beam shape and size, and the direction of the beams and therefore their angle of convergence may be adjustable.

FIGS. 3A to 3C show another embodiment of a visor which can be coupled to the same helmet as the visor shown in FIGS. 2A to 2C using the same coupling mechanism but which has a different purpose in that the visor shown in FIGS. 6A to 6C is shaped and sized to accommodate a face-mounted breathing apparatus or respirator (e.g. oxygen mask). In many respects, the visor shown in FIGS. 3A to 3C is similar to that shown in FIGS. 2A to 2C and like parts are designated by the same reference numerals.

The visor 100 comprises a curved front portion 111 and side portions 12, 13 each of which has an aperture 10, 9 formed therein for receiving a respective boss extending from either side of the helmet to enable the visor to be pivotally mounted on the helmet. Rear and downward facing slots 14, 18 are also formed in one side portion 12 which co-operate with the same helmet-mounted locking mechanism in the same way as the slots 14, 18 of the visor shown in FIGS. 2A to 2C. A rear facing slot 14 may also be formed in the other side portion 13 of the visor or may be omitted altogether.

The visor comprises a substrate layer 108 which forms both the curved front portion of the visor and the side portions, and comprises a transparent material such as polycarbonate. A reinforcing backing layer 130 which may be formed of multiple layers of bonded ballistic resistant material, such as Kevlar or Dyneema, is positioned behind and adjacent the substrate layer and extends over the front portion of the visor terminating at a rear edge 132 positioned in front of the aperture and slots in the side portions which co-operate with the visor retaining and locking mechanism. The backing layer defines an opening 134 in the front of the visor to allow light to pass therethrough.

The visor also includes an outer layer 136 formed of a transparent material which is sized to substantially cover the area of the opening 134 and serves to reinforce the transparent viewing area of the visor. As for the embodiment shown in FIGS. 2A to 2C, the outer layer may be formed of an acrylic material to withstand high energy frontal impacts. A wiper 148 may be provided along the upper edge of the visor and may include one or more search lights 158, 160. Conveniently, the wiper may be the same as that shown in FIGS. 2A to 2C.

The main difference between the visor shown in FIGS. 3A to 3C and that shown in FIGS. 2A to 2C is that in FIGS. 2A to 2C, the front portion of the visor slopes outwardly (i.e. from the front) from the top to the bottom as can be seen by the difference in the angle alpha between the top edge of the visor and the substrate layer 208. The lower portion of the front of the visor below the lower edge 160 of the opening is longer and less curved than that of the visor shown in FIGS. 2A to 2C. This lower frontal extension of the front of the visor is designed to increase the internal space within the visor to accommodate a face-mounted respirator (and preferably a range of different types of respirators) so that the helmet can be used in situations where a respirator is necessary or desirable.

As mentioned above, the head protection system allows visors having a various different shapes or other features which are designed for different functions to be used with the same helmet, so that separate helmets are not required. The protection system also allows the visors to be readily removed from the helmet and replaced by another so that they can be quickly and easily changed during operations without the need to remove the helmet. This allows personnel to quickly respond to changes in the type of prevailing threat and maximize their protection against the particular threat by adapting the helmet system to the appropriate configuration.

The construction of the visors described above, comprising a layer of transparent plastic material such as polycarbonate, and a backing layer formed of high performance material has particular benefits over known protective constructions and may also be used in protective armour other than visors. Examples of embodiments of this construction and their particular benefits are described below.

Protective Armour

Figure 8:
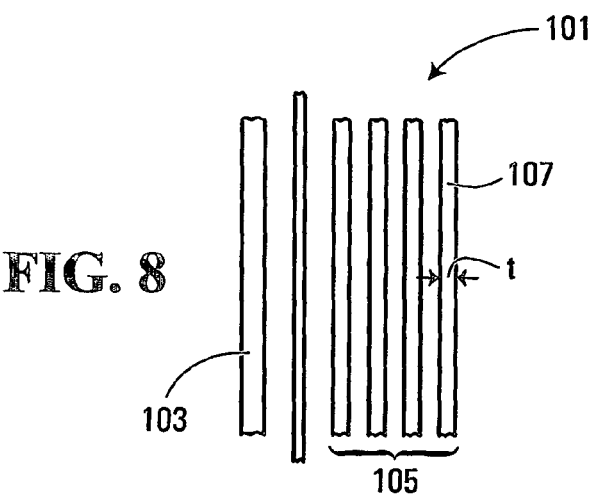
FIG. 8 shows a view of a protective armour construction according to an embodiment of the invention.
Figure 9:
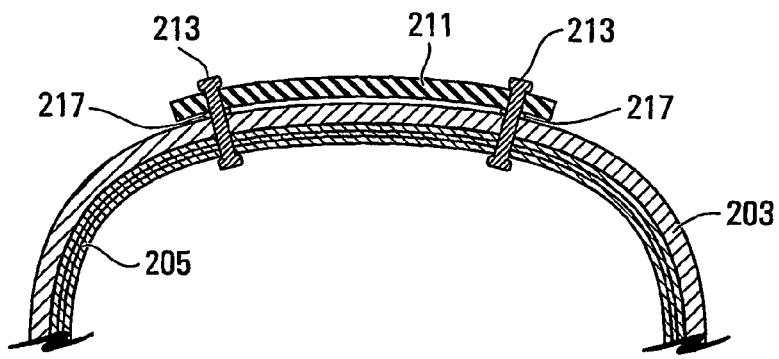
FIG. 9 shows a part cross-sectional view of a visor according to an embodiment of the invention.

FIG. 8 shows a protective armour construction according to an embodiment of the present invention, and which may be used, for example, in the construction of a visor for a helmet. Referring to FIG. 8, the protective armour 101 comprises a first substrate 103 comprising a transparent plastic material, and a second substrate 105 comprising a plurality of layers 107 of high performance material which are laminated together. Each layer of high performance material may comprise a material having a high tensile strength transverse to its thickness, t, examples of which may include but are not limited to a high performance fabric, either woven or non-woven, for example Spectra®, Dyneema®, Kevlar®, as well as others. Each layer 107 may comprise a composite of high performance material and thermo-plastic or thermo-set resin. The second substrate or laminate 105 may be formed by applying at least one of pressure and heat to the plurality of layers when in contact with one another to cause the thermo-plastic resin in each layer to bond with an adjacent layer.

The second substrate 105 is secured to the first substrate 103 by any suitable means, for example, by adhesive or by one or more mechanical elements or agents, such as bolts, rivets, screws or other mechanical means.

In one embodiment, the second substrate may be secured to the first substrate by means of urethane. The inventors have found that urethane can provide an exceptionally strong and uniform bond between the laminate and transparent plastic substrate 103. The bonding process may be performed by placing a sheet or layer of urethane between the first and second substrates and applying heat to the urethane sheet, for example, sufficient to cause melting of the urethane sheet. Advantageously, the melting point of urethane is relatively low and will generally be below that of the first and second substrates. Pressure may also be applied between the first and second substrates to maintain the urethane sheet in intimate contact therewith during the bonding process.

The first substrate may comprise polycarbonate or acrylic or another similar material. In other embodiments, any other suitable adhesive may be used to bond the first and second substrates together and which may or may not be provided in sheet form.

The combination of a transparent plastic material and laminate provides a protective construction which can be thinner than a construction formed of layers of transparent plastic material alone, (e.g. acrylic or polycarbonate) and yet provide a similar level of protection.

FIGS. 9 to 12 show various views of a visor for a helmet which employs in its construction an embodiment of the protective armour described above.

Figure 10:
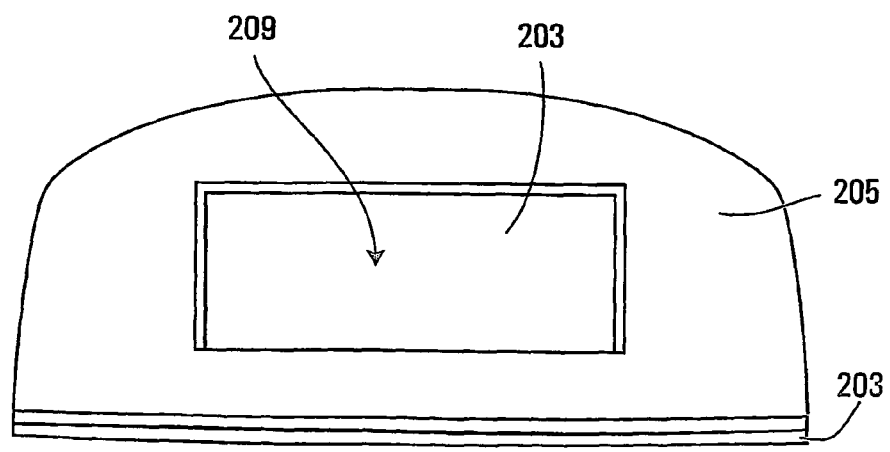
FIG. 10 shows a schematic rear view of the visor shown in FIG. 9.
Figure 11:
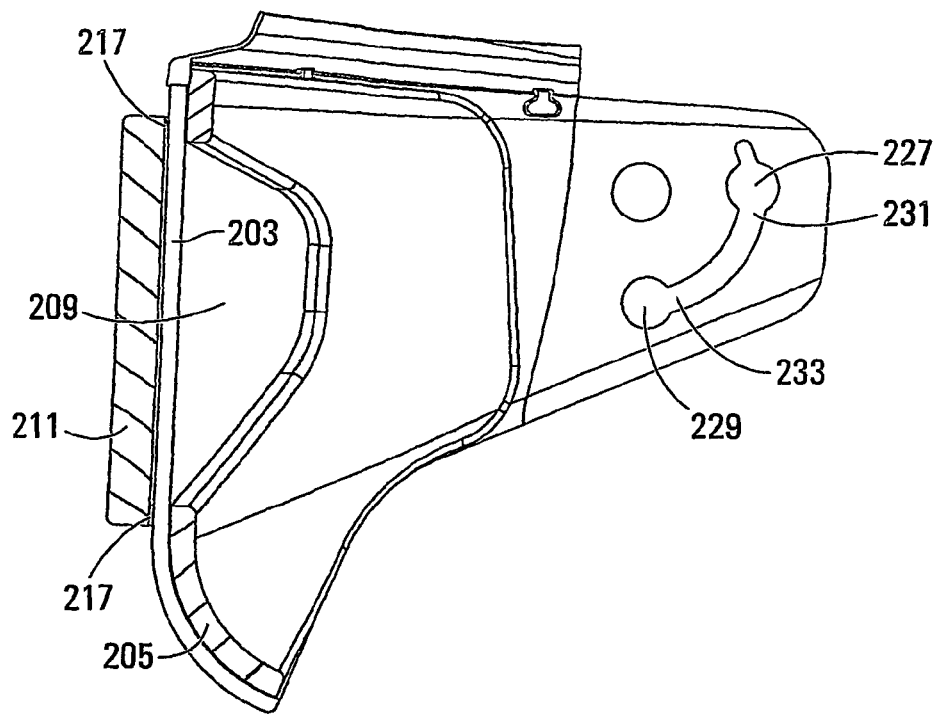
FIG. 11 shows a part cross-sectional side view through a visor according to an embodiment of the invention.
Figure 12:
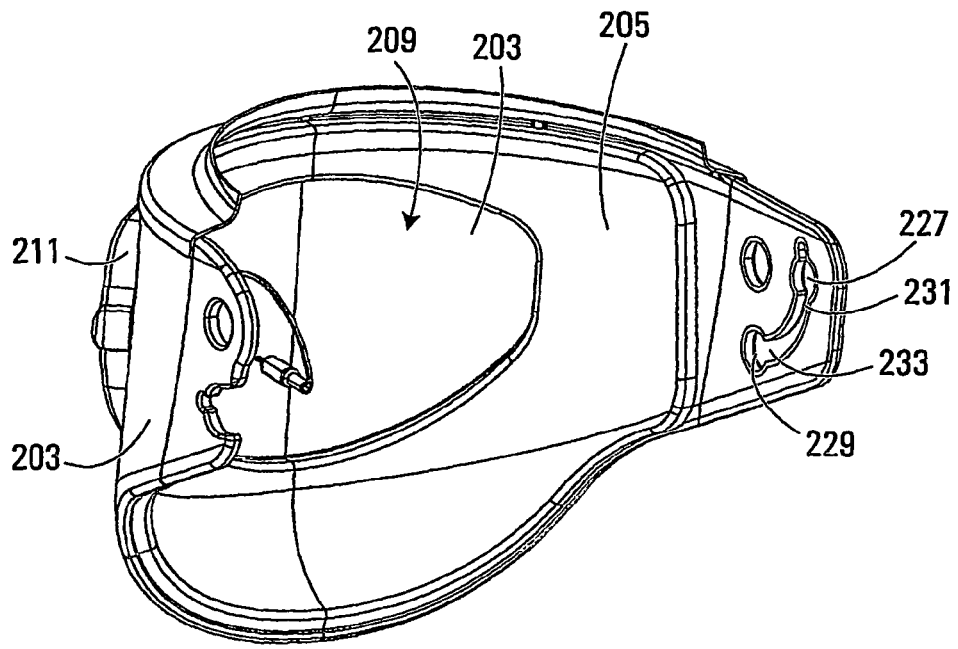
FIG. 12 shows a perspective view of the visor shown in FIG. 11.

Referring to FIGS. 9 to 12, the visor 201 comprises a substrate 203 formed of a plastic transparent material, for example, polycarbonate, and a second substrate 205 comprising a plurality of layers of high performance composite material. As shown in FIGS. 10 to 12, the second substrate 205, which is generally opaque, is secured over a portion of the first substrate 203, and in the present embodiment defines a window 209 for permitting light to pass therethrough.

The visor also includes a further substrate 211 positioned over the front surface of the first substrate 203. The additional substrate 211 comprises a transparent material and may, for example, comprise acrylic or polycarbonate. The additional substrate may be secured to the first and/or second substrates using any suitable means, for example, rivets 213, 215 or other mechanical means, or by adhesive. A spacer 217 may be provided between the first and additional substrates 203, 211 to prevent direct contact between them.

In a specific embodiment, the first substrate 203 comprises polycarbonate and the additional substrate 211 comprises acrylic. The additional substrate 211 extends over a limited portion of the first substrate 203, and in particular over an area opposite the viewing window 209, and serves to enhance the level of protection of the transparent area of the visor. In particular, acrylic, which is harder than polycarbonate, presents a hard strike face to explosive fragments, causing fragments to slow rapidly and break into smaller parts. The use of the combination of a layer of polycarbonate and laminate of high performance material allows the amount of acrylic, which is heavier than polycarbonate, used in the construction of the visor, to be considerably reduced, and in particular eliminates the need to use acrylic over the entire exterior surface or strike face of the visor. In the present embodiment, the use of acrylic is limited substantially to the transparent area of the visor resulting in a lighter construction. At the same time, the combination of a layer of polycarbonate (or other transparent plastic material) and a laminate of high performance material allows the thickness of the visor construction to be reduced, which in turn allows the forward extension of the visor also to be reduced. This assists in moving the center of gravity of the helmet rearwards for better balance.

Although in the embodiment shown in FIGS. 9 to 12, the second substrate 205 is placed behind the first substrate, in other embodiments, this order may be reversed so that the second substrate is placed in front of the first substrate.

Advantageously, embodiments of the visor whose construction employs the first and second substrate combination described herein significantly reduces the weight of the visor in comparison to known visor constructions, thereby resulting in a lighter helmet, reduced weight towards the front of the helmet for improved balance and a reduced moment about the center of the helmet which tends to tilt the helmet forward.

The protective armour construction described and defined herein may be used in the construction of protective armour for protecting any other part of the body.

Further Embodiments of a Multi-functional Head Protector

As described above, in embodiments of the present invention, the head protector may include a helmet adapted for use with a number of interchangeable visors, each having a different function to increase the versatility of the system, and reduce costs by requiring only a single helmet. In another embodiment, the visors may include one of the types described above for protection against explosive ordinance, a second visor having a relatively large transparent area for search and recognisance and a third visor adapted to accommodate a respirator for use against chemical, biological or nuclear threats. An example of these visors are shown in FIGS. 13A, 13B and 13C.

Figure 13B:
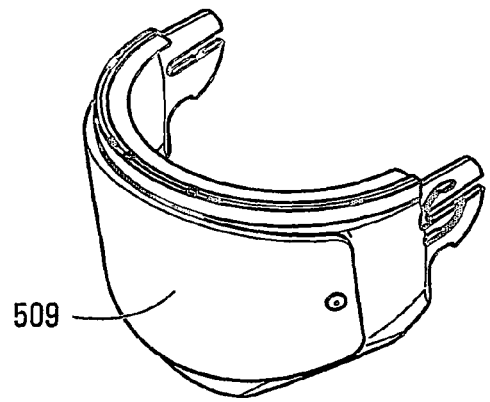
Figure 13C:
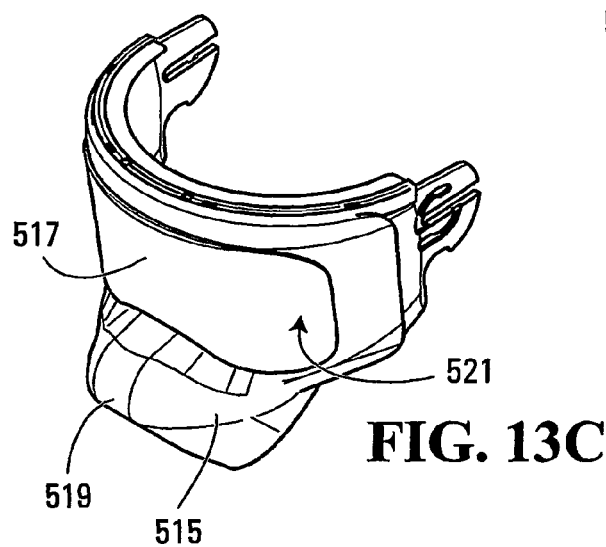
Figure 13A:
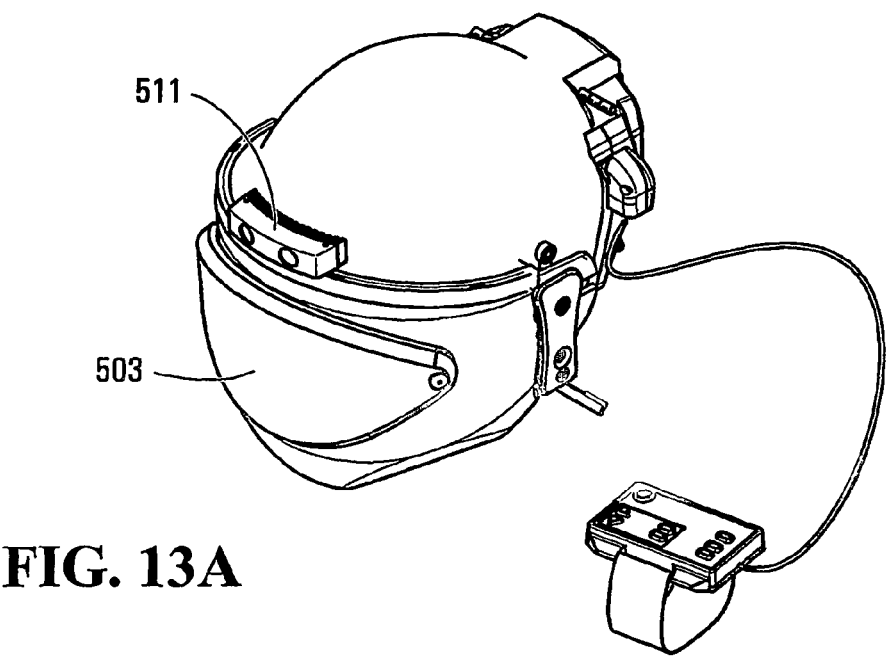
Figure 14D:
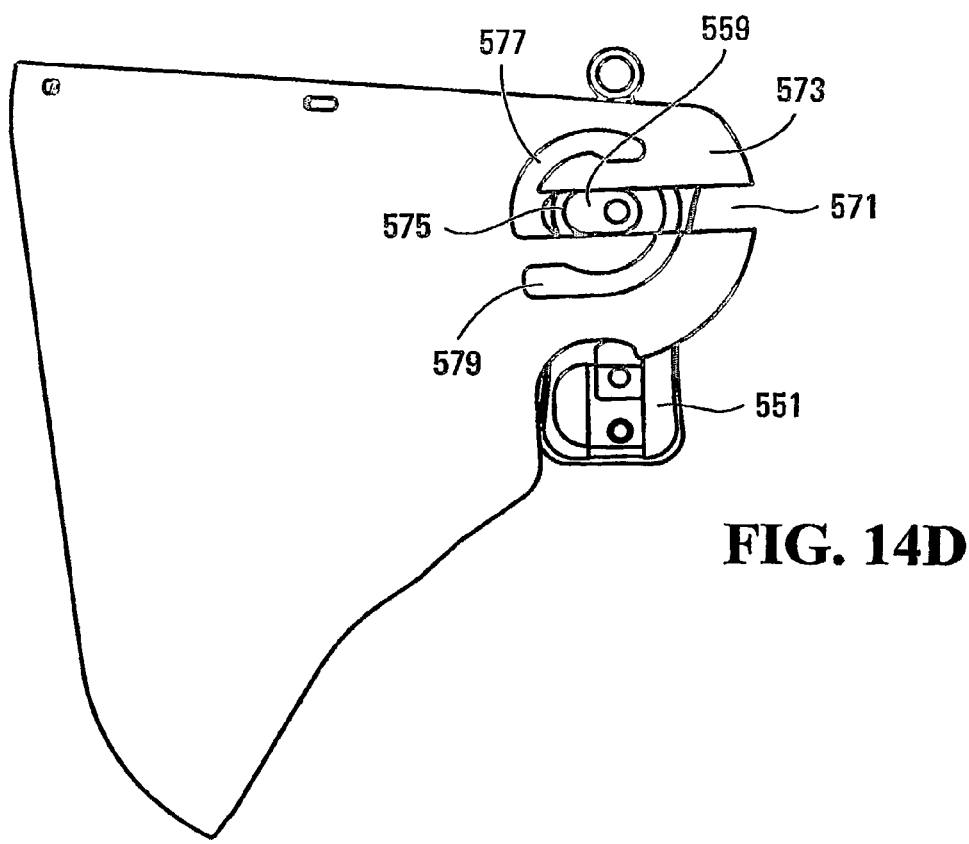
FIG. 14D shows a side view of a the visor mounting system shown in FIG. 14C.
Figure 14E:
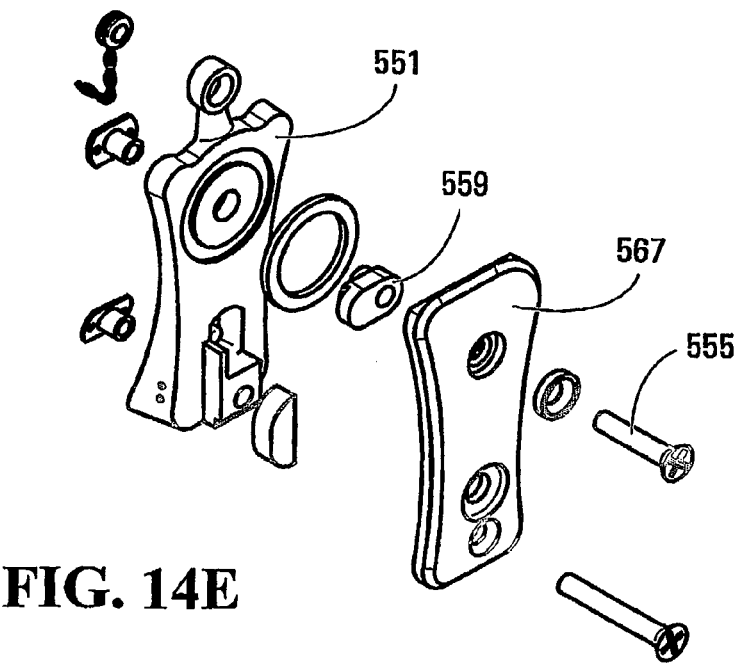
FIG. 14E shows an exploded view of the mounting bracket shown in FIGS. 14D and 14E.

FIG. 13A shows an EOD visor mounted to the helmet, FIG. 13B shows a search and recognisance visor for mounting to the helmet and FIG. 13C shows an CBRN visor for mounting to the helmet. The EOD visor may be similar to that described above. The search visor 509 has a relatively large transparent area (e.g. of polycarbonate) to provide the user with a large field of view. In one embodiment, at least one of the visors includes a light source 511 which may be mounted on or adjacent the upper edge thereof (or at any other suitable location on the visor) to allow the wearer to search in dark or poor light conditions without the need for a hand-held flashlight. An example of a light source is described below.

The CBRN visor 515 includes a transparent screen 517 and a shaped protective portion 519 below the screen for accommodating a respirator (i.e. gas mask). The transparent screen 517 may comprise any suitable material, including polycarbonate and/or acrylic, and in one embodiment, the lower portion 519 comprises a laminate formed of ballistic resistant fabric. Advantageously, this allows the lower protective portion to be formed into any desired shape including relatively angular shapes which would be more difficult to form using a single layer of polycarbonate or acrylic.

In the present embodiment, the visor includes a substrate 521 formed of polycarbonate towards the inside of the visor and which accommodates the coupling for coupling to the helmet and the transparent screen 517. The visor includes a second substrate formed of laminated ballistic resistant fabric secured to the first substrate and which forms a frame around the transparent screen and includes the respirator housing 519. A further layer of transparent material, for example acrylic or polycarbonate is placed over the transparent screen formed by the first substrate for additional protection. In one embodiment, the respirator housing is sized and shaped so as to accommodate a wide variety of different respirators. Each visor may be mountable to the helmet using the same coupling mechanism. The coupling mechanism may be adapted to allow the interchangeable visors to be manually releasable and preferably by a mechanism which is both accessible and operable externally of the helmet so that visors can be removed and replaced while the helmet is being worn. In one embodiment, the mechanism may allow the visor to be removed by a simple sliding action and automatically retained on the helmet when the visor is rotated relative to the helmet to a position of use. An example of a coupling mechanism will now be described with reference to FIGS. 14A to 14E

Visor Coupling

FIGS. 14A to 14E show another embodiment of a visor coupling for releasably connecting a visor to a helmet. The coupling comprises a mounting plate 551 connected to the side of a helmet shell 553 by any suitable means, and having a boss 555 extending therefrom for pivotally mounting a visor about an axis 557. A resilient member 559 may be provided about at least a portion of the boss 555 to allow a degree of radial movement between the visor and the boss for impact absorption between the visor and helmet. The mounting plate further includes first and second protrusions (or lugs) 563, 565 extending therefrom positioned either side of the boss 555. The coupling further includes an outer plate 567 spaced from the mounting plate 551 to form a gap 569 therebetween for receiving a portion of the visor. Alternatively or in addition, lugs may extend from the outer plate 567.

The coupling further includes an open ended slot 571 formed in the side portion 573 of the visor and which terminates at a bearing edge 575 which bears against the resilient portion 559 of the boss 555 when the side portion 573 of the visor is inserted into the gap 569 between the mounting plate 551 and the outer plate 567.

The coupling further includes second and third slots 577, 579 formed in the side portion 573 of the visor for receiving the first and second protrusions 563, 565 and which together retain the visor on the helmet as the visor is rotated relative to the helmet about the axis 557.

To mount the visor to the helmet, the visor is oriented and positioned above the helmet so that the open ended slot 571 is aligned with the first and second protrusions 563, 565 and the boss 555, as shown in FIG. 14A. The visor is then lowered into the gap 569 between the mounting 551 and the outer plate 567 in the direction of arrow A (FIG. 14A) so that the protrusions 563, 565 and the boss pass through the open ended slot 571 until the bearing edge 575 engages the resilient portion of the boss 559. The visor may then be rotated forwarded as indicated by arrow B (FIG. 14A) into an operable position. Forward rotation of the visor causes the first and second protrusions to pass into and travel in the second and third slots 577, 575 to retain the visor on the helmet.

A locking mechanism (for example as described below and shown in FIGS. 20A to 20D?) may be provided so that the visor can be locked in both an open position above the helmet and in a lowered position. As the visor is rotated from its lowered position to its raised position, the locking mechanism may be arranged to automatically lock the visor in its raised position and this locked, raised position may advantageously be forward of the position at which the slot is oriented such that the visor can be lifted and disconnected from the helmet. In this case, to remove the visor from the helmet, the visor has to be rotated rearwardly of its locked raised position.

In other embodiments, the visor retention means may comprise any other suitable mechanism and in one embodiment, the protrusions may be removed and the retention means may be provided by the boss having a specially shaped surface which can pass through the slot in one orientation but not in other orientations so that the visor is rotatably retained on the helmet.

In other embodiments, the retention means may comprise only one, or more than two protrusions and these may either be provided on the mounting plate or on the interior side of the outer plate.

A similar coupling mechanism may be provided on both sides of the visor and helmet, and a locking mechanism may be provided on only one side or on both sides.

Figure 15B:
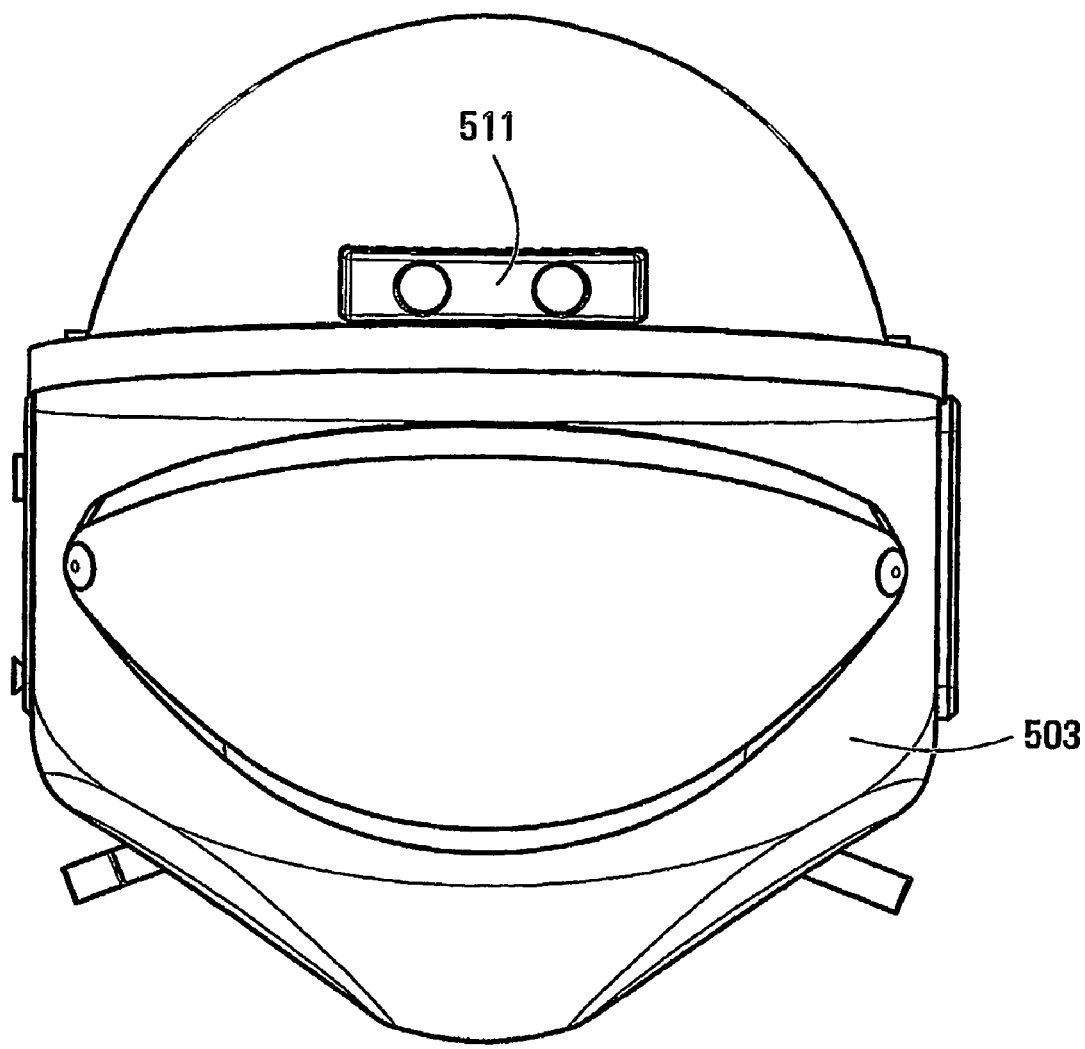
Figure 15C:
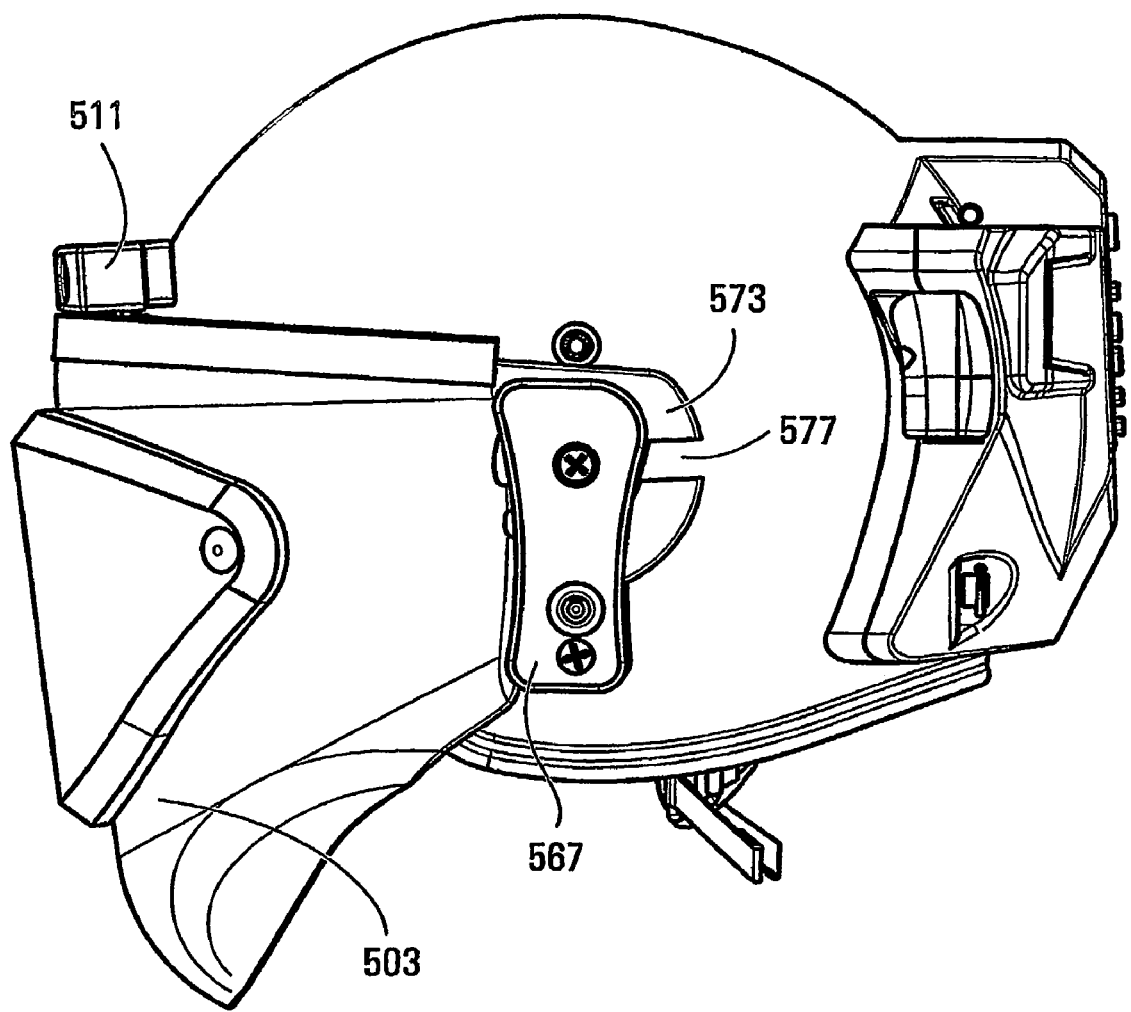
Figure 15D:
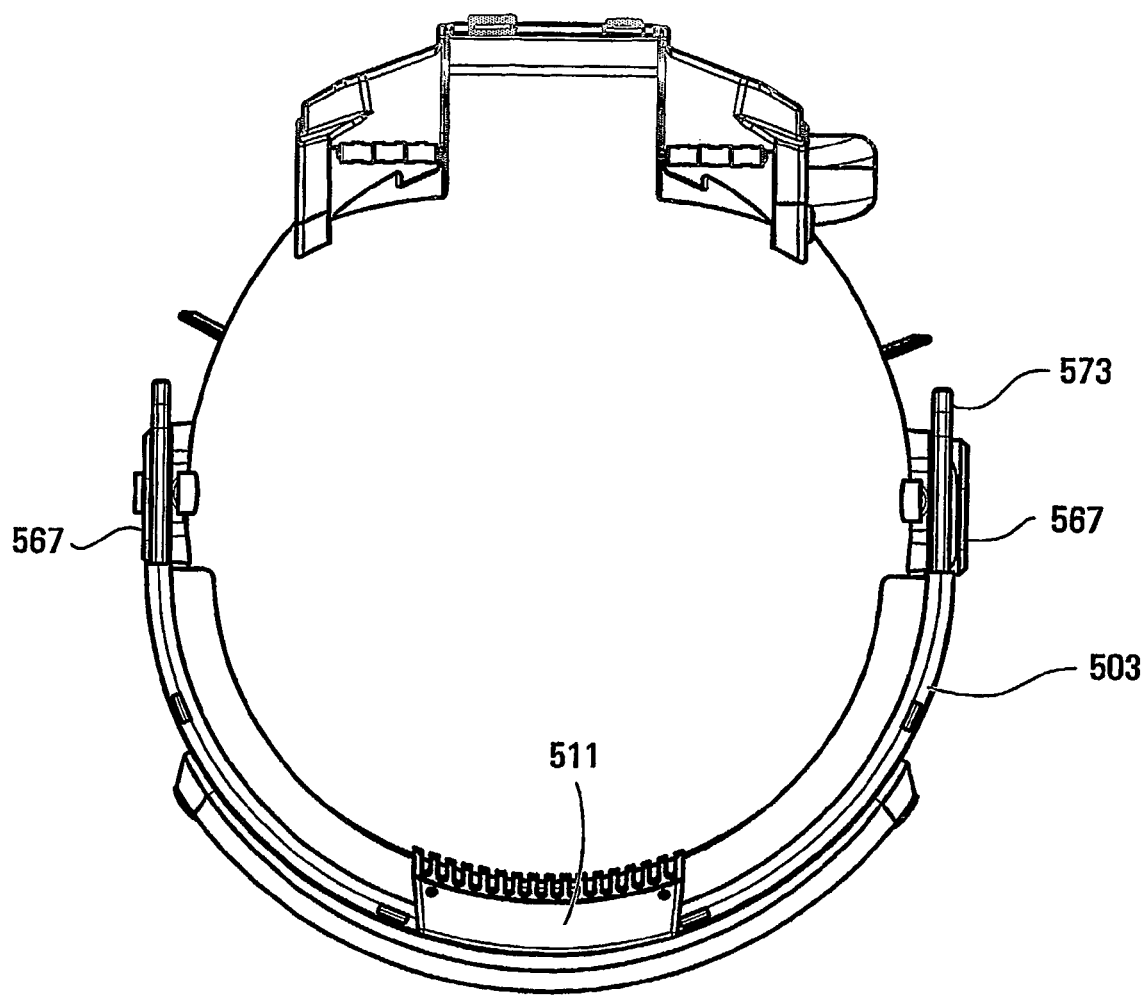
Figure 15E:
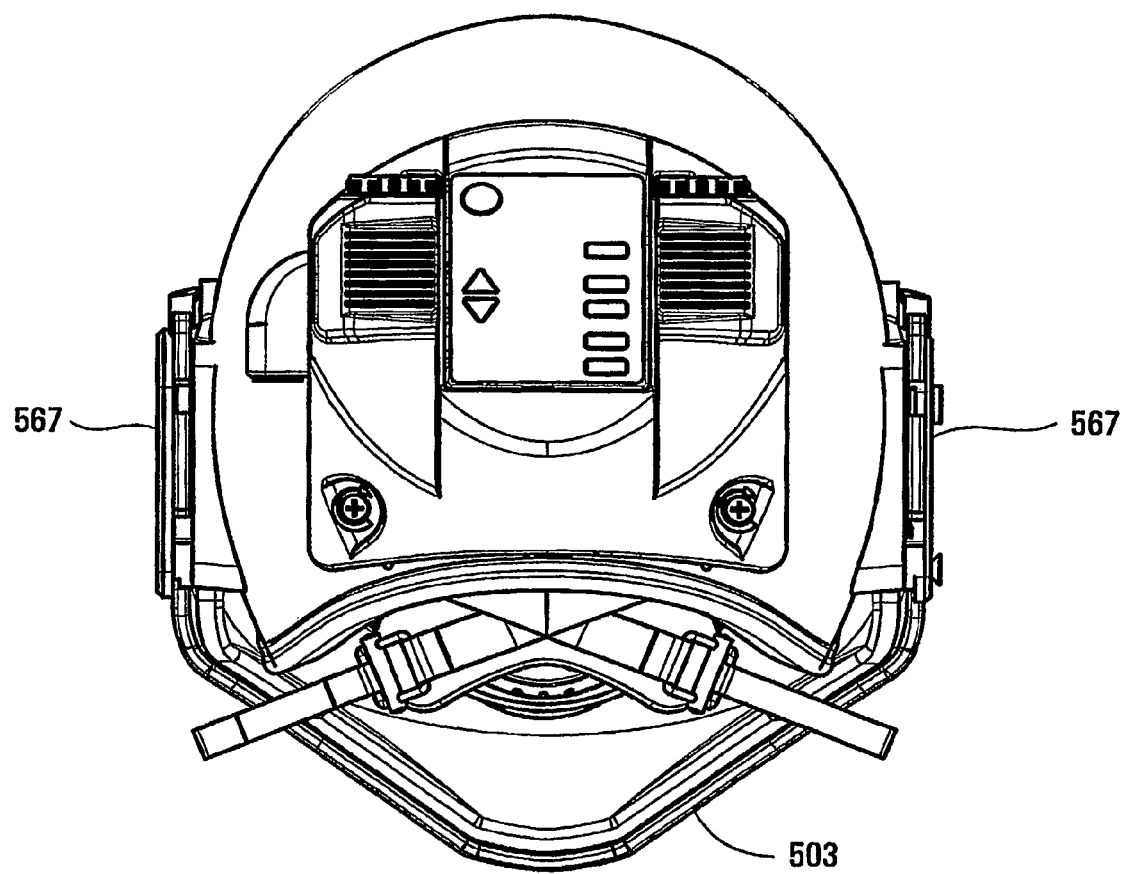
Figure 15F:
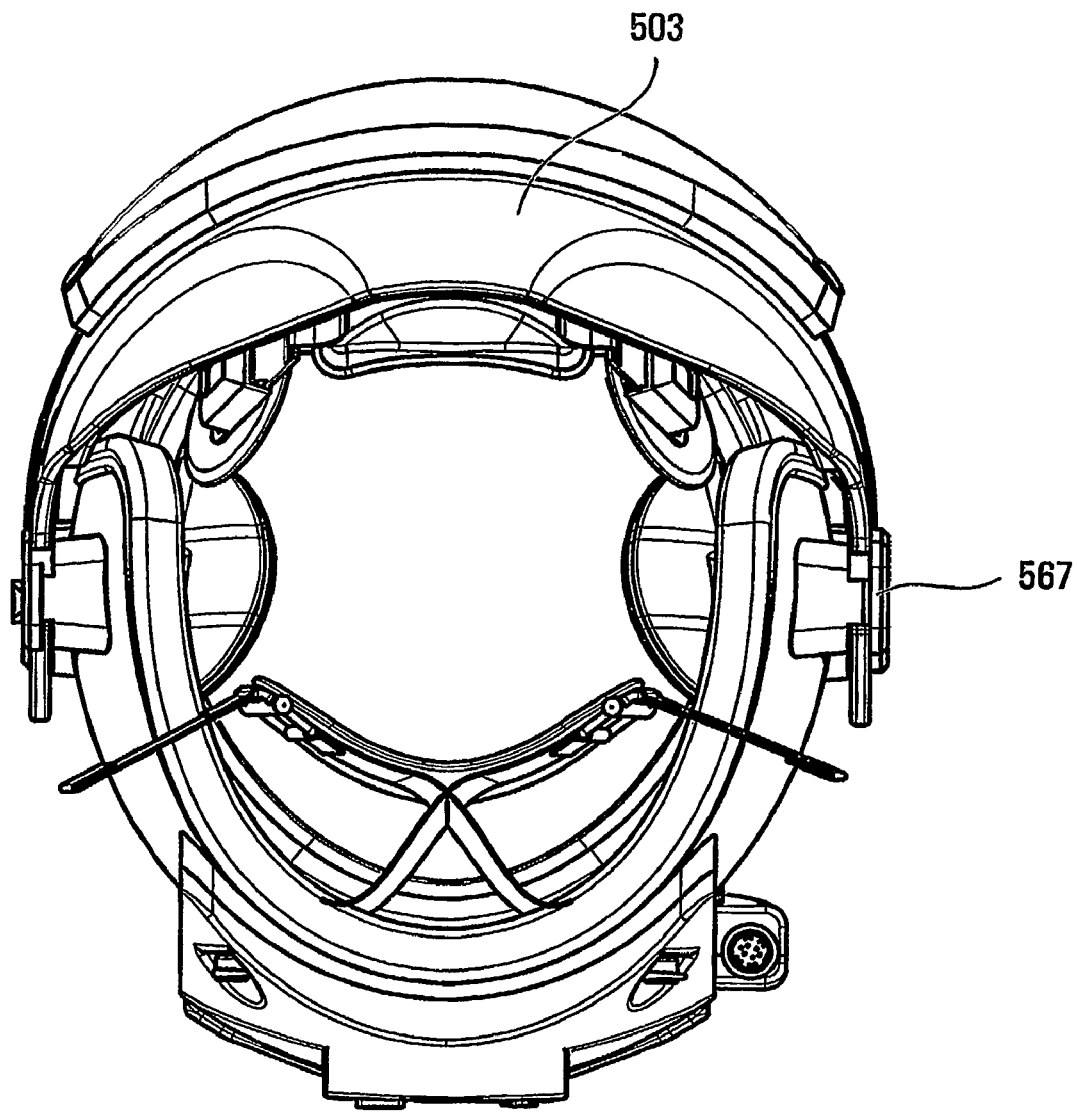

FIG. 15A shows perspective views of an embodiment of a head protector adapted as an EOD helmet with the EOD visor in various positions, FIG. 15B shows a front view of the EOD helmet shown in FIG. 15A, FIG. 15C shows a side view thereof, FIG. 15D shows a top view thereof, FIG. 15E shows a back view thereof; and FIG. 15F shows a view from below the helmet shown in FIG. 15A.

FIG. 16 shows perspective views of the head protector adapted as a search helmet with the search visor in various positions. In this embodiment, the helmet portion may be the same as that shown in FIGS. 13A to 15F and the function of the helmet has changed simply by exchanging the EOD visor for the search visor.

Figure 17B:
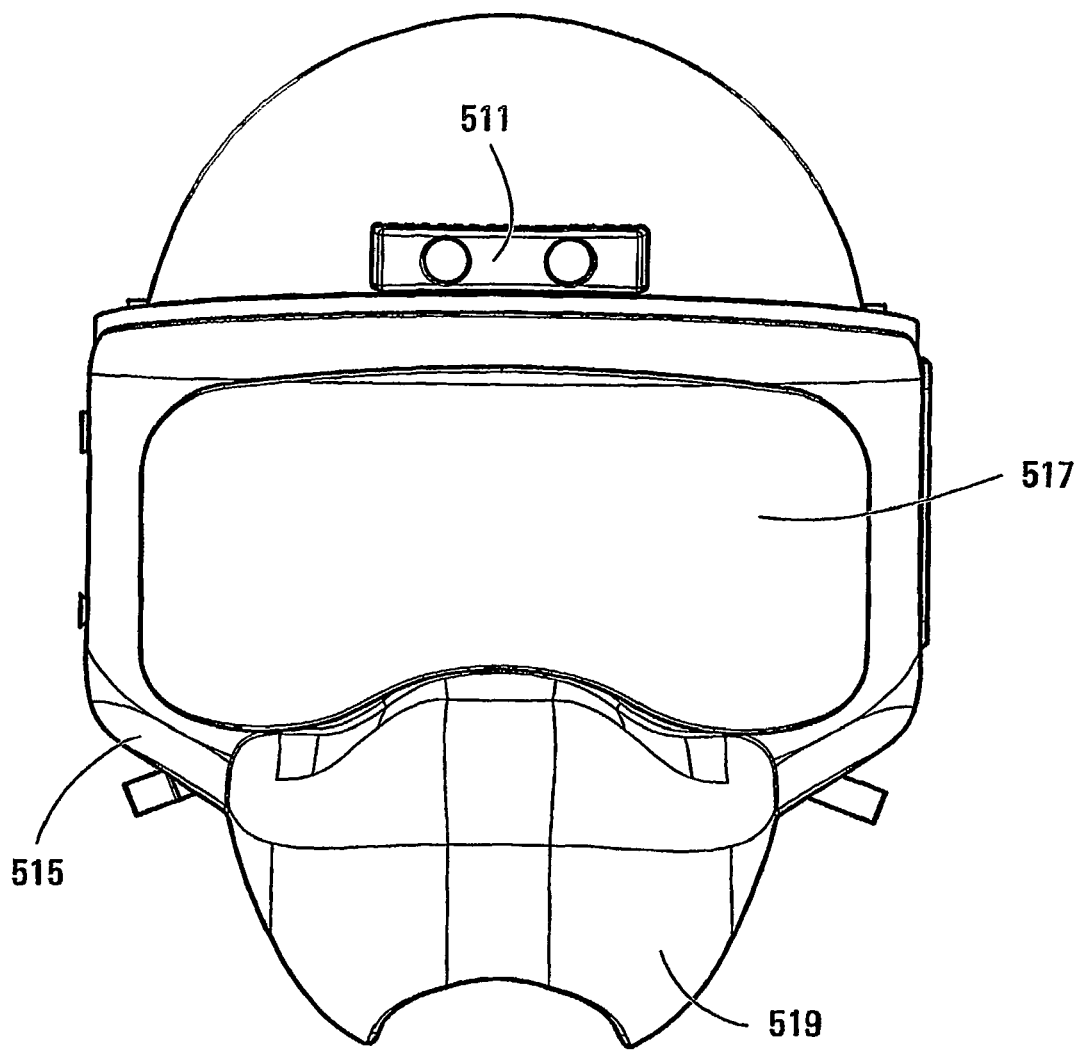
Figure 17C:
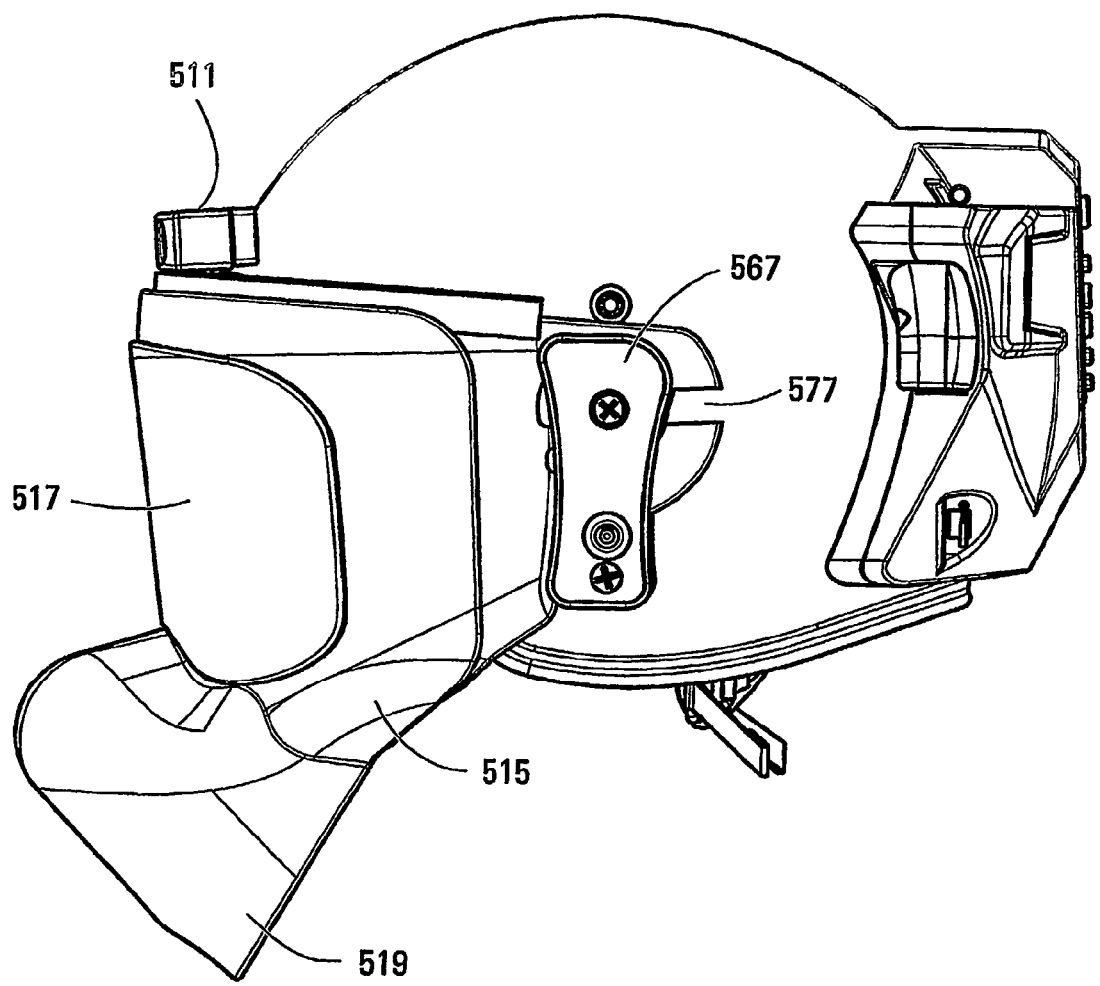
Figure 17D:
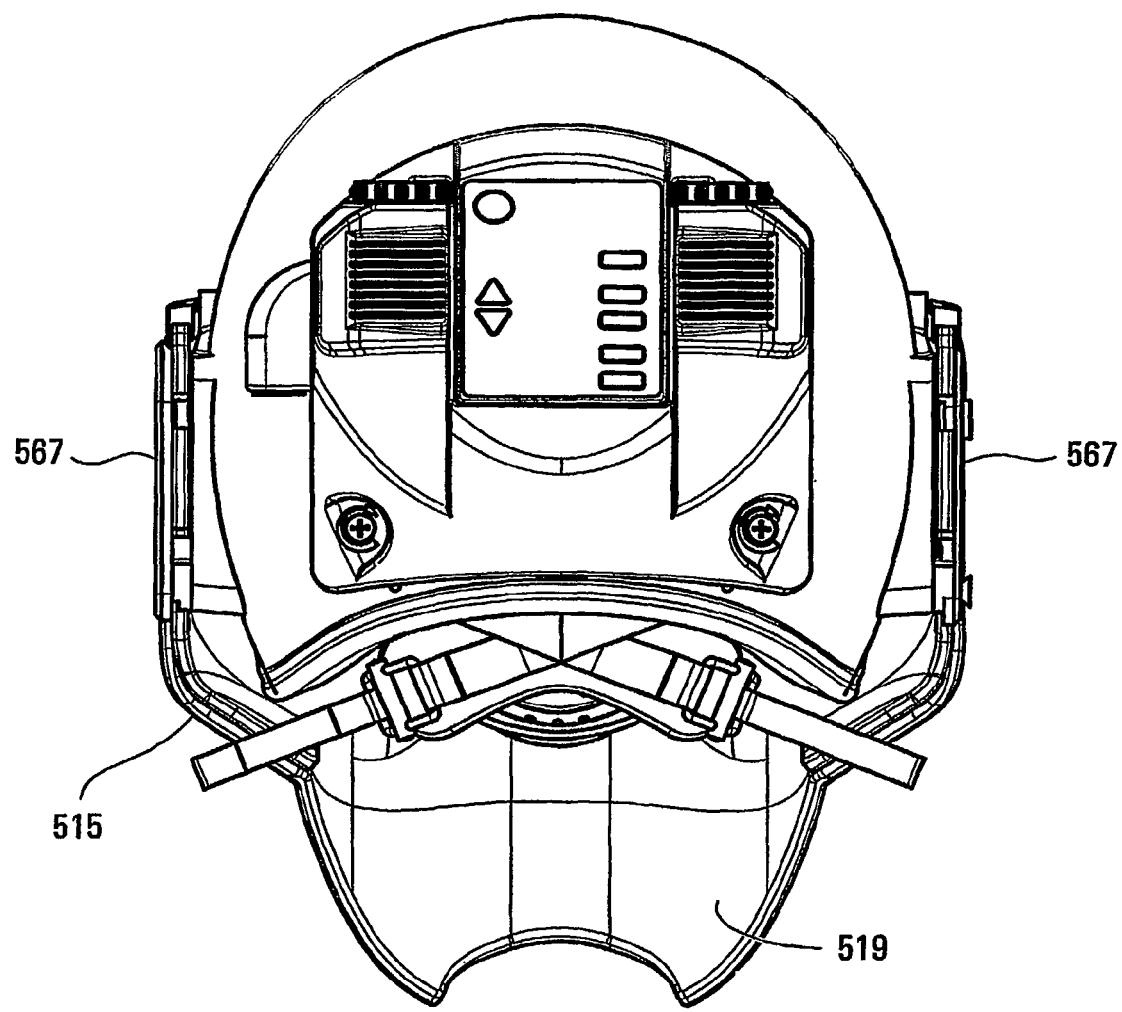

FIG. 17A shows perspective views of a head protector adapted as CBRN helmet with the CBRN visor in various positions, FIG. 17B shows a front view of the helmet shown in FIG. 17A, FIG. 17C shows a side view thereof, and FIG. 17D shows a back view thereof. In this embodiment, the helmet portion of the head protector may be the same as that shown in FIG. 15A and the function of the helmet may be changed by simply exchanging the EOD or search visor for the CBRN visor to accommodate a respiratory mask.

Figure 18A:
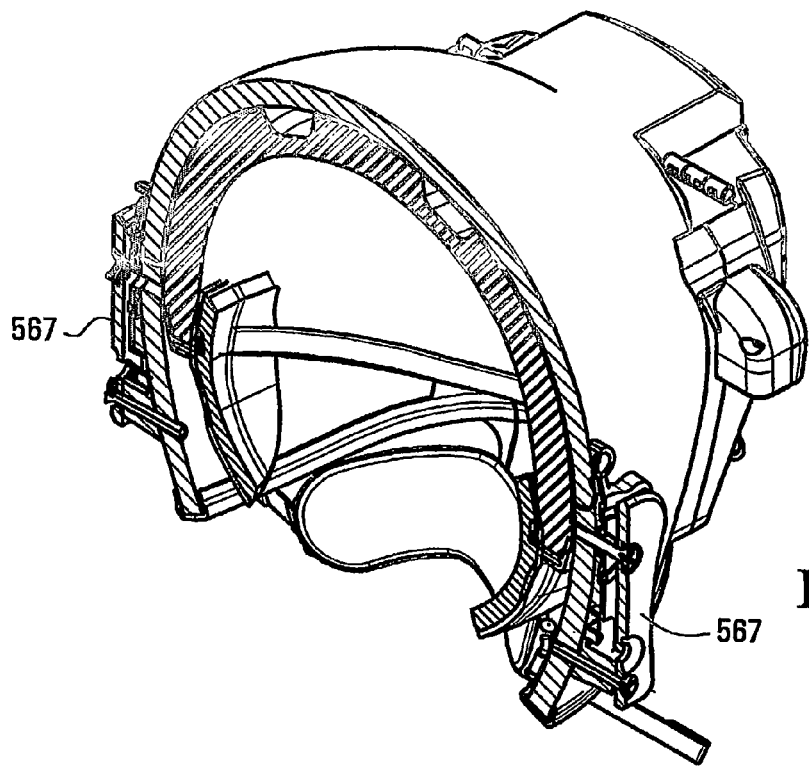
FIGS. 18A to 18D show various views through a helmet according to an embodiment of the present invention.
Figure 18B:
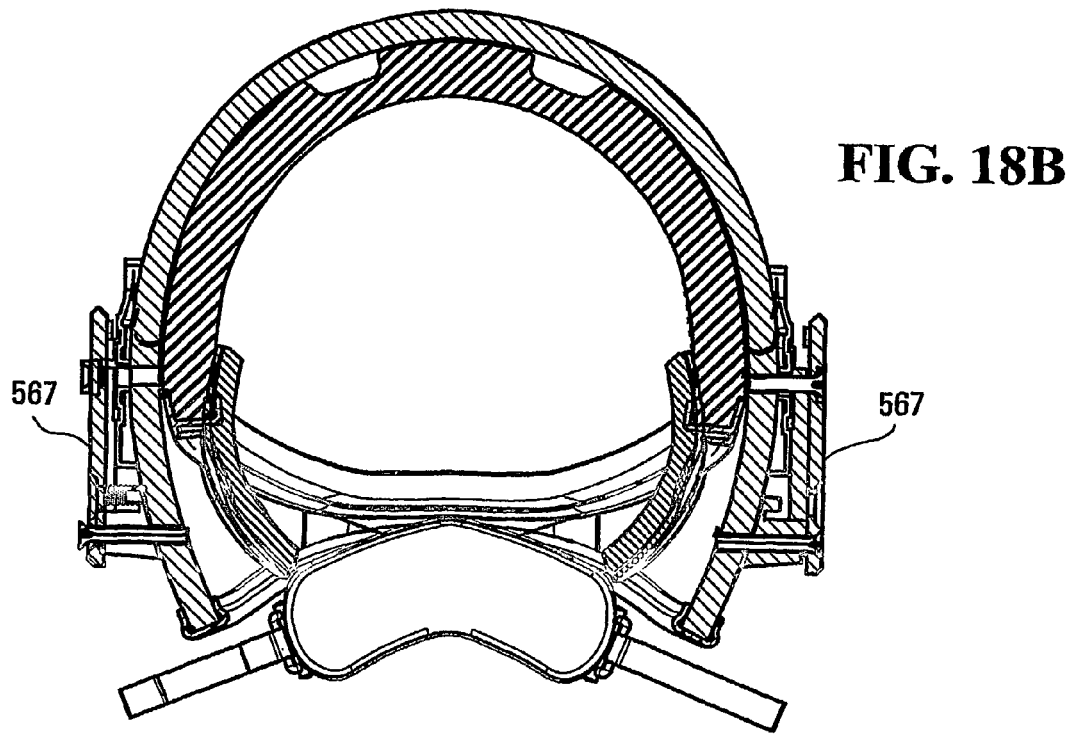
Figure 18C:
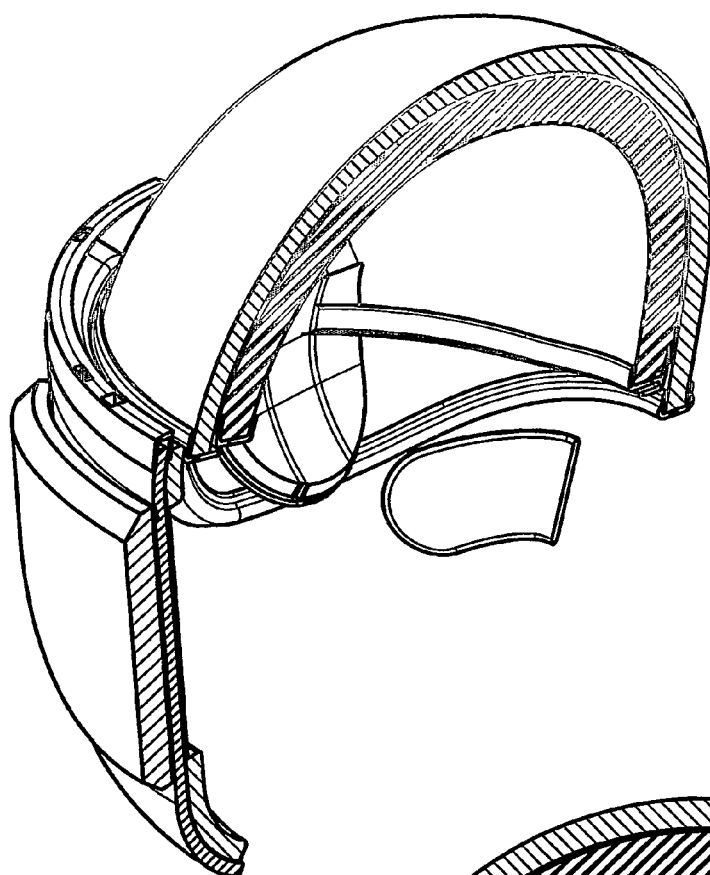
Figure 18D:
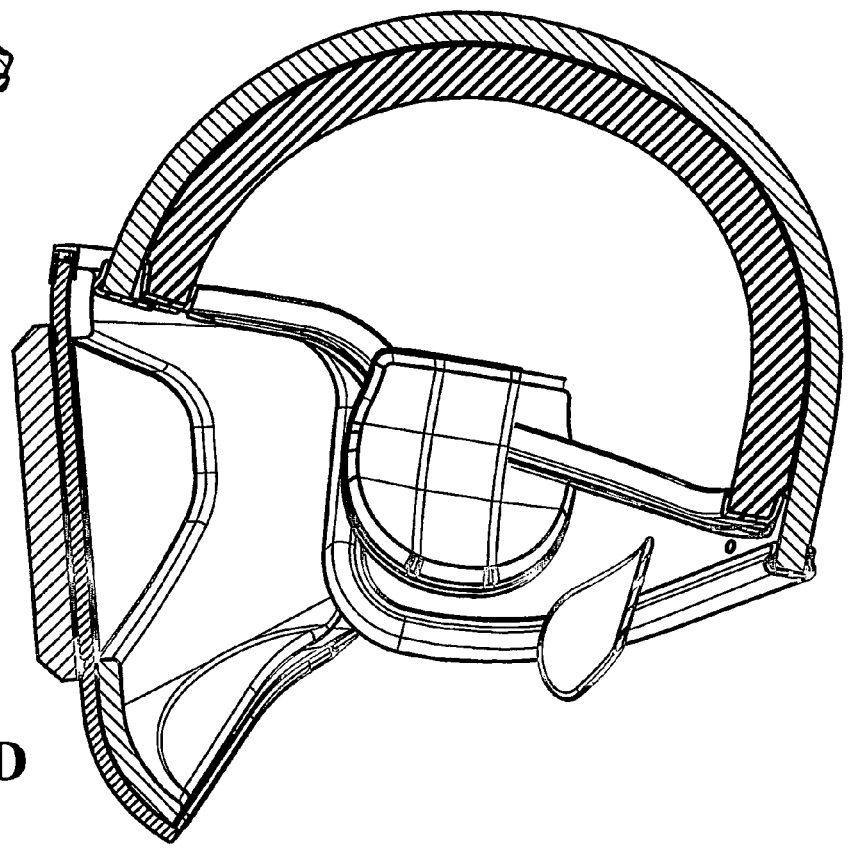

FIG. 18A shows a part cross-sectional view through an embodiment of a helmet towards the rear thereof, and FIG. 18B shows a part cross-sectional view through the helmet towards the rear thereof, FIG. 18C shows a perspective cross-sectional view through a front portion of the helmet and FIG. 18D shows a cross-sectional side view through the helmet.

Impact Absorbing Mounting

Figure 19:
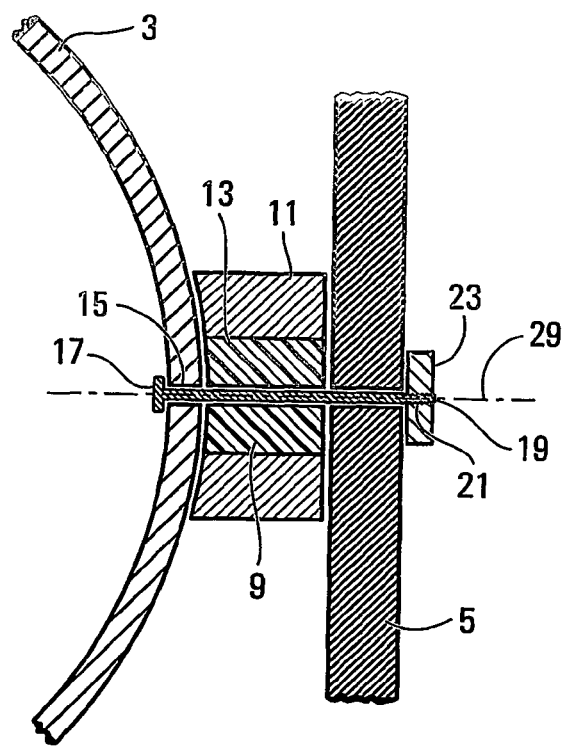
FIG. 19 shows a cross sectional view through a visor mounting system according to an embodiment of the present invention.
Figure 20:
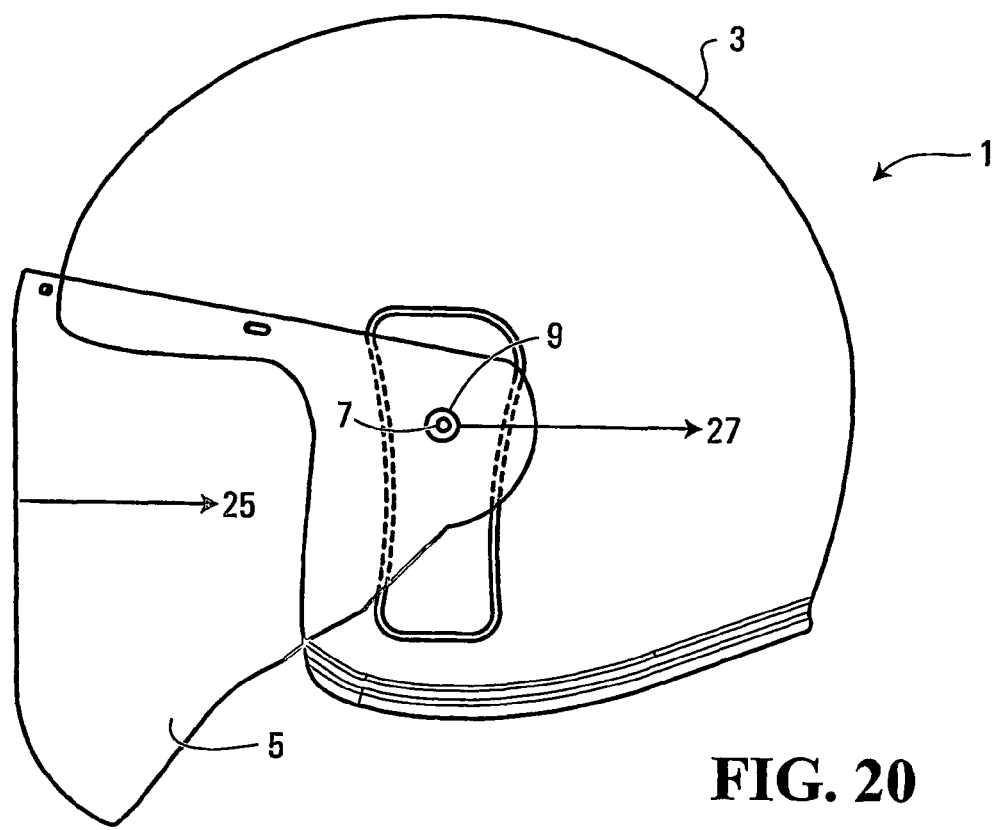
FIG. 20 shows a side view of a helmet having a mounting system as shown in FIG. 19.

FIGS. 19 and 20 show a helmet having a visor mounting system according to another embodiment of the present invention. In particular, FIG. 19 shows a cross-sectional view through a portion of the helmet and FIG. 20 shows a side view of the helmet.

Referring to FIGS. 19 and 20, a helmet 1 comprises a shell 3 and a shield 5, which in this embodiment comprises a visor disposed towards the front of the helmet (although in other embodiments, the shield member may comprise any other member for providing additional protection at another position about a wearer's head). The helmet further includes a coupler 7 for coupling the visor 5 to the shell 3 and which permits movement of the visor relative to the shell. A shock absorption member 9 is coupled to the coupler 7 and arranged to permit movement of the visor 5 relative to the shell 3 independently of the coupler 7.

In this particular embodiment, the coupler 7 comprises a pin or bolt for pivotally coupling the visor to the shell and the shock absorption member 9 comprises a bush of resilient material at least partially surrounding the coupler 7. A mounting block 11 is positioned between the exterior of the shell 3 and the visor 5 and has a receptacle 13 in which the resilient bushing 9 is accommodated. The receptacle may extend from one side of the mounting to the other, as shown in FIG. 19, or may extend partially through the mounting block. In this embodiment, the pin 7 is advantageously used also as a securing means for securing the mounting block 11 to the shell, and passes through an aperture 15 formed in the shell. The pin has an enlarged portion 17 positioned on the interior side of the shell which prevents the pin from being drawn through the aperture 15. The other end 19 of the pin includes a threaded portion 21 for receiving a nut 23 to secure the mounting and visor assembly to the shell.

In this embodiment, and as shown in particular in FIG. 20, the shock absorption member 9 is arranged to permit movement of the visor 5 in a direction towards the interior of the helmet or towards the rear of the helmet as indicated by the arrows 25, 27 in FIG. 20. In this embodiment, the shock absorption member 9 also allows movement of the visor in all directions transverse to the pivot axis 29, shown in FIG. 19 as it completely surrounds the pin. However, in other embodiment, the shock absorbing mounting may limit relative movement between the visor and shell to one direction or a limited range of directions.

Advantageously, the shock absorbing mounting system provides some mechanical decoupling of the visor or other shield member from the helmet shell, thereby reducing transmission of shock or transient forces from the visor or shield member to the shell. This may be advantageous in reducing rearward acceleration of the shell and therefore of the head of the helmet user when exposed to shock waves from a blast or explosion to the front of the helmet, and to reduce the risk of head trauma or concussion.

In other embodiments, the mounting block 11 may be omitted and the visor connected to the shell via a coupling and impact absorbing arrangement which is disposed either between the coupling and the shell or the coupling and the visor.

In another embodiment, a shock absorption arrangement, for example, a resilient member may be placed between the pin or bolt 7 and the visor 5, for example so that the shock absorption system is carried on the visor, rather than or in addition to a mounting block and/or the shell.

Generally, the shock absorption means serves to allow movement of the visor relative to the shell and limits the rate of relative movement or displacement, and may comprise any suitable element or arrangement of elements.

In another embodiment, the visor or other shield member may be slidably mounted to the helmet shell and a shock absorption element or system may be arranged between the slidable mounting and the shell and/or between the visor and the slidable mounting.

Embodiments of this mounting system may be used in any head protection system described herein.

Locking Mechanism

Further embodiments of a visor locking mechanism are described below with reference to FIGS. 21A to 21C and 22A to 22D.

FIG. 21A shows a helmet according to another embodiment of the present invention. The helmet 31 comprises a shell 33 and a visor 35 which is pivotally coupled to the shell by means of a hinge or pivot 37 to allow the visor to be raised and lowered. A locking mechanism 39 is provided to enable the visor to be locked in at least one of the lowered position and the raised position. An embodiment of a locking system is shown in more detail in FIGS. 21B and 21C. The locking system 39 comprises a rotary cam 41 which is rotatably mounted to the shell 31, and a manually accessible knob 43, which allows the cam 41 to be rotated by hand. In this embodiment, a cam mounting block 45 is provided for mounting the cam 41 to the helmet shell and which may include any suitable arrangement for rotatably supporting and retaining the cam. The visor 35 has first and second apertures 49, 51 formed therein, each having an opening 53, 55 formed in the side of the aperture to allow the cam 41 to be received within the aperture. The apertures 49, 51 are shaped and sized to allow the cam 41 to rotate within the aperture to a position which prevents movement of the cam from the aperture through the opening, thereby locking the visor in a fixed position with respect to the helmet shell.

In this particular embodiment, the cam comprises an elongate member whose width is sufficiently small to allow the cam to pass through the opening into the aperture. In other embodiments, the cam may have any other suitable form and may, for example, comprise a discrete protrusion which is spaced radially (i.e. positioned eccentrically) with respect to the cam axis 57.

Advantageously, the provision of a cam locking system allows the visor to be locked and unlocked quickly (i.e. by requiring only a fraction of a revolution thereof between locking and unlocking) in comparison to other locking mechanisms which require multiple rotations of a locking screw. Advantageously, the cam system also allows the width or profile "w" of the mounting block to be considerably reduced in comparison to locking mechanisms which use a screw-down system, where the mounting block needs to be sufficiently deep to accommodate additional thread to allow the screw lock to fully clear the visor.

FIGS. 22A to 22D show another embodiment of a locking mechanism for locking a visor to a helmet shell. In particular, FIG. 22A shows a top view of the locking system, FIG. 22B shows a plan view of the locking system, FIG. 22C shows a cross-section through the locking system and FIG. 22D shows a perspective view of the locking system. The locking system shown in FIGS. 22A to 22D may be incorporated in any helmet disclosed herein, as well as others, and may for example replace the locking mechanism described above with reference to FIGS. 21A to 21C. Referring in particular to FIG. 22C, the locking system 71 comprises a lock 73 for preventing movement of a visor relative to a helmet shell, and a manually accessible, depressible member 75 which is adapted to release the lock on depression thereof to release the visor from the locked position. In one embodiment, the locking system comprises a mounting block 77 which conveniently accommodates components of the lock assembly and has a mounting face 79 for mounting against a helmet shell (not shown). The mounting block includes a recess 81 for accommodating the lock 73. A bias 83 is provided for urging the lock 73 out of the recess 79 and which may comprise a bias spring located within the recess 81. The locking system further includes a mounting member 85 which is fixedly mounted to the mounting block 77 and has an aperture 86 formed therein for receiving the depressible member (e.g. button) 75. The mounting member 85 serves to retain the movable member or lock 73 at least partially within the recess 79 when the button is released and guides reciprocal movement of the button 75 and the lock 73. In use, a visor 35 is positioned between the mounting member 85 and the mounting block 77 and has at least one aperture formed therein, for example, aperture 227, 229 of embodiments of the visor shown in FIGS. 11 and 12, and which correspond to the positions in which the visor is to be locked. The apertures include an opening 2311, 233 (FIGS. 11 and 12) in the side thereof which is sufficiently large to accommodate the diameter of the button shaft 87 but which is smaller than the diameter or width of the locking member 73.

In operation, depression of the button 75 moves the locking member 73 into the recess 81, allowing the button shaft 87 to pass through the opening of the visor aperture (FIGS. 11 and 12), thereby releasing the visor from the locked position so that the visor can be raised or lowered, as required. Once the visor assumes a position in which the visor can be locked with respect to the shell, release of the button allows the locking member 73 to move into the visor aperture under the force of the biasing spring, thereby locking the visor in place. Advantageously, the visor may be arranged to engage the shoulder 89 of the locking member 73 once the locking member, in its retracted position, is no longer aligned with a visor aperture so that the button 75 remains depressed until the visor assumes a second locking position or re-assumes the original locking position in which a visor aperture becomes aligned with the locking member. This arrangement allows the visor to be moved into a locking position without the need to depress the button a second time or to continually depress the button when moving the visor from one locking position to another position.

Advantageously, the locking arrangements according to embodiments of the present invention allow the visor to be unlocked, moved and relocked with one hand, and reduce the width or profile of any mounting block that may be used.

In the embodiment of FIGS. 22A to 22D, the mounting block 77 also includes a mounting for pivotally mounting the visor to a helmet shell. Advantageously, the pivotal mounting may include shock absorption means between the mounting 77 and the visor 35 to reduce the transmission of shock from the visor to the mounting and subsequently to the helmet shell, or vice versa, as for example, described above with reference to FIGS. 19 and 20.

In one embodiment, the mounting assembly may optionally include a clip 91 for holding a light source, e.g. a torch or flashlight (not shown) or other device such as a camera. A mounting 88, which may be similar to that shown in FIG. 7 may be provided for a microphone.

Helmet Retention System

FIGS. 23A to 23E show examples of embodiments of a helmet retention system. Referring to FIGS. 23A to 23E, a helmet retention system 301 comprises first and second strap guides 303, 305 for mounting on each side of a helmet in a position for supporting a strap which passes under the chin of a wearer. The retention system includes a strap 307 which passes through and between each strap guide 303, 305, the portion of the strap between the strap guides forming a chin strap 309. The retention system further includes a support member 311 for coupling to the rear of a helmet and for engaging a portion of the head or neck of a wearer, when in use. In this embodiment, the support member includes flexible members 313, 315 for movably coupling the support member 311 to a helmet. The strap 307 extends rearwardly towards the support member 311, and the retention system includes two pull members 317 (only one of which is shown in FIGS. 12 to 14) which extend from the support member 311 and which are arranged to cause the length of the strap 307 extending from the support member, 311 through the strap guides 303, 305 to shorten on pulling the pull members 317. A toggle 319 or other member or feature may be provided on one or both pull members to allow the pull members to be gripped more easily.

In the present embodiment, the pull members are part of the strap 307 and the retention system comprises additional strap guides 321 which are connected to the support member 311. Each strap guide 321 comprises a cylindrical guide member 323 and a bar member 325 extending from the cylindrical guide member and forming an aperture along its length. Each strap passes around the cylindrical member and through the aperture, thereby causing the strap to change direction and allowing the length of the strap which extends from the additional guides 321 and through the first and second guides 303, 305 to be shortened by pulling on the portion of the strap, which extends beyond the other side of the additional strap guides, in a direction towards the front of the retention system. In use, this single action both tightens the chin strap around the chin of the helmet wearer and tightens the support member against the back of the head or neck at the same time, considerably reducing the number of steps required to secure the helmet in position in comparison to other retention arrangements which require individual adjustment of the chin and nape supports.

Referring to FIGS. 23A to 23E, the bar member 325 is mounted on the cylindrical member in such a way that the spacing between the bar member and the cylindrical member closes on pulling the strap, thereby squeezing the strap between the bar member and the cylindrical member. On releasing the strap, friction between the strap and guide member prevents the strap slipping back through the guide member so that tension in the portion of the strap between the additional strap guides and the first and second strap guides 303, 305 can be maintained. The cylindrical member may have a high friction surface provided, for example, by surface structure and in one embodiment, may have a knurled surface.

A release mechanism may be provided to unlock the strap guides 321. In this embodiment, the strap can be released by pulling on the bar member 325 to increase the gap between the bar member and guide member and unclamp the strap. A pull-tab 326 which extends from the bar member 325 may be provided to facilitate pulling on the bar member and releasing the strap. The pull-tab 326 may have a different shape or feature to the pull-member 317 to provide a tactile or visual difference between them so that a user can easily differentiate one from the other.

A connector may be provided for releasably connecting one portion of the strap to another portion of the strap and which is positioned within the length of the strap which extends from the support member through the strap guides 303, 305. In the embodiment shown in FIG. 23A, a strap connector 327 is provided in the portion of the strap between the first and second strap guides 303, 305, and is positioned to one side, so that, in use, the connector is positioned to the side of the face, rather than under the chin. This positioning is possibly more convenient for both access and comfort. Advantageously, this embodiment thus provides two independent release mechanisms to allow a helmet to be removed. The connector 327 may comprise a quick release connector to facilitate removal of the helmet in an emergency, or simply for convenience. In the embodiment shown in FIG. 23A, a chin pad 330 is provided for additional comfort. In this embodiment, the chin pad is sized to extend above the jaw and is positioned behind the connector 327 in order to prevent direct contact between the connector and the face, again for increased comfort.

Figure 23A:
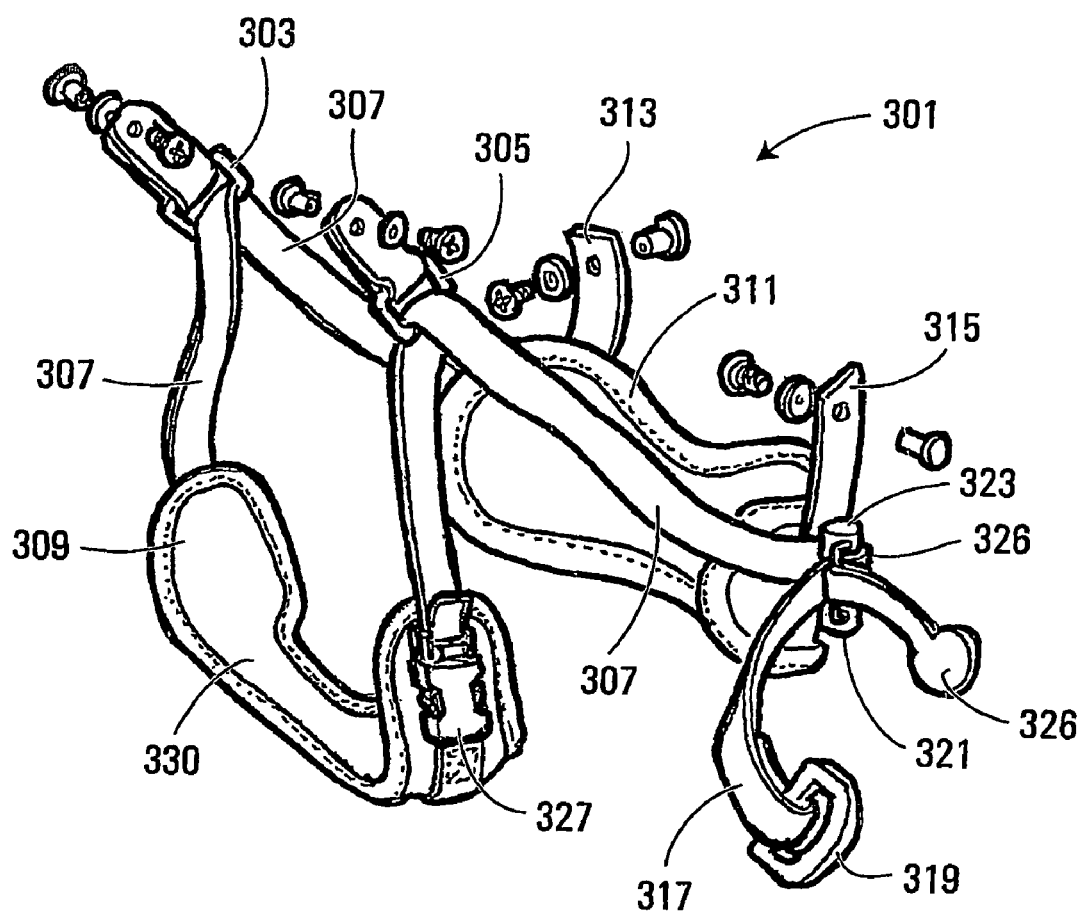
FIGS. 23A to 23E show various views of a helmet retention system according to an embodiment of the present invention.
Figure 23B:
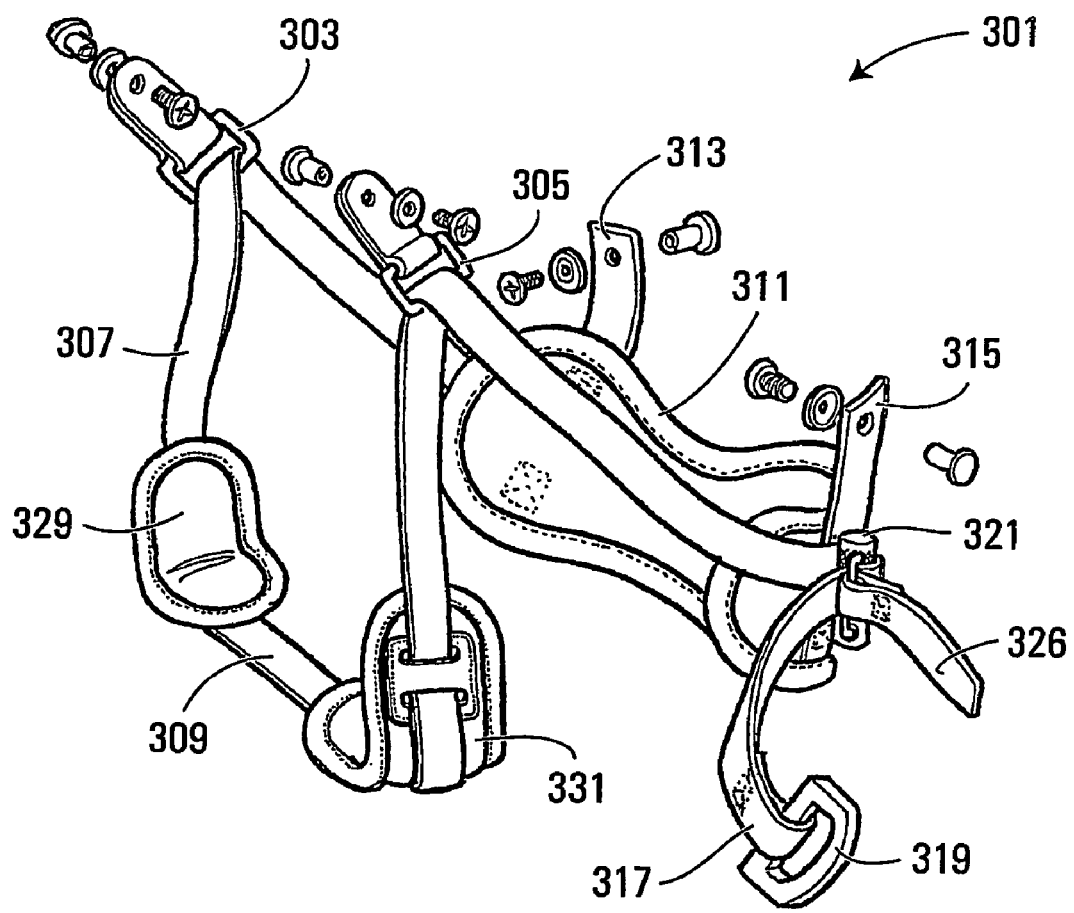

FIG. 23B shows another embodiment of a retention system which includes two separate chin pads 329, 331 each being slidably mounted on the strap 307 so that its position can be adjusted to suit an individual user.

Figure 23C:
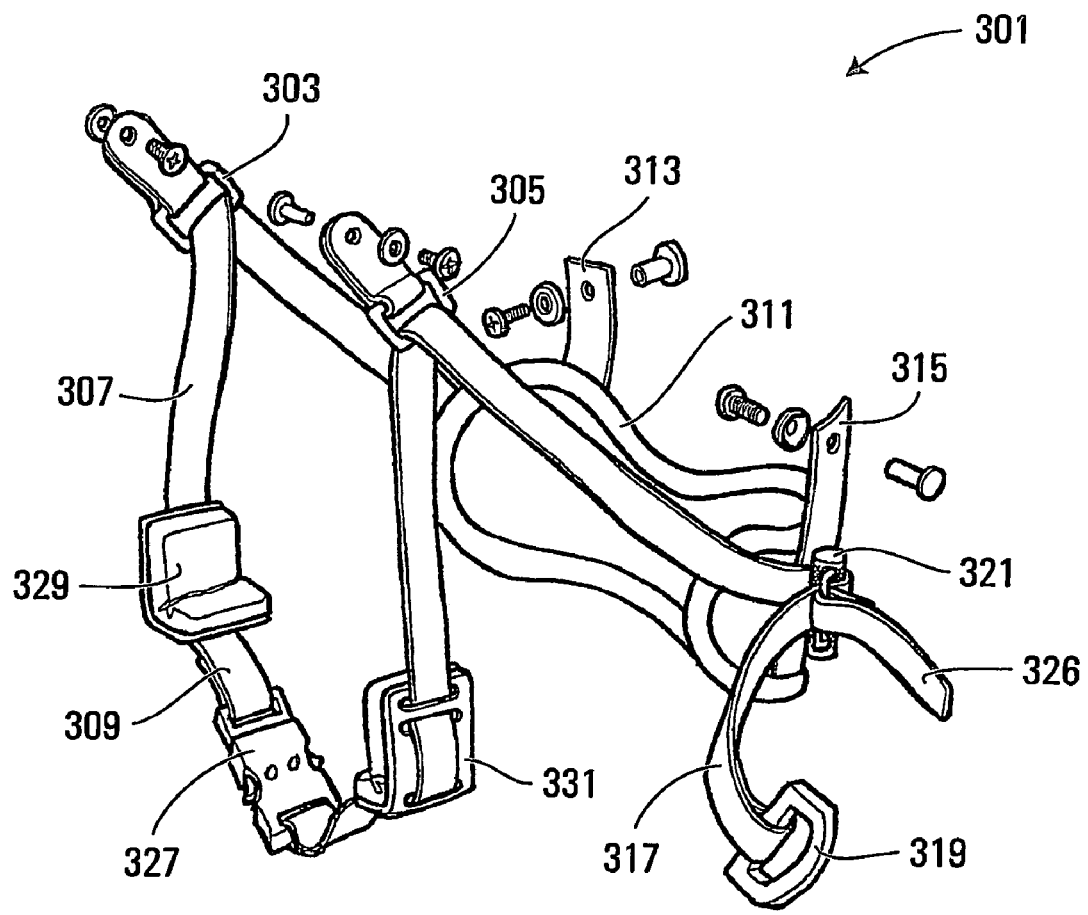
Figure 23D:
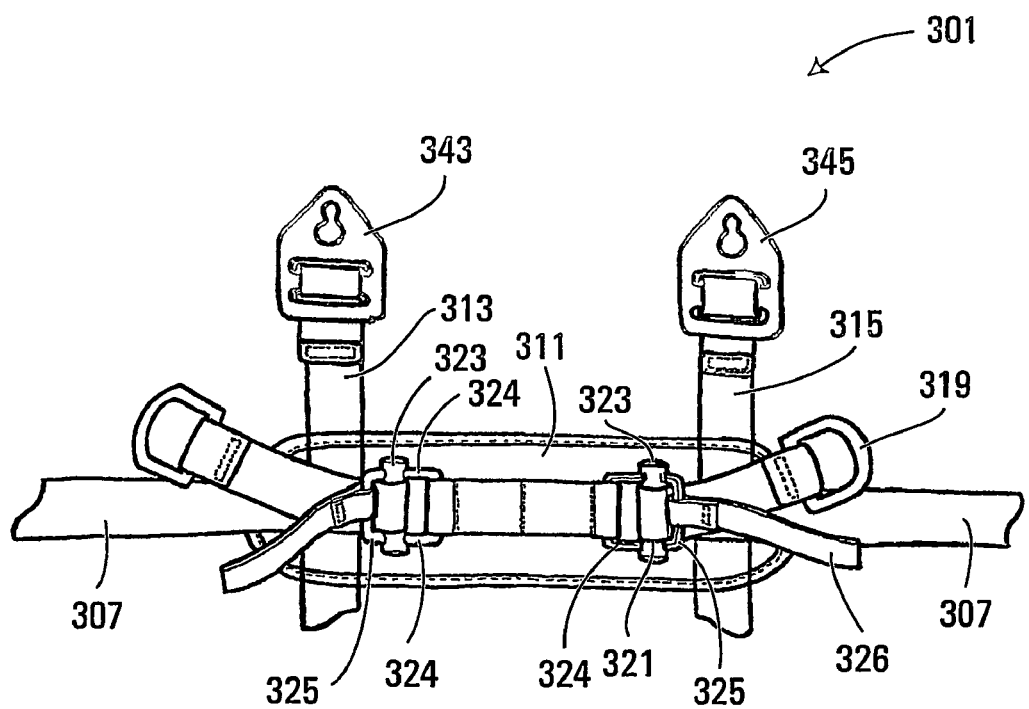
Figure 23E:
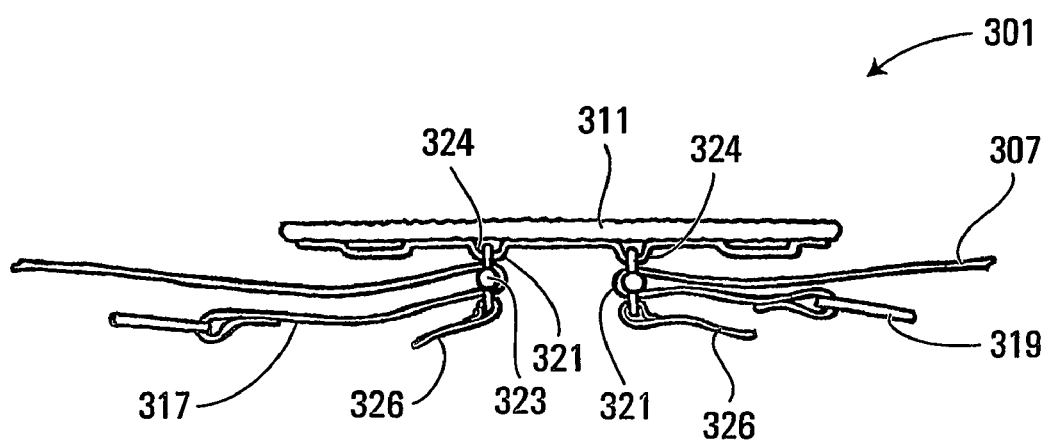

FIG. 23C shows another embodiment of a retention system which also includes two adjustable chin pads 329, 331, and a connector 327 positioned therebetween, so that in use, the connector is positioned under the chin. FIGS. 23D and 23E show part of a helmet retention system in more detail, and in particular, FIG. 23D shows a rear view of a support member and associated strap guide assembly and FIG. 23E shows a top view of the embodiment shown in FIG. 15D.

FIGS. 23D and 23E illustrate an embodiment of each of the additional strap guides in more detail, and which may be used as the additional strap guides in the embodiments of FIGS. 23A to 23C. Each strap guide comprises a roller or knurled buckle having a substantially rectangular ring 324 and a cylindrical member 323 slidably received on two arms of the ring via through holes. One side of the ring is secured to the support member 311 and the other side 325 provides a bar member which, with the cylindrical member provides a clamp for clamping the strap 307 when the strap is pulled and the cylindrical member 323 is thereby urged towards the bar member. To release the clamp, the bar member is simply swung away from the support member 311, as for example, shown in FIG. 16, which causes the cylindrical member to slide away from the bar member 325 expanding the gap therebetween and releasing the strap 307.

In this embodiment, a clip 343, 345 is provided on each flexible member 313, 315 to facilitate mounting and removal of the helmet retention system to and from a helmet. In this particular embodiment, each clip has a T-hole for registration with a corresponding T-screw mounted on the helmet.

Advantageously, the chin strap may be arranged to be worn under the chin or jaw and away from the front of the chin, to allow the helmet to be worn with a respiratory device such as a gas mask.

Further Embodiments of a Retention System

Figure 24A:
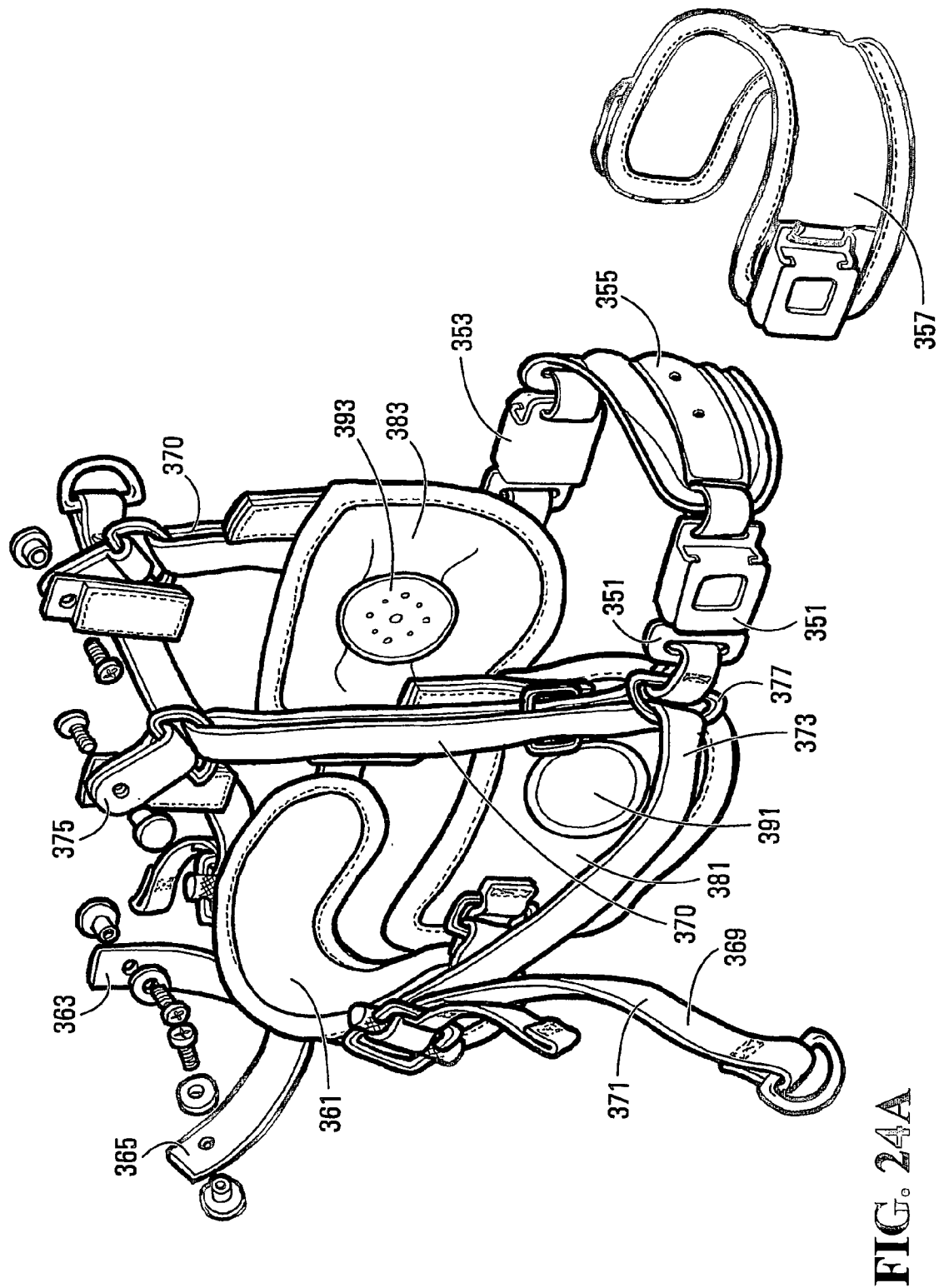
FIGS. 24A and 24B show a helmet retention system according to another embodiment of the present invention.
Figure 24B:
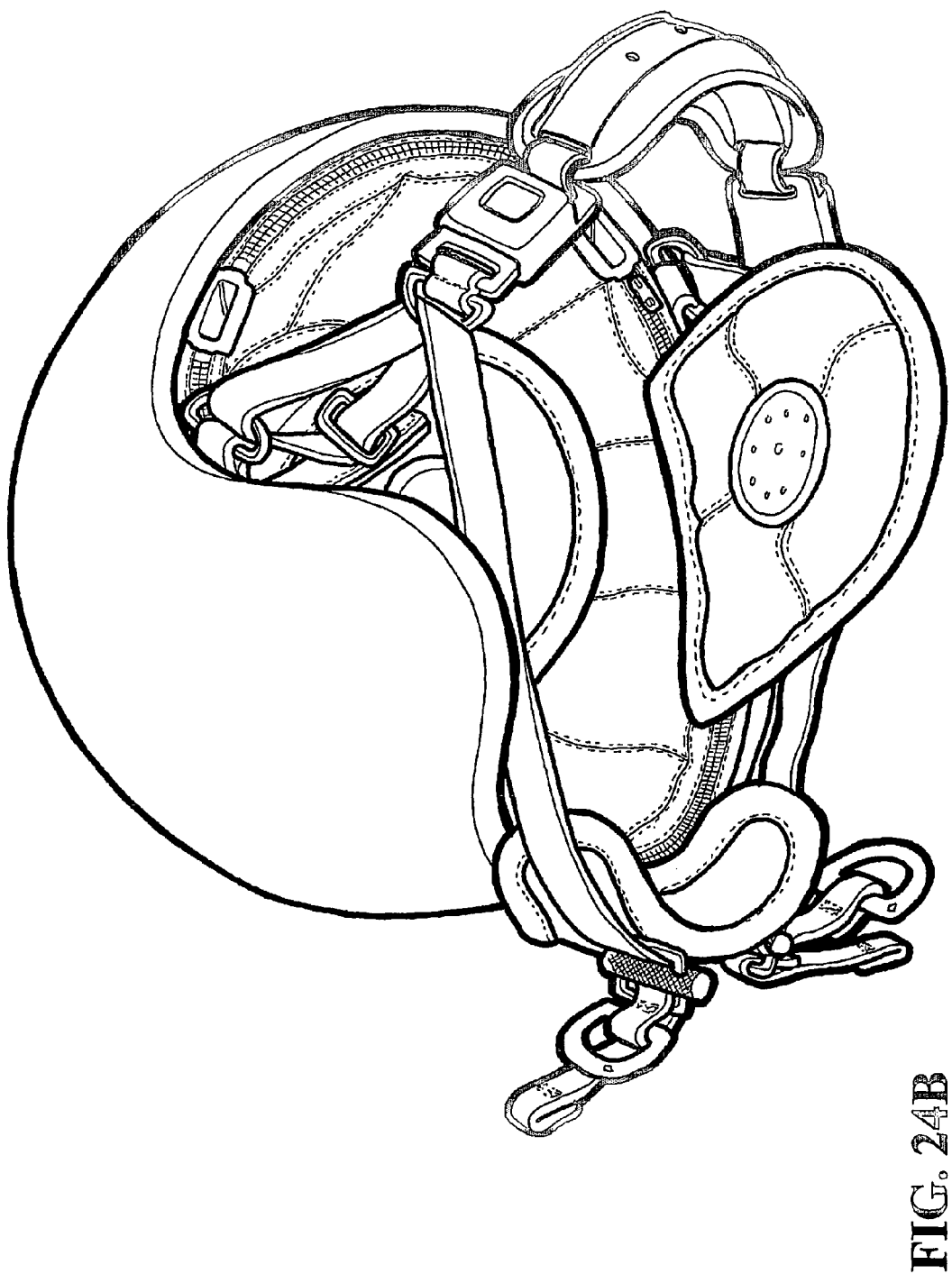

FIGS. 24A and 24B show another embodiment of a retention system for a helmet, which in certain respects is similar to the retention systems shown in FIGS. 23A to 23E and described above but also with some significant differences. In particular the retention system includes a connector 351, 353 either side thereof for releasably connecting either a chin cup 355 or an under-the-jaw strap 357. Advantageously, this allows a chin cup or an under-the-jaw strap to be used with the retention system as desired, or required by the wearer. Furthermore, as a chin cup cannot be used with a respirator or gas mask, this arrangement allows the chin cup to be replaced with an under-the-jaw strap when a respirator is used. The connectors in this particular embodiment are miniature seatbelt-type buckles and the male connector may be either on the retention system or the chin cup or strap and the female on the other, or vice versa.

Figure 24C:
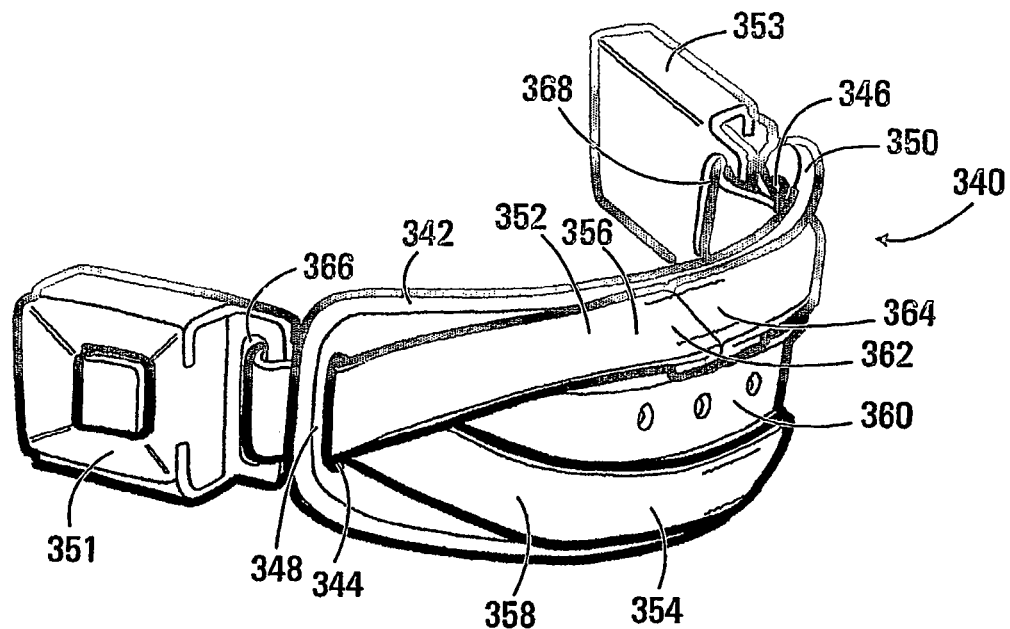
FIG. 24C shows a perspective view of a chin cup according to an embodiment of the present invention.
Figure 24D:
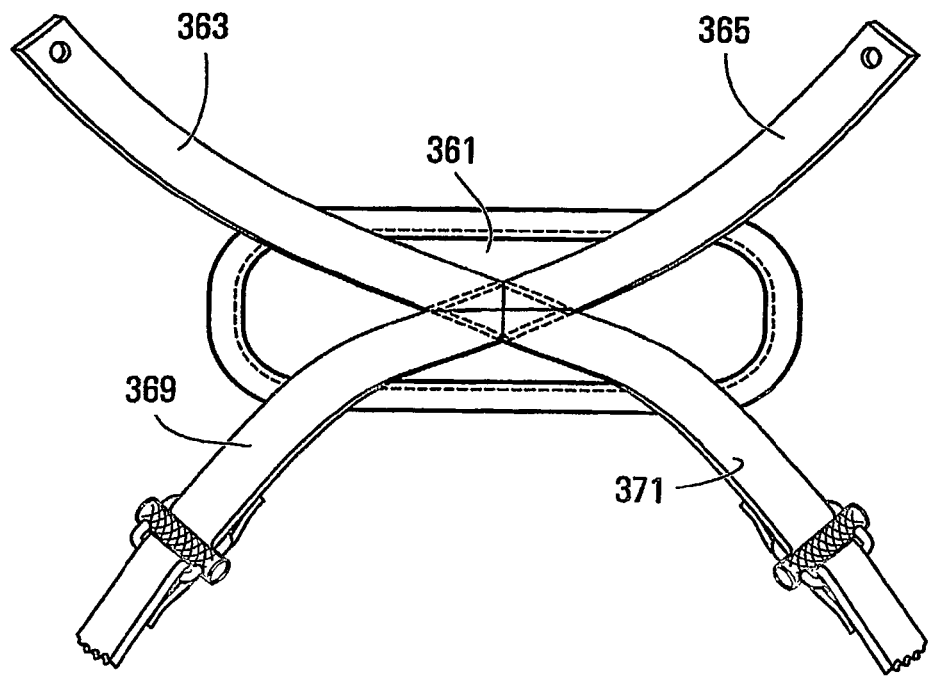

Another important difference between the retention system shown in FIGS. 24A and 24B and that described above in conjunction with FIGS. 23A to 23E, is concerned with the nape support 361, as best shown in FIG. 24C. In the present embodiment, the straps 363, 365 which join the nape support 361 to the back of a helmet extend from the nape support at an angle (rather than substantially vertically) and are directed and may meet at a common region 367. The adjustable straps 369, 371 extend from the nape support 361 downwardly at an angle (rather than horizontally) and are also directed towards and may meet at the common region 367. The inventors have found that this arrangement in which the support and adjustable straps are directed towards a common region of the nape support prevents bunching or buckling of the nape support when the adjustable straps are pulled tight to secure the helmet on a wearer's head. Furthermore, the downward angle of the adjustable straps makes it possible to pull the adjustable straps forward and downwards, rather than requiring the straps to be pulled sideways as the former motion requires less effort and is more natural.

In the present embodiment, the adjustable straps 371, 369 pass from the nape support 361 to a lower portion of the retainer 373 and then upwards to a connector or securing means 375 for securing the retainer at the side or front portion of a helmet. In this embodiment, the lower portion includes a slip ring 377 which is coupled to the chin cup or strap connector 351.

In this embodiment, the retainer also includes side supports or pads 381, 383 which, in use, are placed against side portions of a users head or face for additional comfort and also provide additional surface area over which the retainer is secured to a person. The side pads 381, 383 also keep the upwardly extending portion 370 of the adjustable straps away from a wearer for additional comfort. The side supports may optionally include a speaker 391, 393 for audio communication.

FIG. 24C shows a chin cup according to another embodiment of the present invention which may be used with the helmet retention system described above with reference to FIGS. 24A and 24B, or may be used in any other helmet retention systems. The chin cup 340 comprises a chin pad 342 having apertures 344, 346 positioned at or near each end 348, 350 for permitting the chin pad 342 to be coupled to connectors 351, 353. The chin cup further includes upper and lower straps 352, 354 which pass from the connectors 351, 353 through the apertures 344, 346 and around and against the front of the pad 342. The upper strap 352 extends upwardly from the apertures 344, 346 and is positioned against an upper portion 356 of the chin pad 342 and the lower strap 354 extends generally downwardly from each aperture and is positioned against a lower portion 358 of the chin pad. One or both straps may be held at one or more suitable positions along its length to ensure that it does not slip towards the middle portion 360 of the chin pad. In this embodiment, the first and second straps 352, 354 are formed from the same strap, although in other embodiments, the upper and lower straps may comprise separate straps. In this particular embodiment, the upper and lower straps are formed by placing a middle portion of a continuous strap against the lower portion of the chin pad and through the apertures, looping each end 362, 364 of the strap through a respective aperture 366, 368 in each connector 351, 353, back through a respective aperture 344, 346, and joining the ends 362, 364 together by stitching or any other suitable means, to form the upper strap 352.

The provision of a split strap in which an upper portion of the strap is positioned against an upper portion of the chin pad and a lower portion of the strap is positioned against a lower portion of the chin pad has been found to considerably improve the stability of the chin cup when held against a wearer's chin, and in particular has been found to provide a more secure fit and prevent or reduce the tendency for the chin cup to slip off the chin by either riding upwards or downwards. In use, generally the upper strap is positioned above the chin protruberance, and the lower strap is positioned below the chin protruberance. Advantageously, the chin pad may comprise a relatively flexible material, and/or may have a non-slip surface to assist in preventing slippage of the chin cup and maintaining the chin cup in the desired position.

The chin cup may comprise any suitable material and in various embodiments, the chin cup or pad may comprise a thermoplastic elastomer with a soft durometer that may possess any or all of the following properties: hypoallergenic and/or flame resistant and/or chemical resistant. The material could include grades of Santopreme™, for example the medical grade of Santopreme™.

Comfort Liner

Embodiments of the head protector may be provided with an adjustable comfort liner within the head cavity of the helmet to allow the size of the head cavity to be adjusted to fit personnel with different sized and/or shaped heads. Advantageously, this allows the helmet shell (and other components of the head protector) to be manufactured in one size only, thereby reducing production costs. The comfort liner may be removable from the head cavity so that it can be washed or cleaned or transferred for use with another helmet. An embodiment of a comfort liner is shown in FIGS. 25A and 25B, and further embodiments are shown in FIGS. 25C to 25E.

Figure 25A:
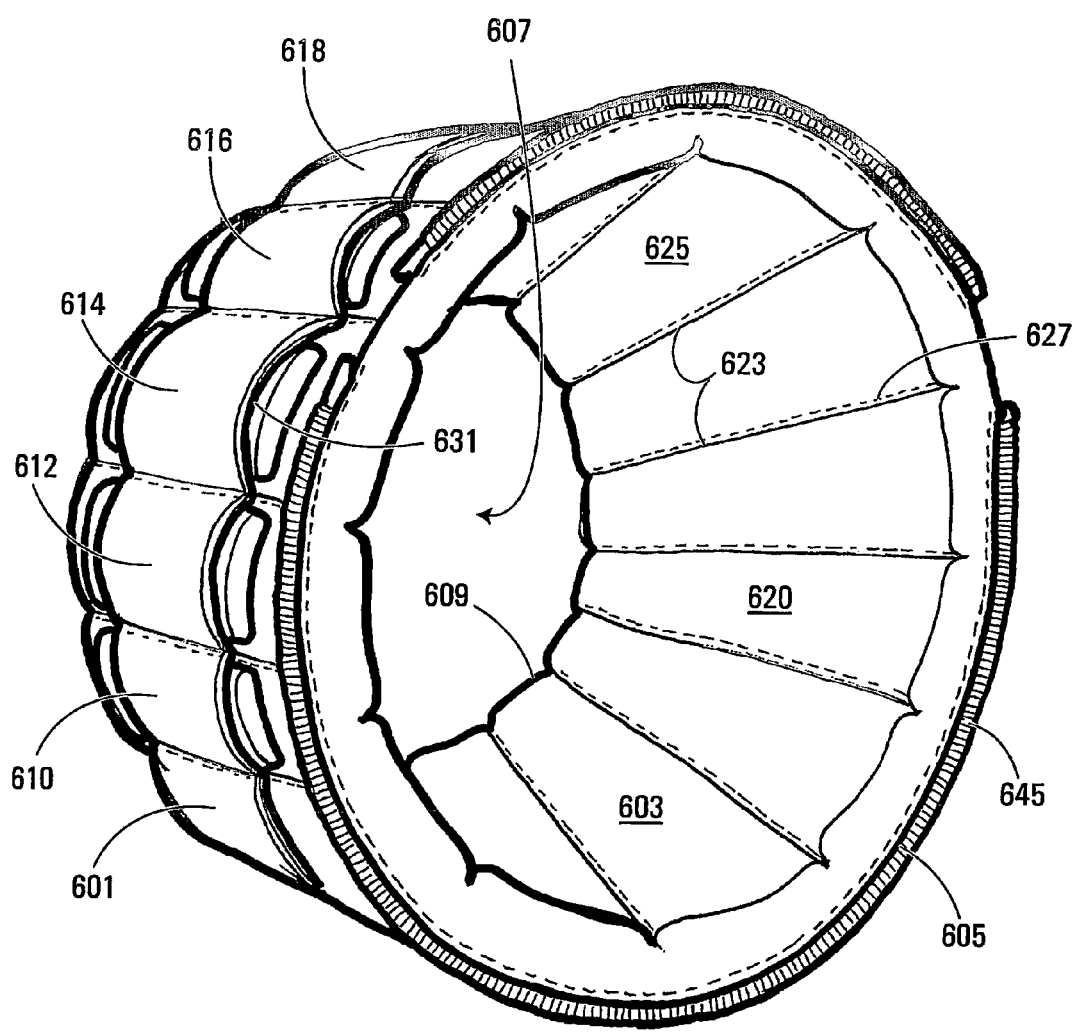
FIGS. 25A to 25E show perspective views of a comfort liner according to embodiment of the present invention.
Figure 25B:
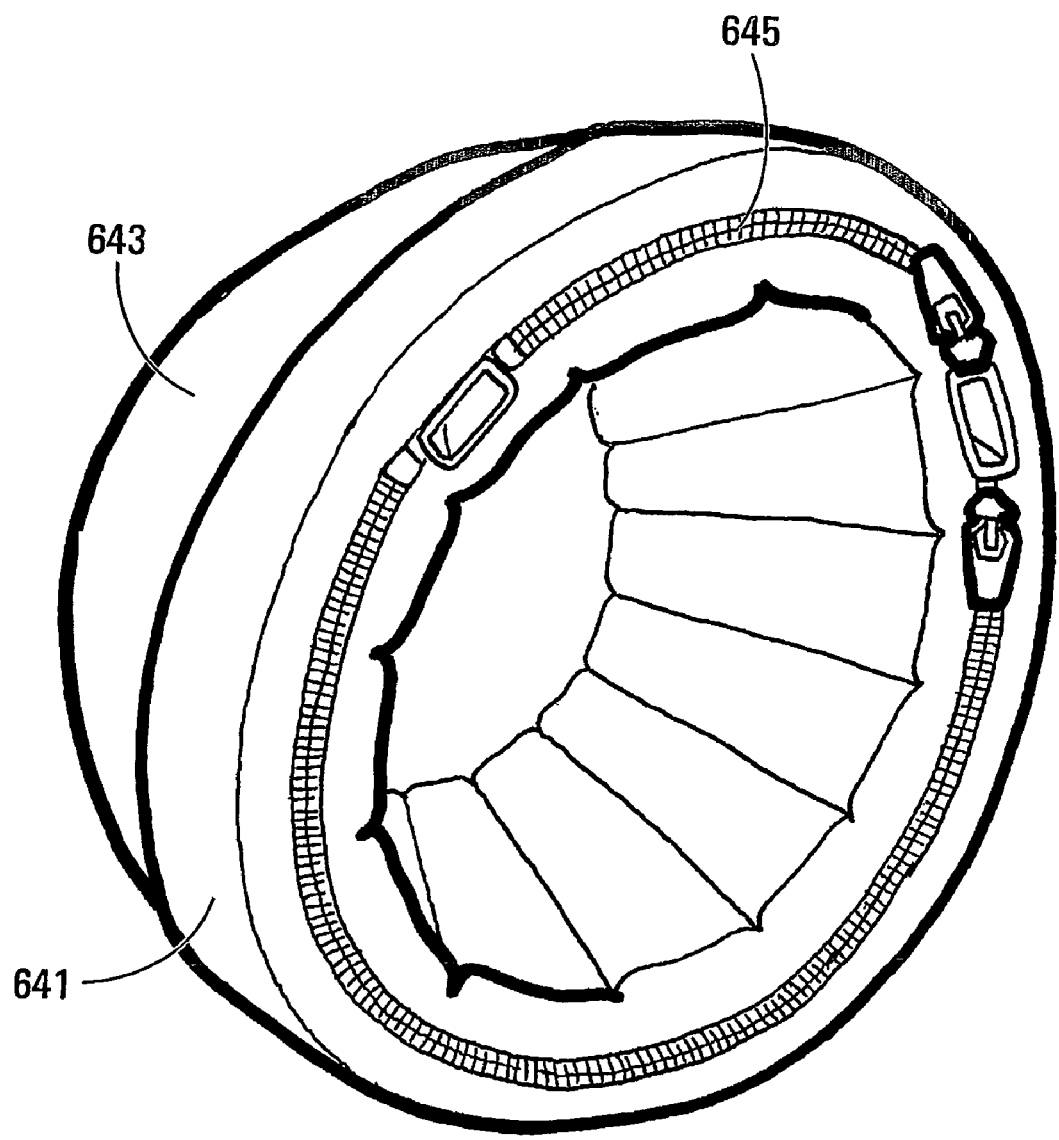
Figure 25C:
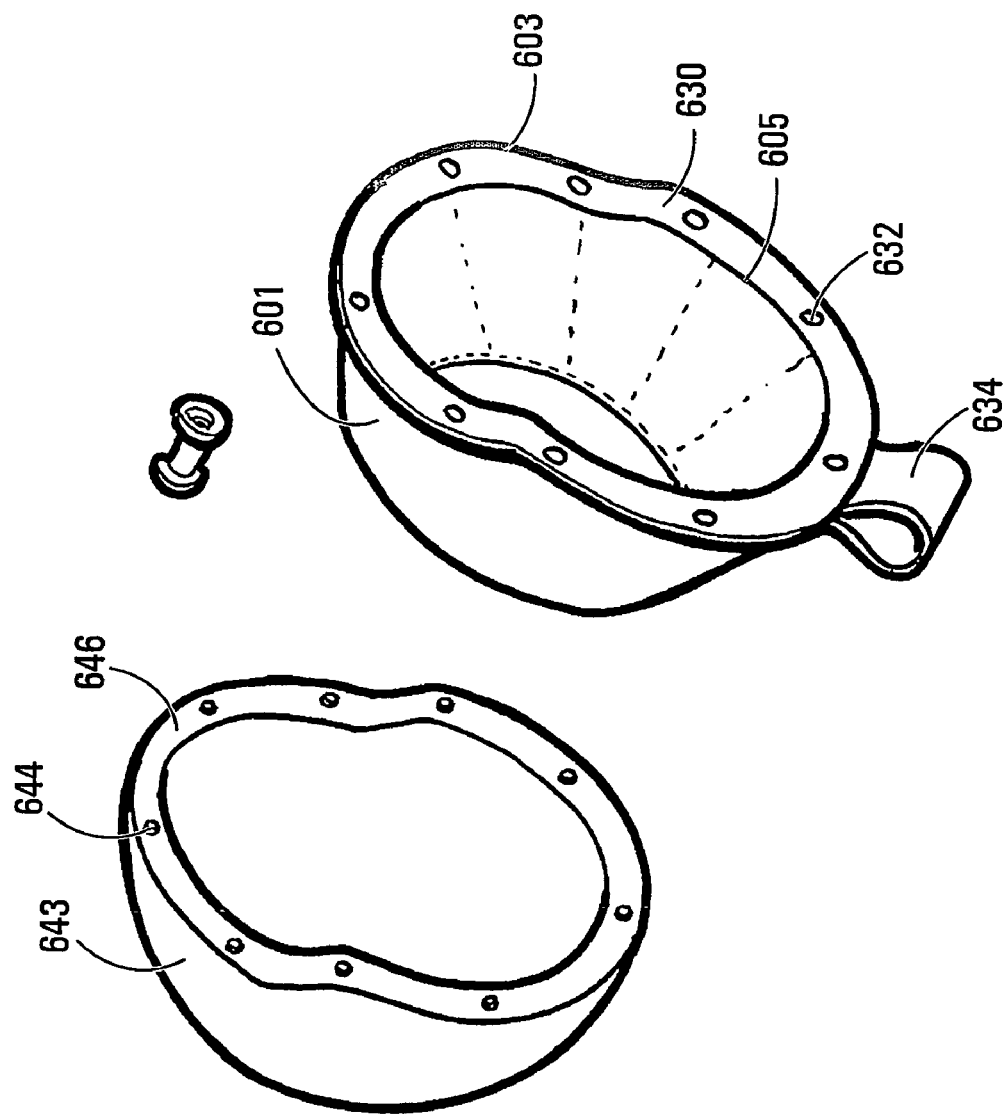
Figure 25D:
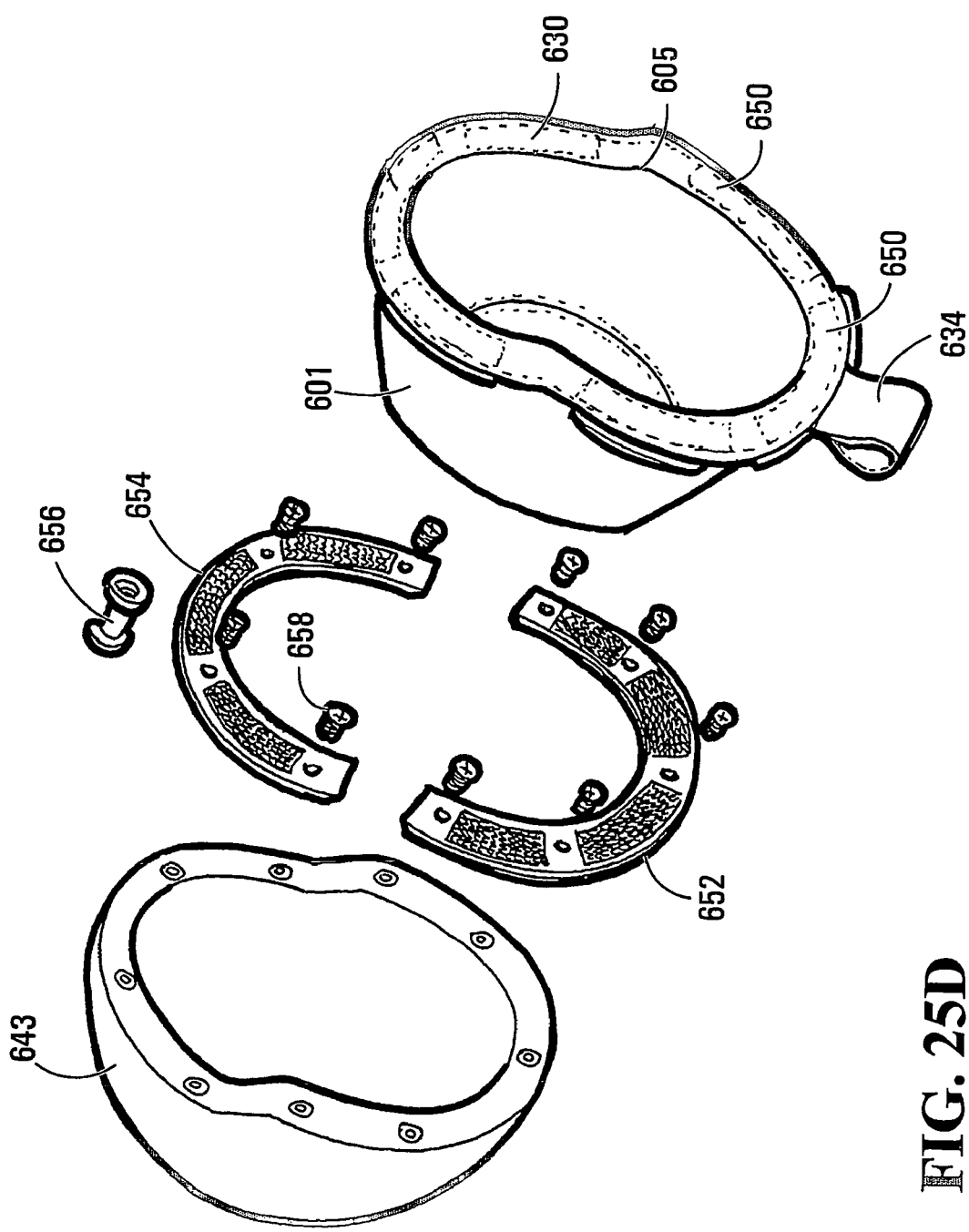
Figure 25E:
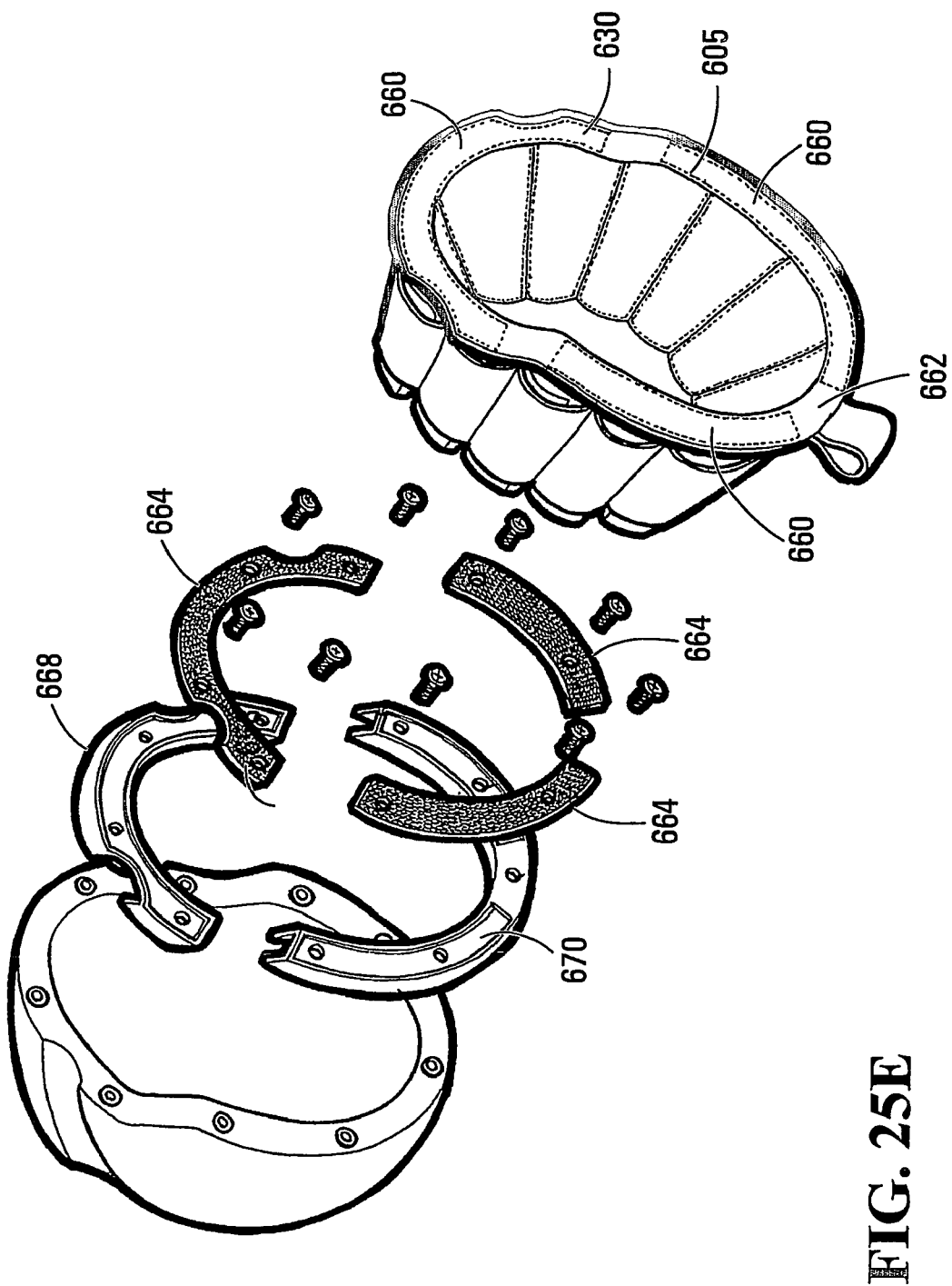

Referring to FIG. 25A, a comfort liner 601 for a helmet has the form of a cup having a side wall 603, a lower circumferential edge 605 and an upper, crown portion 607 attached to the upper end 609 of the side wall 603. A plurality of retainers 610, 612, 614, 616, 618 are provided about the side wall 603, and in this embodiment, the retainers are provided on the side of the wall which lies internally of the helmet head cavity and shall therefore be referred to as the internal wall of the liner. However, in other embodiments, one or more retainer may be disposed about the exterior wall 620 of the liner which faces towards a users head.

The side wall of the liner may comprise any suitable material and preferably comprises a cushioning material. The side wall has fluted, panel-shaped portions extending from an upper portion to a lower portion thereof, and which may be formed by stitching 627 (as shown by the dashed lines). The retainers may be formed by a band of material extending about the interior wall of the liner, spaced portions of the band being attached to the liner to form a pocket 631 therebetween. Advantageously, the band may be secured to the liner by the same stitching which provides the fluted panels 623, 625.

To adjust the size of the head cavity within the liner, packing inserts may be provided and inserted into the retainers 612, 614 at selected positions about the liner to achieve a size and shape of head cavity which best fits a particular individual. The inserts may be formed of any suitable material, preferably a resilient material such as a suitable foam or other material. The retainers 612, 614 may also be made of any suitable material, including a resilient material such as foam. The liner may be formed of a fire resistant material in order to meet required safety standards.

To secure the insert to the helmet, in one embodiment, use is made of an impact absorption insert placed between the liner and the helmet shell. Referring to FIG. 25B, a band of material 641 is placed over an impact absorption insert 643 and fits tightly therewith about the lower portion of the insert. As the insert 643 becomes wider towards its lower edge, the retaining band tightens against the insert as the band is pulled towards the edge so that the band cannot easily be pulled off from the edge, if at all. The retaining band contains connection means for connecting the liner to the band, which in one embodiment may comprise a zipper. In the embodiment shown in 25B, one side of a zipper 645 (or zippers) is secured to the retaining band 641 and the other side of the zipper 645 is attached to the liner, as shown in FIG. 25A. During the production process, the retaining band 641 is secured in place over the impact absorption insert 643 and the combination is then inserted into the helmet shell.

In other embodiments, the packing insert retainers may be formed by any other suitable means and may extend about the entire liner or only a portion or portions thereof.

The crown portion 607 may also be provided with one or more retainers for retaining packing material to allow the height of the head cavity to be adjusted to suit an individual wearer.

Embodiments which use alternative methods to attach the comfort liner to an impact absorption insert will now be described with reference to FIGS. 25C to 25E.

FIG. 25C shows a comfort liner 601 according to another embodiment of the present invention, and an impact absorption insert 643. The comfort liner 601 may be similar to that described above and shown in FIGS. 25A to 25B and like parts are designated by the same reference numerals. In this embodiment, the comfort liner has an outwardly extending peripheral band (or collar or flange) 603 positioned at its lower edge which carries a plurality of spaced apart fastening members 632. The impact absorption insert 643 has a plurality of complementary fastening members 644 positioned about its lower peripheral edge 646 and which are positioned to register with the fastening members 632 of the comfort liner. The comfort liner and absorption insert fastening members may have a male/female configuration and the female member may be attached to the comfort liner and the male to the absorption insert, or vice versa. In one embodiment, the female fastener may comprise a button and the male fastener may comprise a corresponding stud. In this embodiment, the comfort liner is secured to the impact absorption insert by simply pressing the fastening member pairs on the comfort liner and insert together. One or more tabs or loops 634 may be provided on the comfort liner which is accessible when the comfort liner is attached to the impact absorption insert to facilitate removal of the comfort liner from the insert. In one embodiment, the tab or loop may be positioned at the rear or side of the helmet so as not interfere with a wearer's face.

FIG. 25D shows another means for releasably fastening the comfort liner to an impact absorption insert. In this embodiment, the comfort liner 601 (which may be similar to that described above) has an outwardly extending peripheral band (or collar) 603 positioned at its lower edge 605 which carries a plurality of fastening strips 650 which may comprise Velcro™. Complementary fastening strips 652 are provided about the peripheral edge 646 of an impact absorption insert 643, and in this embodiment, the fastening strips are mounted on one or more carriers 654 (in this embodiment a front and rear carrier) secured to the peripheral edge 646 of the insert by any suitable means, including means which allows the carrier(s) to be removed and replaced. In this embodiment, a plurality of threaded inserts 656 are mounted in the impact absorption insert about its peripheral edge and the carriers are attached to the insert by screws which are received within the threaded inserts.

FIG. 25E shows another arrangement for securing a comfort liner to an impact absorption insert and which, some respects is similar to that shown in FIG. 25D. The comfort liner 601, which may be similar to that described above, has an outwardly extending peripheral band (or collar) 630 positioned at its lower edge 605 which carries fastener strips 660. This embodiment includes a front fastener strip and two side fastener strips which extend to the rear 662 of the comfort liner. Complementary fastening strips 664 are mounted on the peripheral edge 646 of the impact absorption insert 643 by means of one or more carriers, in this case a front carrier 668 and a rear carrier 670. The carriers are attached to the insert in a similar manner to that of the embodiment shown in FIG. 25D (i.e. with screws and threaded inserts), but in this embodiment, the screws also pass through apertures 672 formed in the complementary fastening strips 664. The complementary fastening strips may also be secured to the carriers by an adhesive or other auxiliary fastening means. In this embodiment, the fastening strips form a more continuous connection between the comfort liner and insert than the embodiment shown in FIG. 25D and the screws which pass through the fastening strips increase the strength of connection between the fastening strips and insert to increase their durability. As in the embodiment shown in FIG. 25D, the fastening strips may comprise Velcro™ material or any other suitable fastener having interactive mating surfaces. In any of the embodiments of the comfort liner described above, the peripheral band or collar 630 may be continuous or discontinuous.

Helmet Control System

Embodiments of a control system for a helmet or head protection system are described below.

Figure 26:
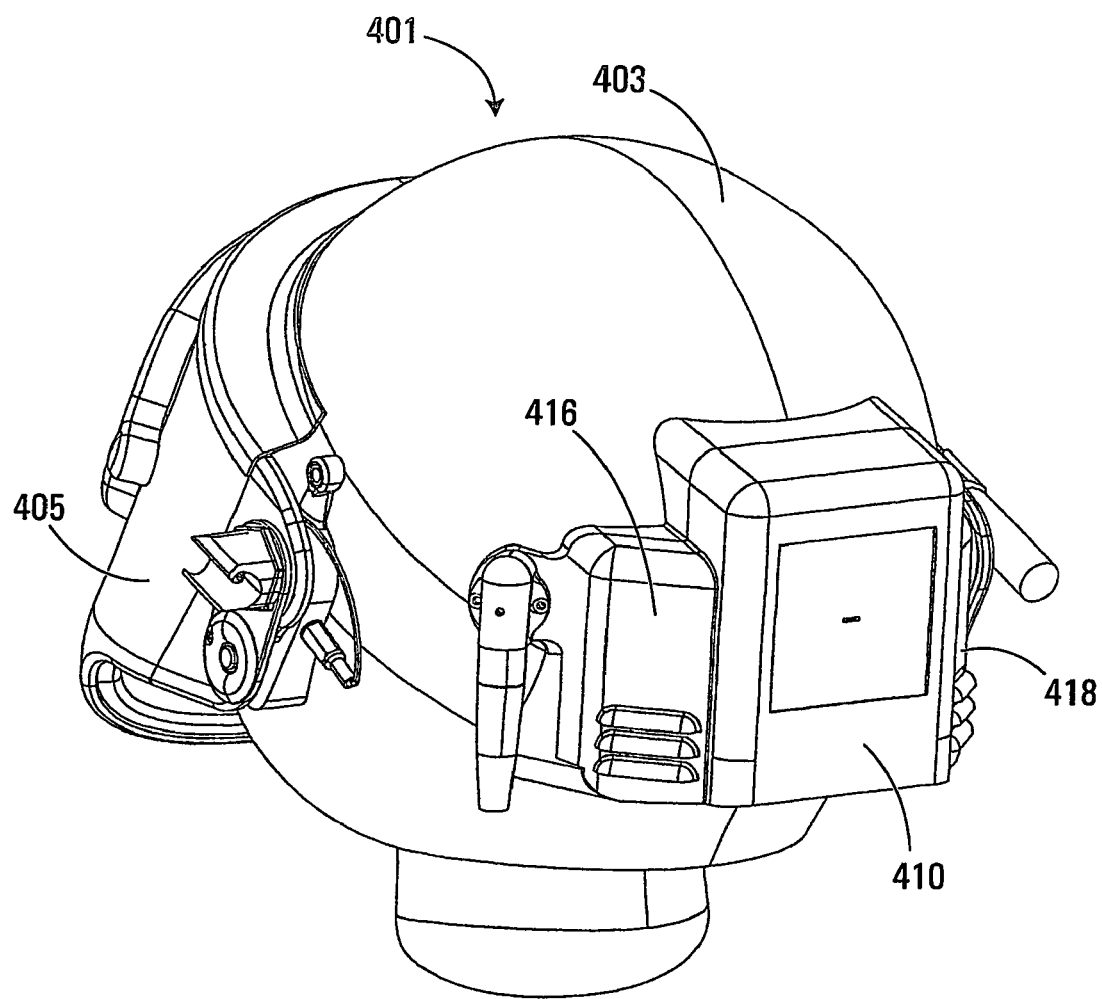
FIGS. 26 to 30 show various views of a helmet having a control module according to another embodiment of the present invention.
Figure 27:
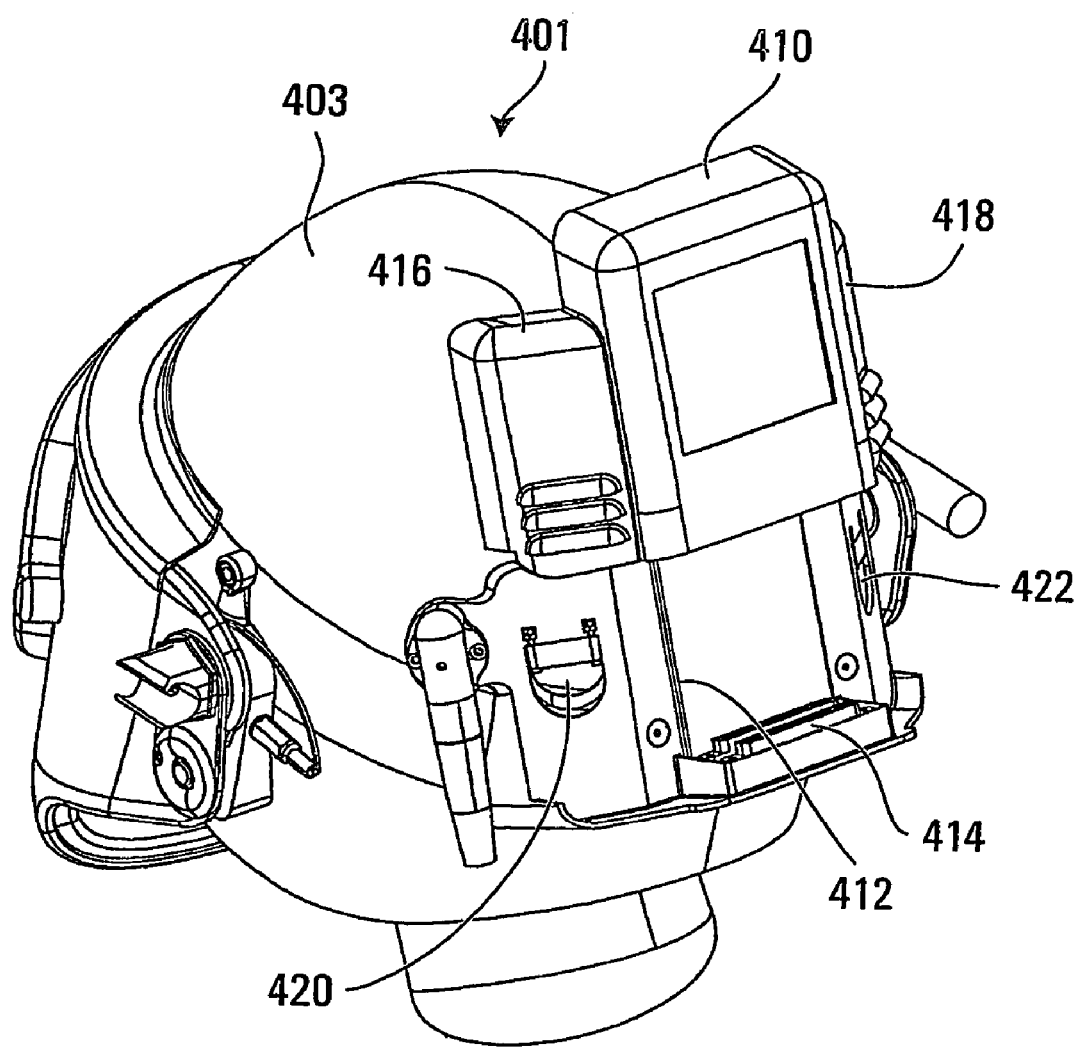

FIGS. 26 and 27 each show a perspective view of a helmet according to another embodiment of the present invention. Referring to FIGS. 26 and 27, the helmet 401 comprises a shell 403 and a control unit 410. The helmet further includes an electrically powered system providing various functions for assisting a wearer, which may be positioned at the control unit, at other parts of the helmet, or both. The control unit 410 may be arranged to control functions of the electrically powered system, such as the power delivered to the system. The control unit may include a monitoring system for monitoring a condition or function of the electrically powered system and may provide an output indicative thereof.

Advantageously, the control unit may be releasably mounted to the helmet shell to allow the control unit to be removed. This allows a faulty control unit to be readily replaced and the helmet returned to a serviceable condition in the field, rather than having to return the entire helmet to a service center for repair, in which case the helmet could be de-commissioned for some considerable time. In one embodiment, the control unit may be slidably mounted to the shell by any suitable means, and may include a retention and slidable guide system 412. The control system may include one or more electrical input/output terminals which connect with corresponding electrical input/output terminals 414 mounted on the helmet shell.

In one embodiment, the control unit includes one or more electrically powered fans or other impellers 416, 418 for providing ventilation air to the interior of the helmet, for example, through ventilation ports 420, 422. The helmet may include a microphone 415 and/or speaker system (for example shown in FIGS. 24A and 24B) and a visor 405. In a particularly advantageous embodiment, the interior surface of the visor may be treated with a moisture or condensation reducing agent which reduces or completely removes the need for ventilation air to prevent condensation on the interior surface of the visor. This reduces the amount (e.g. CFM) of ventilation air required by the helmet, thereby reducing power consumption and allowing the electrical power source (e.g. motor) to be smaller in comparison to existing systems. Reduction in the requirement for ventilation air also allows a quieter motor to be used so that the motor can be mounted close to the helmet shell without causing significant noise and interference with audio equipment.

The helmet may include an indicator for indicating a condition or function monitored by the control unit, and the indicator may, for example, comprise an audio indicator, a visual indicator or a tactile indicator or any combination of these. One or more indicators may be included on the control unit and/or on other parts of the helmet.

Figure 28:
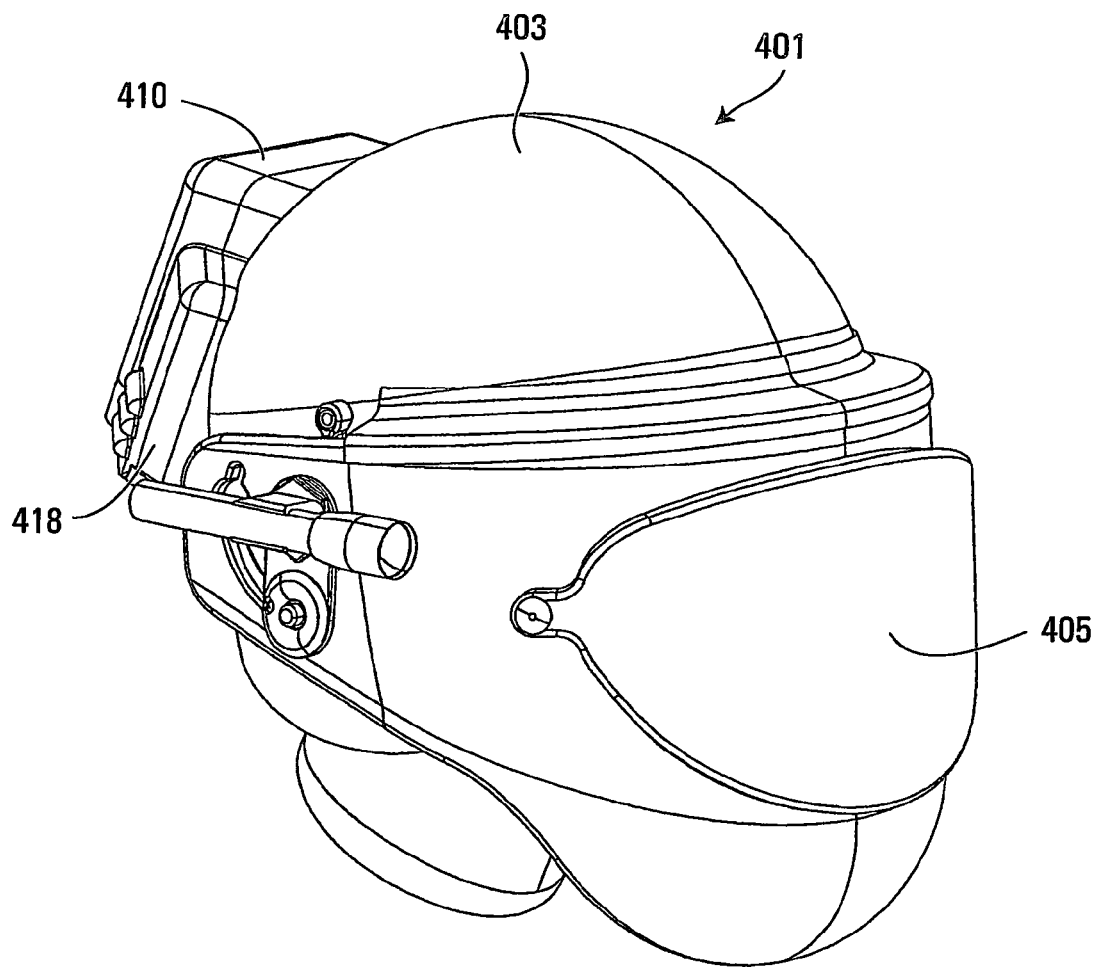
Figure 29:
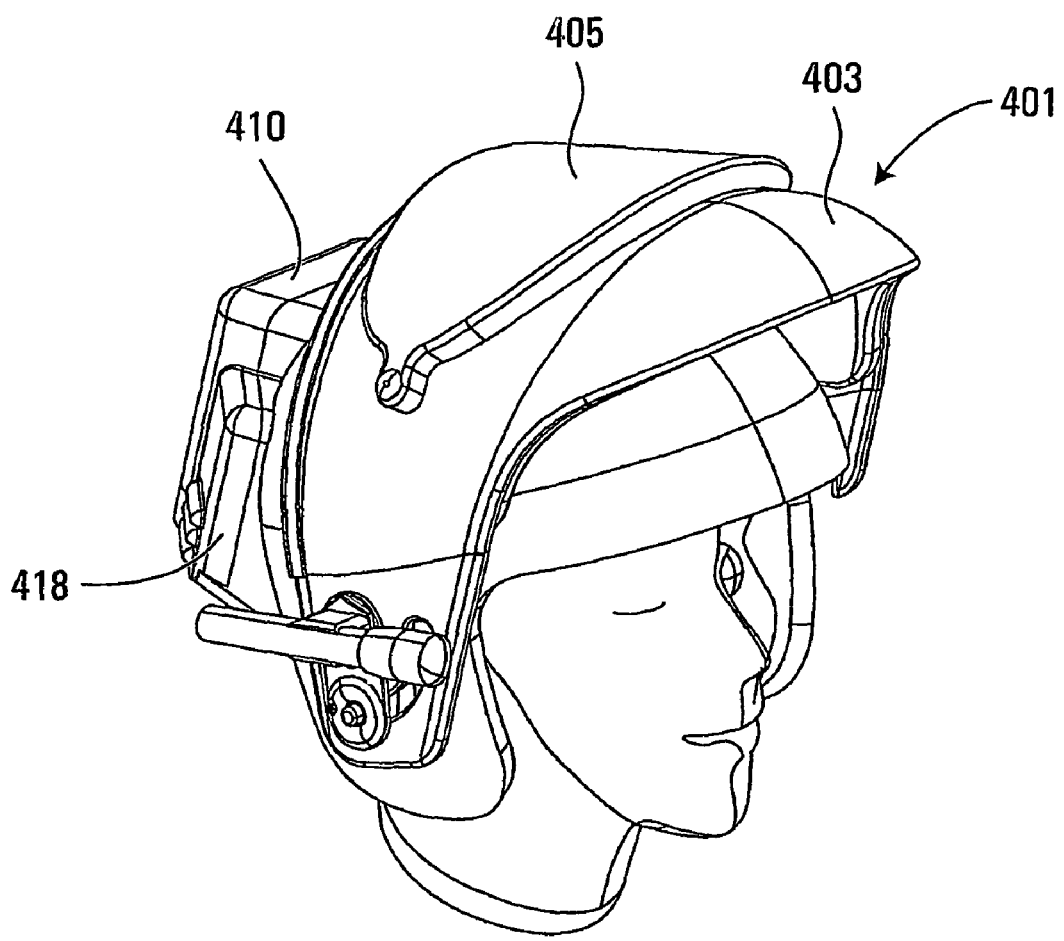
Figure 30:
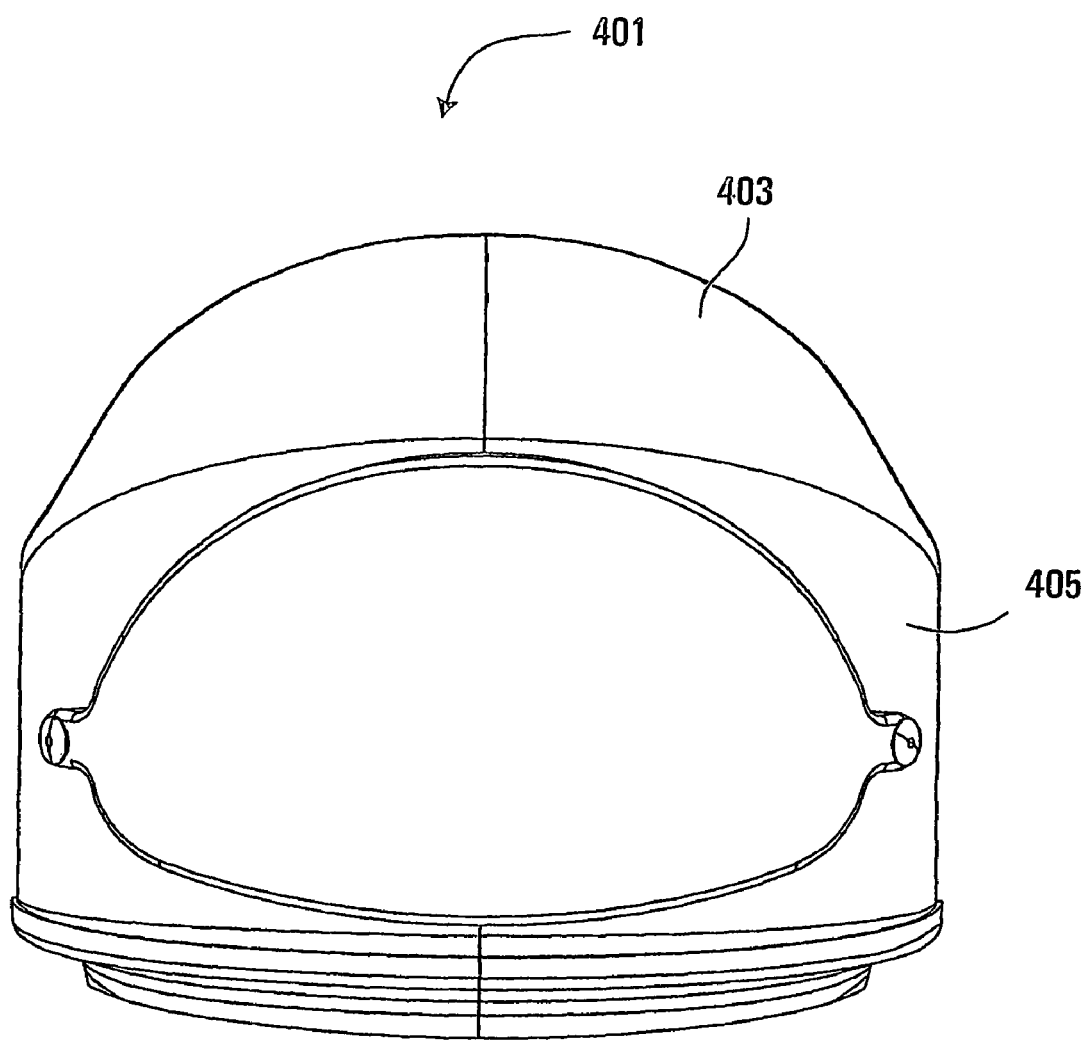

Other views of the helmet of FIGS. 26 and 27 are shown in FIGS. 28 to 30, and the helmet may include any one or more further features disclosed herein.

Base Control Module and Remote Control Module

Embodiments of the head protector may include base control module mounted to the helmet for controlling electrical functions associated with the head protector. The head protector may include alternatively or in addition, a remote controlled module for controlling electrical functions associated with the head protector, which in use, may be mounted remotely from the head protector, for example on an arm, leg or torso portion of a wearer. If both modules are provided, both may be arranged to control at least one electrical function which is the same so that if one control module fails, the particular function (or functions) may still be controlled by the other control module. Advantageously, the remote control module may include a panel which is intended to be visible in use, and which includes keys or other user input means, together with a visual indication of their function. The base control module may also include a control panel which includes keys and a visual indication of their function. The remote control module may include means for fastening the control module to the arm, leg or torso portion of a wearer.

Figure 31:
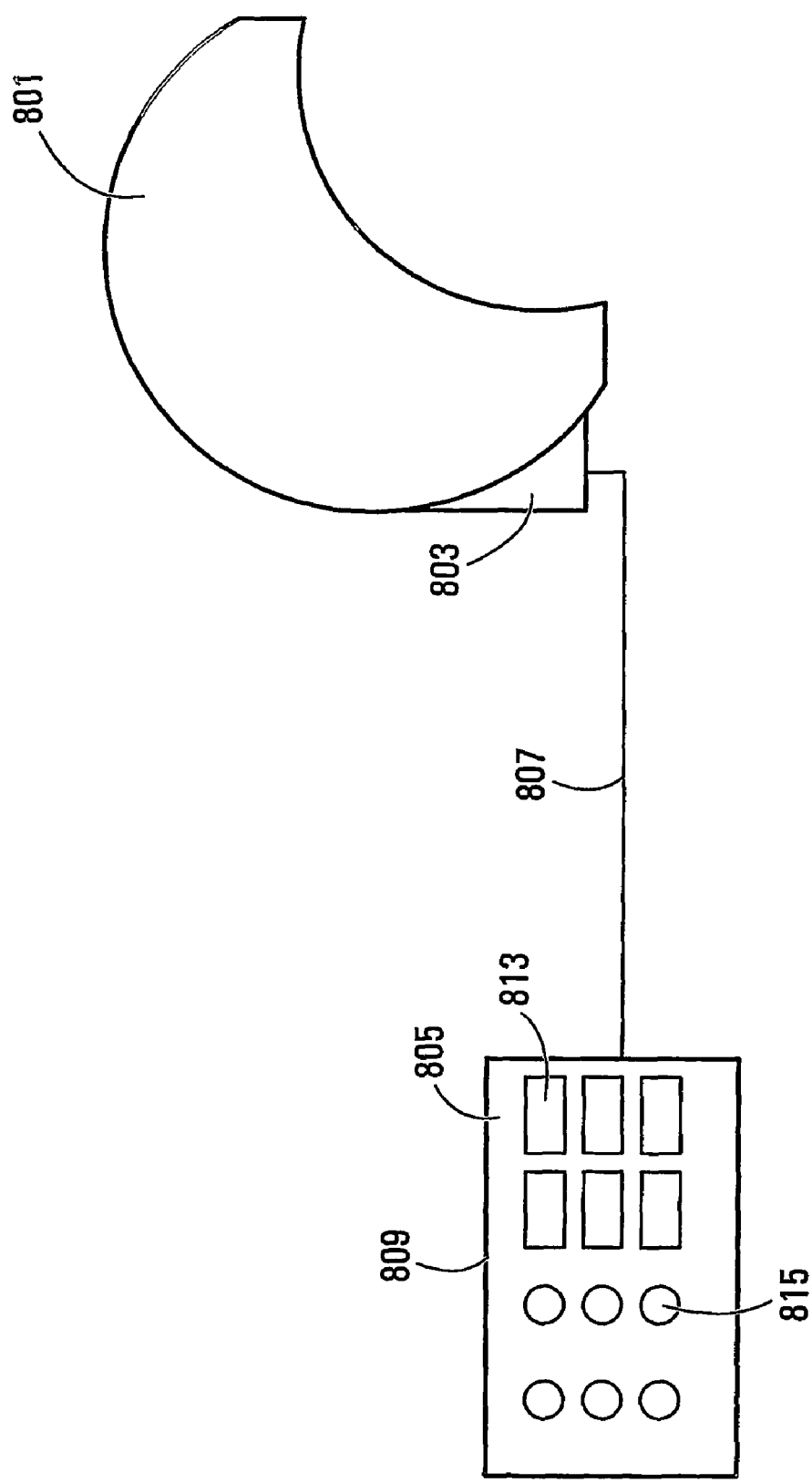
FIG. 31 shows a schematic diagram of a control module and remote controller according to an embodiment of the present invention.

FIG. 31 shows an embodiment of an arrangement comprising a head protector 801 having a base control module 803 mounted thereon and a remote control module 805 connected to the base module 803 by means of a cable 807. The cable may be used to provide power to the remote controller from the helmet and also carries data communication signals that allow the remote controller to control an unlimited number of features in the helmet. The controller may also be arranged to interrogate the helmet's electronics to receive status information. The remote controller comprises a housing or enclosure 809 which houses the required electronic circuitry and a user interface 811 comprising a plurality of keypads or switches 813 for receiving user inputs for controlling the system, and one or more indicators which may include indicator lights and/or an alphanumeric display for displaying system status information to the user.

Figure 32:
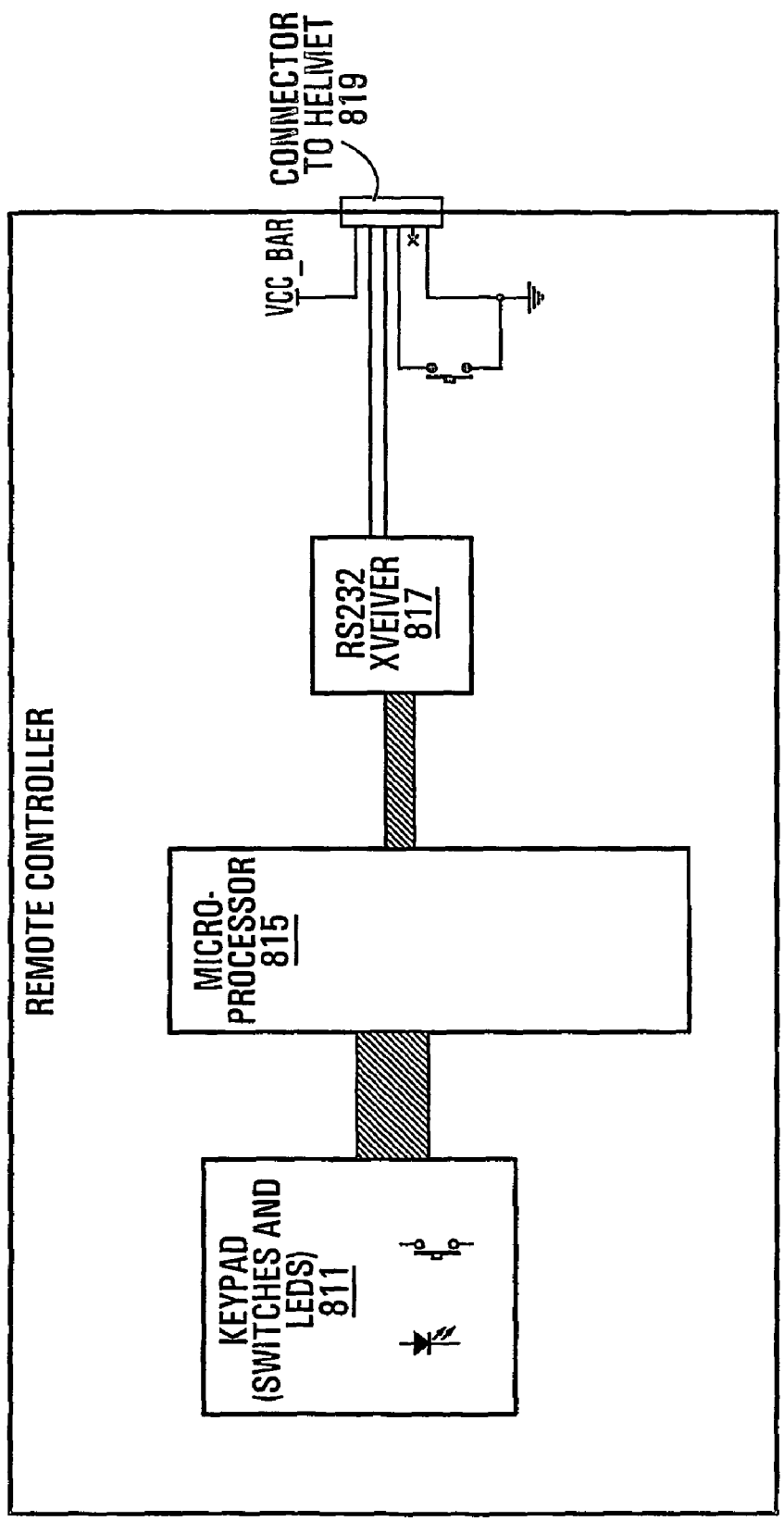
FIG. 32 shows a schematic diagram of a circuit for a remote controller according to an embodiment of the present invention.

An example of the main components of an embodiment of a remote controller are shown in FIG. 32. The remote controller comprises a user interface 811 (as described above), a microprocessor 815, a transceiver 817 and a connector 819. The microprocessor 815 is responsible for controlling the remote control unit. In particular, the microprocessor is responsible for monitoring the user's keystrokes, driving the status indicators and communicating with the helmet's base module to relay commands and retrieve status information. In one embodiment, a simple serial communication protocol is used to communicate efficiently with the electronic base module and to reduce the number of wires required to connect to the helmet. Reducing the number of wires also makes the system more robust and less susceptible to possible failure.

The transceiver receives serial data from the processor and drives the cable with a signal conforming to the desired communication standard. In one embodiment, the RS232 communication standard may be used which provides an extremely reliable communication link which is immune to electrical noise and static electricity discharges, which may be particularly beneficial when operating in hazardous environments. The connector transmits signals between the transceiver and helmet base module and may comprise a simple RS32 serial data connection which also carries power and a remote-on signal. As mentioned above, the use of a serial connection limits the number of wires required, and using the RS232 electrical standard provides a high degree of noise immunity and static electricity protection.

Figure 33A:
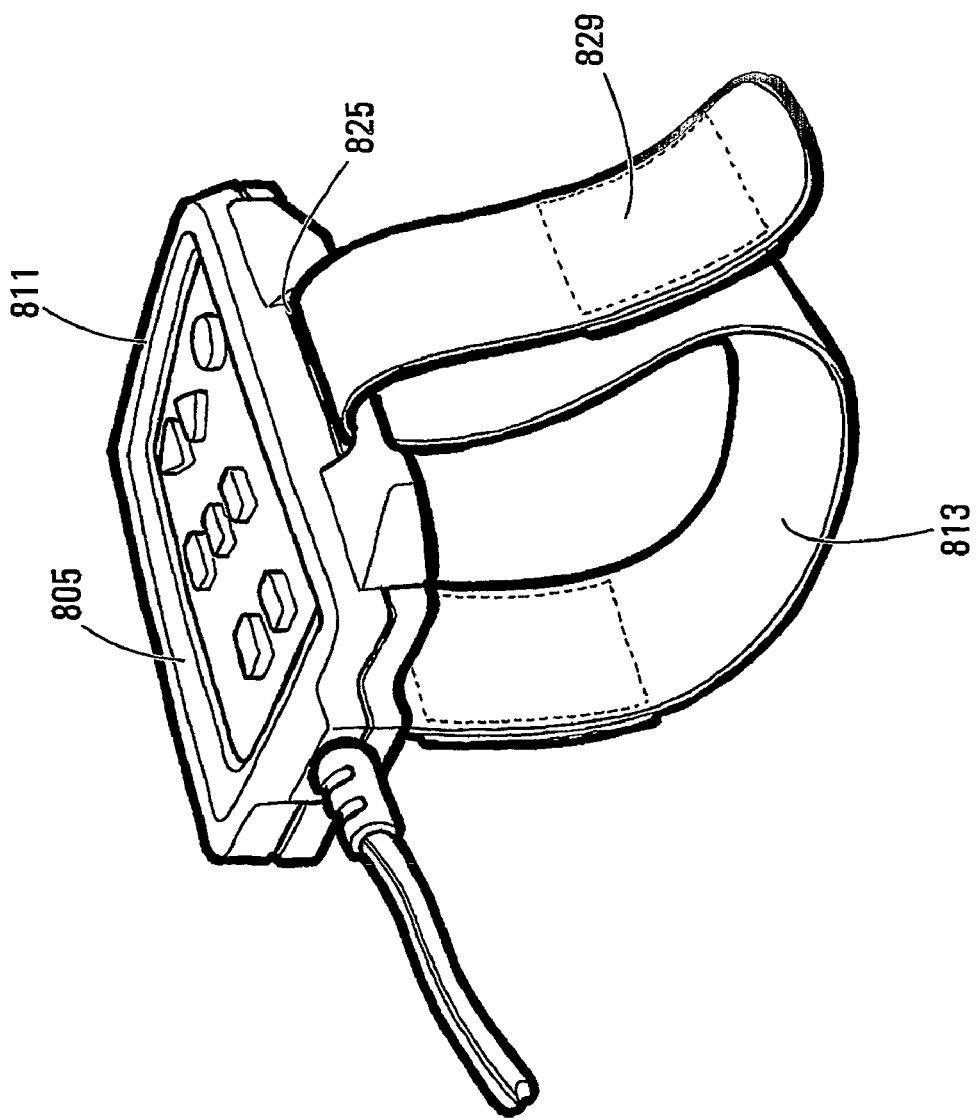
FIGS. 33A and 33B show a remote controller according to an embodiment of the present invention.
Figure 33B:
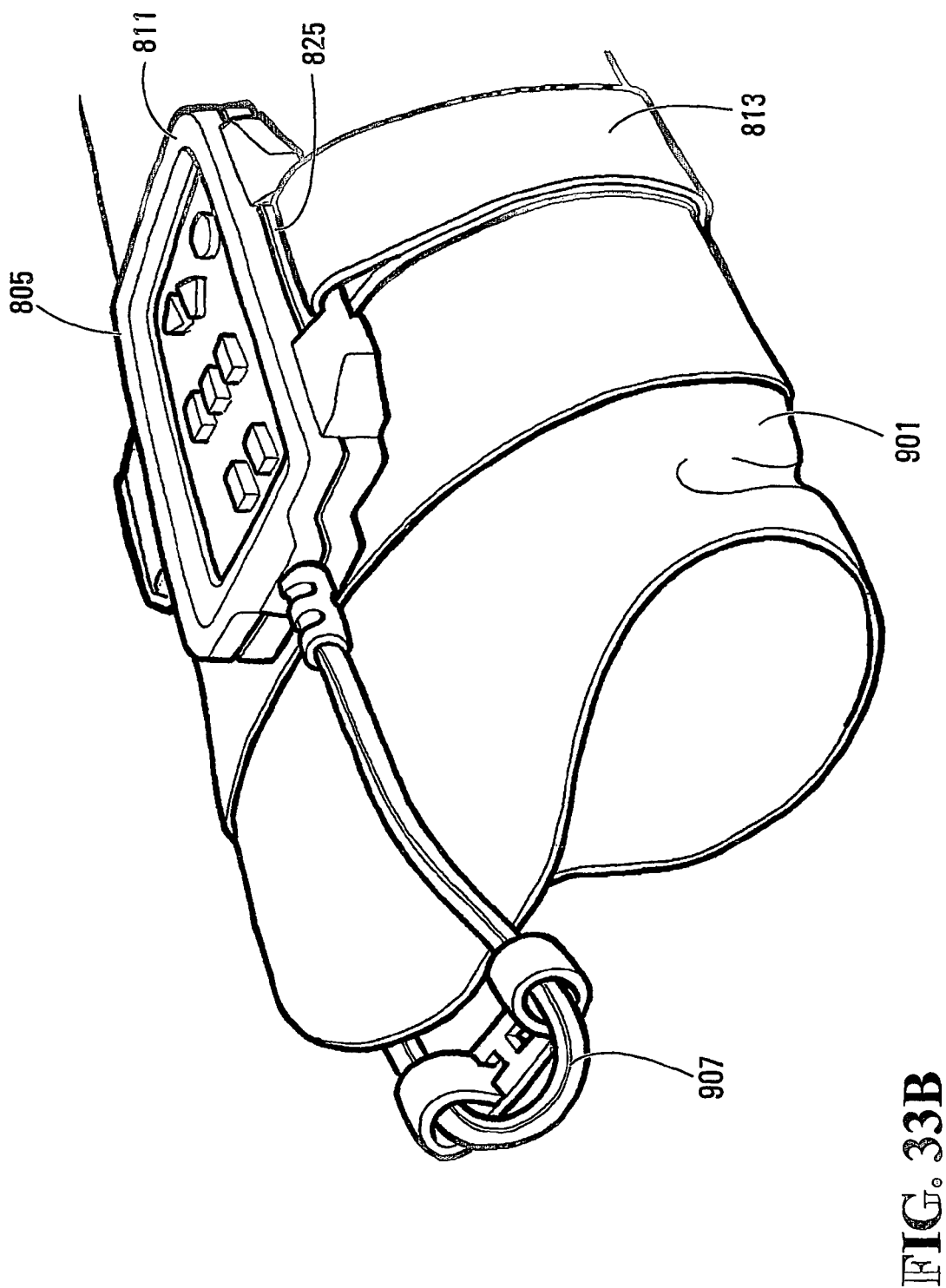

An embodiment of a remote controller is shown in FIGS. 33A and 33B. The remote controller 805 comprises a housing 811 and a strap 813 for securing the remote controller to the arm of a wearer. The strap is fixed to one side of the housing and the other end is looped through a slot 825 at the other side of the controller housing. A fastener, for example a fastening strip 827 is provided on the outer surface of the strap on one side thereof and a complementary fastener, e.g. fastening strip 829 is provided on the inside surface at the other end of the strap and the strap is secured by folding the strap back on itself so that the fastening members are connected together.

In another embodiment, the remote control module may be mounted in a pocket having a window or opening to allow the user to see and access the user display and control panel. An example of this arrangement in shown in FIG. 34.

Figure 34:
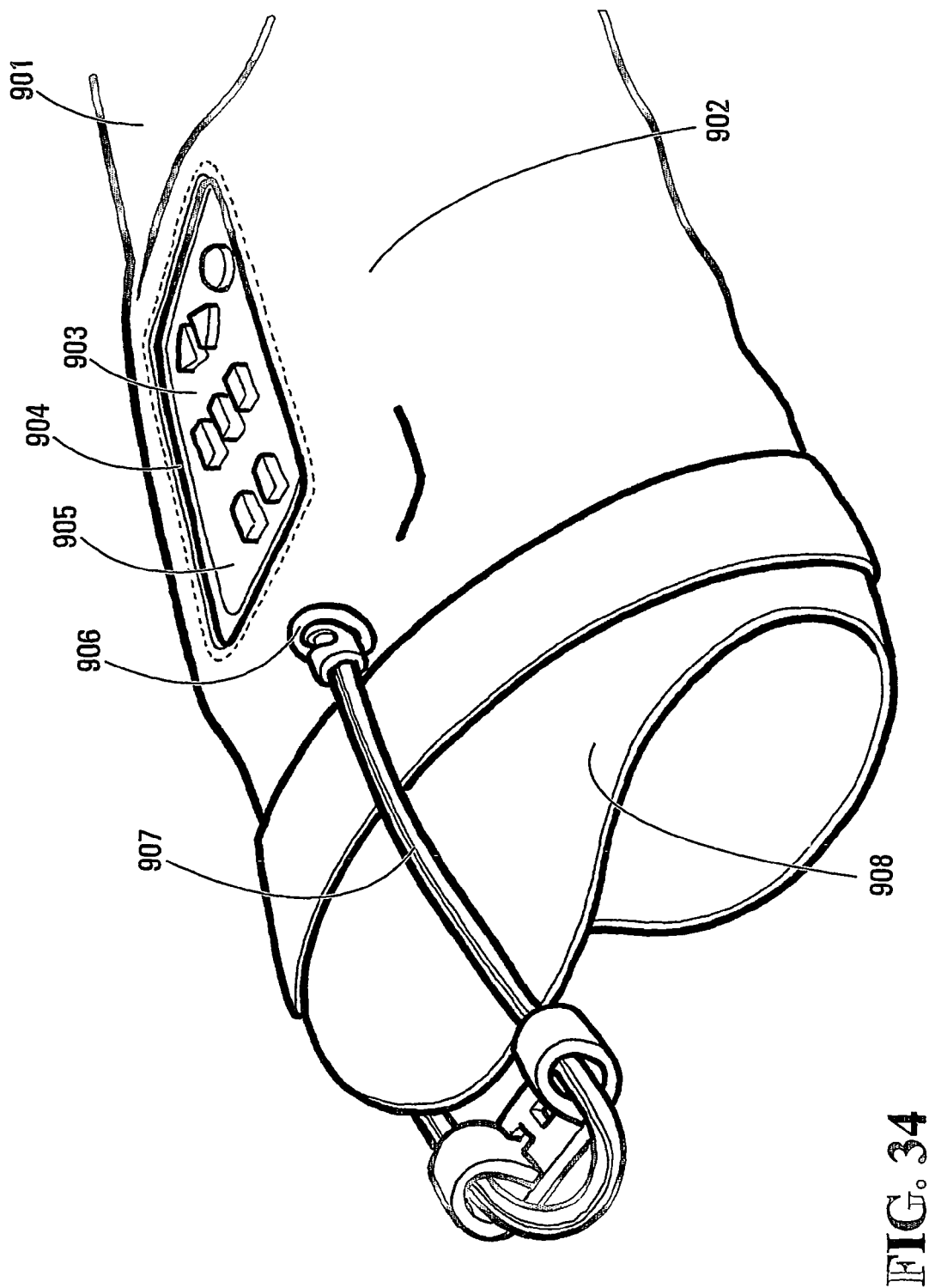
FIG. 34 shows a mounting arrangement for a remote controller according to another embodiment of the present invention.

Referring to FIG. 34, a sleeve 901 of a garment includes a pocket (or retainer) 902 into which a remote controller 903 for controlling one or more functions associated with a protective helmet is inserted. The pocket 902 has a window or open area 904 for permitting a user to visually and/or access a user interface 905 of the controller. The user interface may include one or more visual indictors for indicating a condition associated with the helmet or controller (or other device) and one or more keypads or buttons for receiving user input commands. The pocket 902 includes an aperture 906 for receiving a communications cable 907. The communications cable may extend around the cuff 908 of the sleeve 901 and returned to the helmet along the inside of the sleeve. In another embodiment, the cable 907 may pass to the controller directly through the inside of the sleeve. The opening or window may include a transparent protective cover to protect the front face of the remote controller.

Figure 35A:
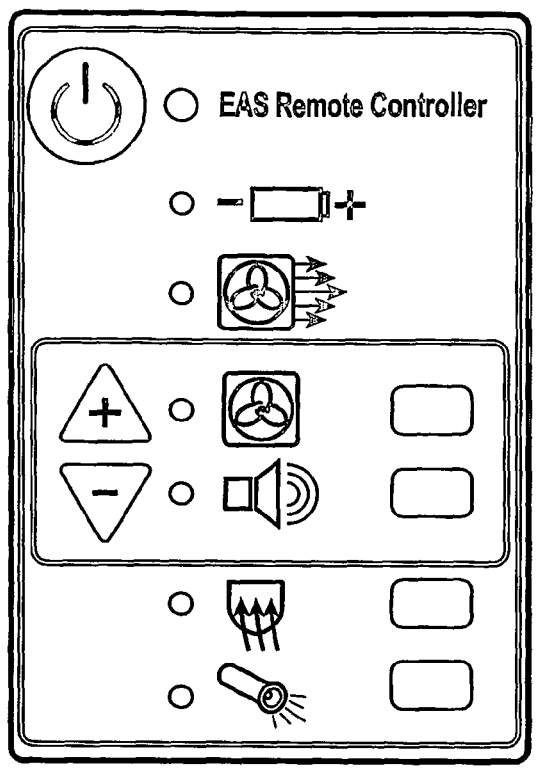
FIG. 35A shows a control interface for a helmet mounted controller according to an embodiment of the present invention.
Figure 35B:
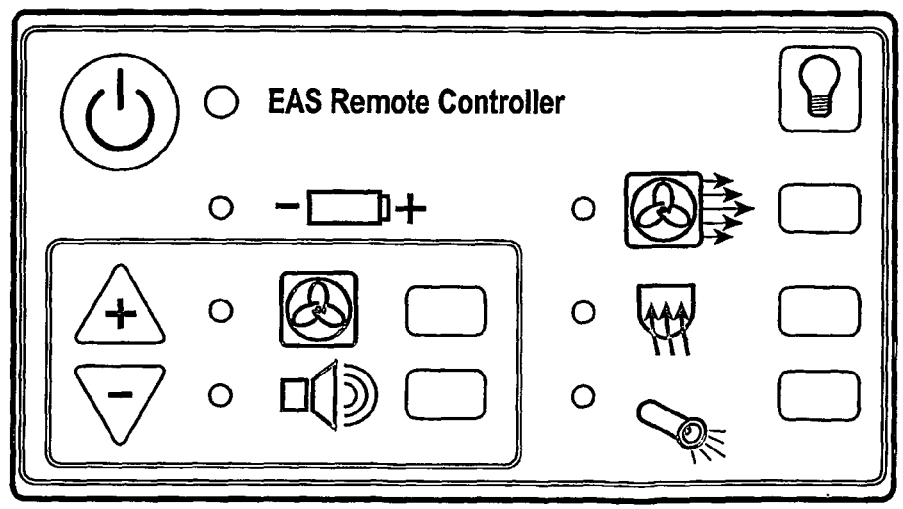
FIG. 35B shows a user interface for a remote controller according to an embodiment of the present invention.
Figure 35C:
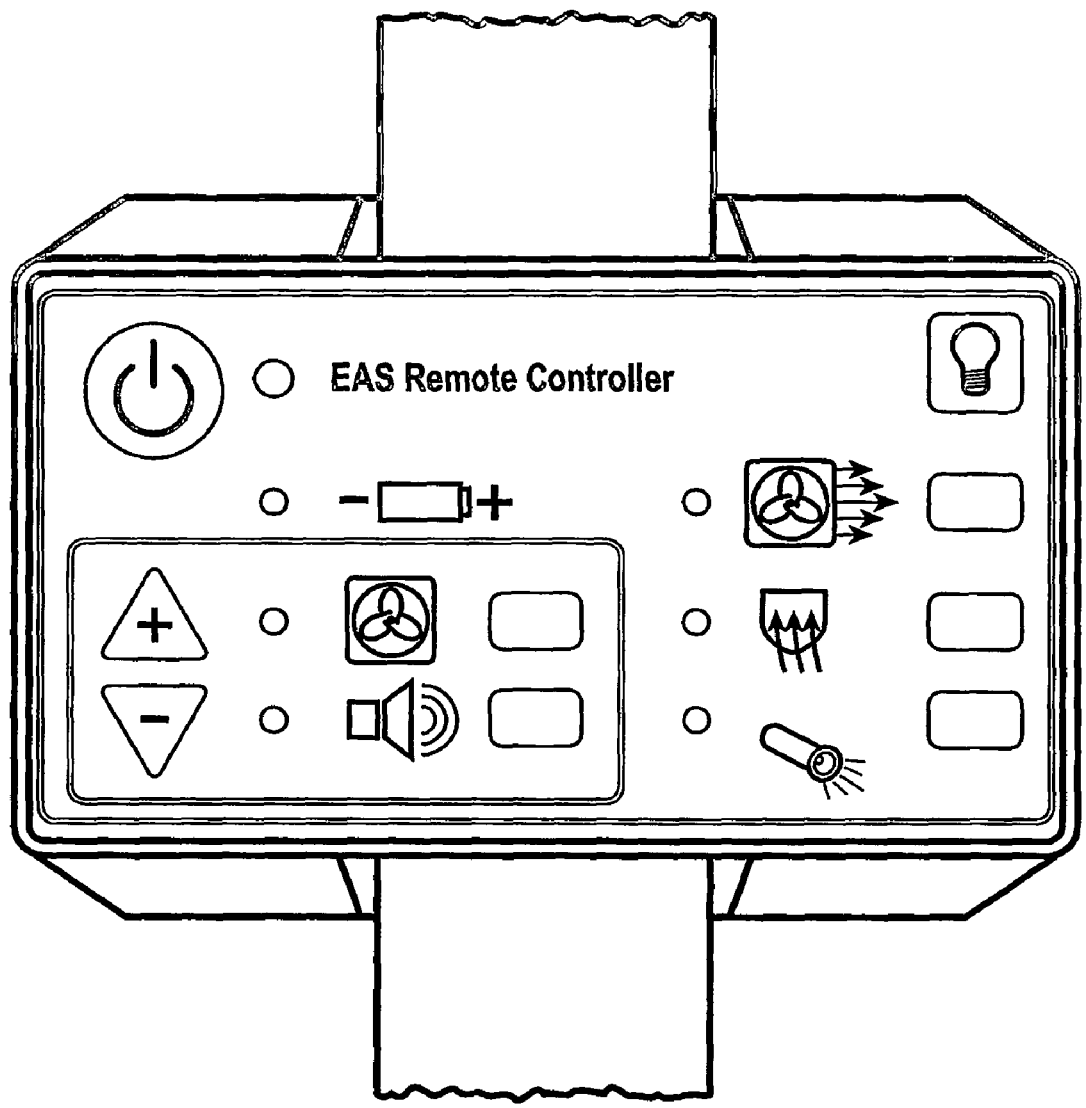
FIG. 35C shows a remote controller according to another embodiment of the present invention.

Another example of a base control module and remote control module are shown in FIGS. 35A to 35B. The base and/or remote control module may include any one or more of the following control functions.
1. Climate control fan, including speed and turbo boost (which may be time limited).
2. Speaker volume control.
3. Search light control on/off, and/or intensity level.
4. Visor defogger (which may comprise a heater associated with the visor)
5. Control panel back light (for eliminating the control functions in poor light).

The base control module and/or the remote control module may be adapted to control any other functions.

The base control module mounted to the helmet may include a power source for driving the various electrical devices associated with the head protector and may store sufficient electrical energy to obviate the need for an auxiliary portable power source.

Figure 35D:
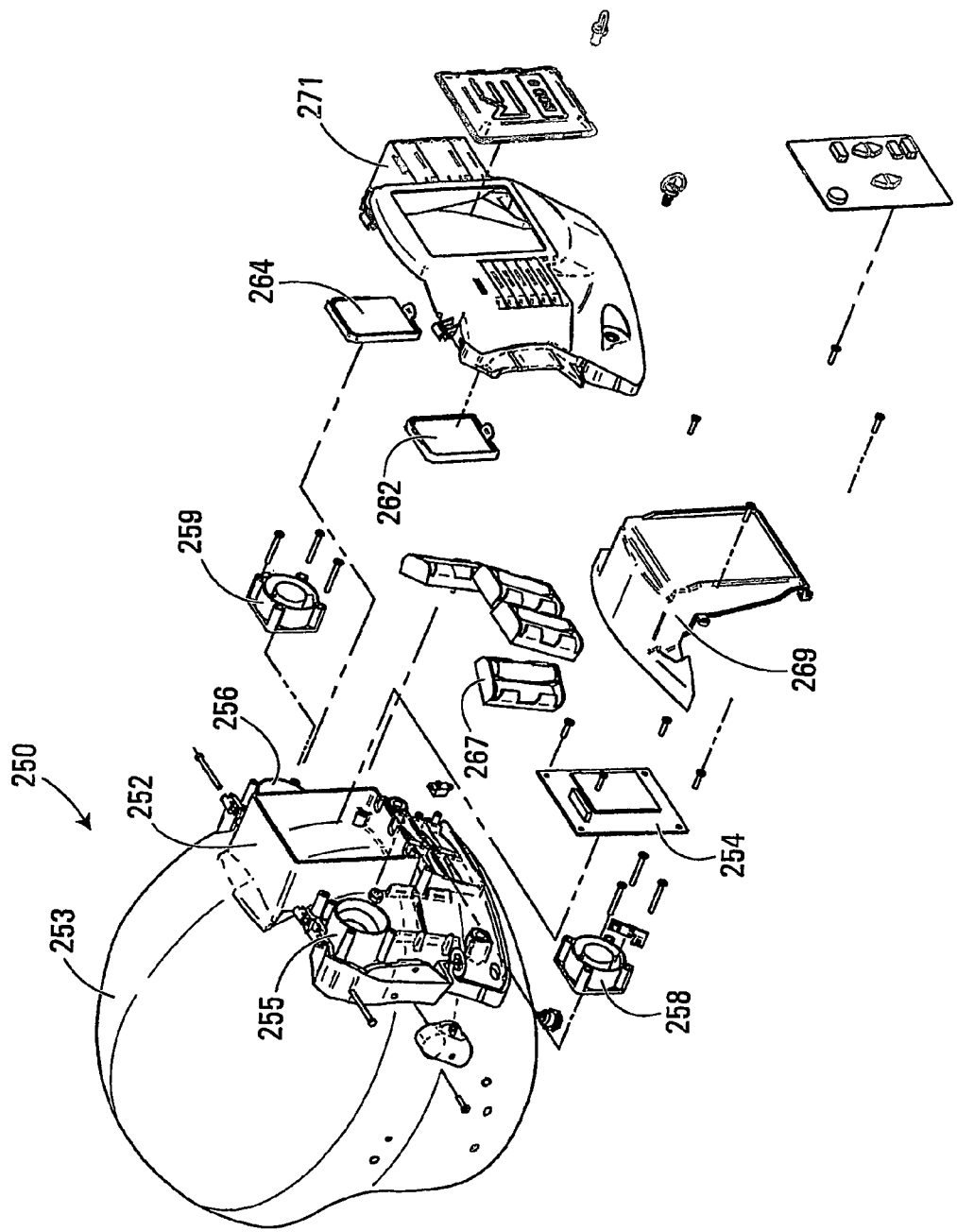
FIG. 35D shows an electrically operated module for a protective helmet according to another embodiment of the present invention.

An embodiment of an electrically powered module for a protective helmet is shown in FIG. 35D. The module 250 includes a housing 252 mounted on the rear of a helmet 253 for receiving electronic circuitry 254. The housing may be electromagnetically shielded to prevent the electronic circuitry interfering with external equipment and vice versa. The housing may also be hermetically sealed to prevent moisture ingress.

The module also includes air impeller housings 255, 256, which in this embodiment are mounted either side of the electrical housing 252 for receiving and installing air impellers 258, 259 for providing ventilation air into the interior of the helmet through one or more ducts (not shown).

Air filters 262, 264 may be provided in the fluid path of the impellers to filter air before being admitted into the helmet.

The module further includes a housing for an electrical energy source, which may comprise one or more battery holders 267. The electrical housing 252 includes a cover 269 for sealing the electrical housing, and a cover 271 which may conveniently be releasably connected to the back of the module is provided to enclose the various module components, including electrical energy sources, fluid impellers and the electrical components. In other embodiments, any one or more of the components described above may be omitted from the control module. The electrical circuit may be adapted to control or monitor any of the functions described above.

Light Source

Embodiments of the head protector may include a light source which is secured to a front portion of the helmet or visor. The light source may comprise an LED based light source, preferably having a high efficiency. The light source may include a reflector and lens for concentrating the light into a beam having a desired shape and width. The light source may comprise two individual light sources which are spaced apart laterally. Each light source may be arranged to produce a beam and the beams may be directed at any desired angle relative to each other and may converge or diverge as required. Each light source may comprise a light emitting diode and may further include a reflector and/or lens to produce the required beam. The light source may be powered by a DC source, for example a battery power pack which may be mounted on the helmet or elsewhere on the wearer.

Modifications and changes to the embodiments described above will be apparent to those skilled in the art.

The invention claimed is:

1. A head protection system comprising a helmet shell, mounting means on the shell for pivotally mounting a visor thereto to permit the visor to be moved between raised and lowered positions,
    a visor adapted for mounting on said mounting means, said visor comprising a first layer of transparent material, and a plurality of layers of fragment resistant fabric connected to said first layer and covering part of said first layer, said part being limited to an area which is positioned outside a region of said first layer which forms a transparent viewing area of said visor, and
    locking means for releasably locking said visor in at least one of a raised position and a lowered position, wherein said locking means is spaced apart from the pivotal axis of said mounting means, and comprises a depressible locking member mounted on said helmet shell for locking said visor, and a manually accessible depressible member coupled to said locking member, and wherein said lock further comprises a movable member coupled to said depressible member, and said shell includes receiving means for receiving said moveable member.

2. A head protection system as claimed in claim 1, comprising a further layer of transparent material covering said viewing area.

3. A head protection system as claimed in claim 2, wherein said viewing area is defined by a peripheral boundary and said further layer of transparent material has a peripheral edge which is positioned adjacent the peripheral boundary of said viewing area.

4. A head protection system as claimed in claim 2, wherein said visor has a front and a back and said further layer is positioned towards the front of the visor and the first layer is positioned behind the further layer.

5. A head protection system as claimed in claim 4, wherein said further layer comprises one of acrylic and glass.

6. A head protection system as claimed in claim 1, wherein said visor has a front and a back, and said first layer is positioned towards the front of the visor and the plurality of layers of fragment resistant fabric are positioned behind said first layer.

7. A head protection system as claimed in claim 1, wherein said fragment resistant fabric comprises at least one selected from the group consisting of Dyneema®, Spectra® and an aramid material.

8. A head protection system as claimed in claim 1, wherein said visor comprises a front portion and left and right side portions formed by said layer of transparent material and said plurality of layers of fragment resistant fabric extend over at least part of said side portions.

9. A head protection system as claimed in claim 1, wherein said visor comprises a lower portion formed by said layer of transparent material and positioned below said viewing area and said plurality of layers of fragment resistant fabric extend over at least part of said lower portion.

10. A head protection system as claimed in claim 1, wherein said visor comprises an upper portion comprising said first layer and positioned above said viewing area and said plurality of layers of fragment resistant fabric extend over at least part of said upper portion.

11. A head protection system as claimed in claim 1, wherein said viewing area comprises a window and said plurality of layers of fragment resistant fabric at least partially surround said window.

12. A head protection system as claimed in claim 1, wherein said first layer comprises a formable plastic material.

13. A head protection system as claimed in claim 12, wherein said first layer comprises polycarbonate.

14. A head protection system as claimed in claim 1, wherein the portion of the visor comprising said first layer and said plurality of layers of fragment resistant fabric extending over said first layer has a V50 impact rating of 600 meters/second or more using the test standard MIL-STD-662F using a .22 millimeter projectile defined in MIL-P-46593A.

15. A head protection system as claimed in claim 1, wherein said plurality of layers of fragment resistant fabric are generally opaque.

16. A head protection system as claimed in claim 1, wherein said plurality of layers of fragment resistant fabric are bonded together to form a laminate.

17. A head protection system as claimed in claim 1, further comprising retaining means for releasably retaining said visor on said mounting means.

18. A head protection system as claimed in claim 1, wherein said visor is shaped for accommodating a face mounted respirator when said helmet is worn by a user and the visor is in the lowered position.

19. A head protection system as claimed in claim 1, further comprising a stop member positioned below the pivotal axis of said mounting means and secured to said helmet shell for engaging a portion of said visor and arranged to resist rearward movement of said visor relative to said shell, wherein said stop member is further arranged to prevent a force to the front of the visor being transmitted to said moveable member.

20. A head protection system as claimed in claimed 19 wherein said stop member comprises a shock absorbing material.

21. A head protection system as claimed in claim 19, wherein said stop member is positioned in front of said moveable member.

* * * * *